US006671251B1

(12) United States Patent
Kim et al.

(10) Patent No.: US 6,671,251 B1
(45) Date of Patent: Dec. 30, 2003

(54) METHOD FOR GENERATING COMPLEX QUASI-ORTHOGONAL CODE AND APPARATUS AND METHOD FOR SPREADING CHANNEL DATA USING THE QUASI-ORTHOGONAL CODE IN CDMA COMMUNICATION SYSTEM

(75) Inventors: Young-Ky Kim, Seoul (KR); Kyeong-Cheol Yang, Seoul (KR); Jae-Min Ahn, Seoul (KR); Jae-Yoel Kim, Kyunggi-do (KR); Hee-Won Kang, Seoul (KR); Seung-Joo Maeng, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/480,963

(22) Filed: Jan. 11, 2000

(30) Foreign Application Priority Data

| | | |
|---|---|---|
| Jan. 11, 1999 | (KR) | 1999/888 |
| Jan. 14, 1999 | (KR) | 1999/1339 |
| Apr. 9, 1999 | (KR) | 1999/12563 |

(51) Int. Cl.[7] .......... H04J 11/00
(52) U.S. Cl. .......... 370/209; 370/335; 375/130
(58) Field of Search .......... 370/208, 209, 370/310, 320, 335, 328, 342, 441; 375/130, 135, 137, 140, 142, 146, 150

(56) References Cited

U.S. PATENT DOCUMENTS 5,940,434 A * 8/1999 Lee et al. .......... 375/146
6,240,143 B1 * 5/2001 Shanbhag .......... 375/295
6,314,125 B1 * 11/2001 Shanbhag .......... 375/130
6,377,539 B1 * 4/2002 Kang et al. .......... 370/209
6,459,693 B1 * 10/2002 Park et al. .......... 370/342
6,512,753 B1 * 1/2003 Kim et al. .......... 370/335

* cited by examiner

*Primary Examiner*—Chau Nguyen
*Assistant Examiner*—Nittaya Juntima
(74) *Attorney, Agent, or Firm*—Dilworth & Barrese, LLP

(57) ABSTRACT

A method for generating a complex quasi-orthogonal code for channel spreading in a CDMA communication system is disclosed. The method comprises generating an M-sequence having a length N and a specific sequence having a good full correlation property with the M-sequence; generating a predetermined number of other specific sequences by circularly shifting said specific sequence; generating a predetermined number of other M-sequences by circularly shifting said M-sequence, and column permutating the circularly shifted specific sequences in a same method as a column permutation method for converting the generated M-sequences to Walsh orthogonal codes to generate candidate masks; generating quasi-orthogonal code representatives by operating the candidate masks and the Walsh orthogonal codes having the same length as the mask candidates; and selecting quasi-orthogonal code candidates satisfying a partial correlation between the Walsh orthogonal codes out of the generated quasi-orthogonal code representatives and a partial correlation between different quasi-orthogonal codes, and selecting masks pertinent to generating the selected quasi-orthogonal codes.

19 Claims, 22 Drawing Sheets

$$
Q=\begin{bmatrix}
0 & 0 & 0 & 0 & 0 & 0 & \cdots & 0 & 0 \\
0 & & S_0(t) & & & & & & \\
0 & & S_0(t+1) & & & & & & \\
\vdots & & \vdots & & & & & & \\
0 & & S_0(t+2^m-2) & & & & & & \\
0 & & S_1(t) & & & & & & \\
0 & & S_1(t+1) & & & & & & \\
\vdots & & \vdots & & & & & & \\
0 & & S_1(t+2^m-2) & & & & & & \\
0 & & S_2(t) & & & & & & \\
0 & & S_2(t+1) & & & & & & \\
\vdots & & \vdots & & & & & & \\
0 & & S_{2^m-1}(t) & & & & & & \\
0 & & S_{2^m-1}(t+1) & & & & & & \\
\vdots & & \vdots & & & & & & \\
0 & & S_{2^m-1}(t+2^m-2) & & & & & &
\end{bmatrix}
$$

FIG.3

$$Q' = \begin{bmatrix} \overbrace{W}^{2^{2m}} \\ e_0 + W \\ e_1 + W \\ \vdots \\ e_{2^m-1} + W \end{bmatrix} 2^m \times 2^m$$

FIG. 4

METHOD FOR GENERATING COMPLEX QUASI-ORTHOGONAL CODE AND APPARATUS AND METHOD FOR SPREADING CHANNEL DATA USING THE QUASI-ORTHOGONAL CODE IN CDMA COMMUNICATION SYSTEM

PRIORITY

This application claims priority from an application entitled "Device and Method for Generating Quaternary Complex Quasi-Orthogonal Code and Performing Channel Spreading Using the Same in CDMA Communication System" filed in the Korean Industrial Property Office on Jan. 11, Jan. 14 and Apr. 9, 1999 and respectively assigned Ser. Nos. 99-888, 99-1339 & 99-12563, the contents of which are hereby incorporated by reference.

BACKGROUND OF THE INVENTION

1. Field of the Invention

The present invention relates generally to a spreading device and method for a mobile communication system, and in particular, to a method for generating complex quasi-orthogonal codes and an apparatus and method for spreading channel data using those generated complex quasi-orthogonal codes.

2. Description of the Related Art

In general, a CDMA (Code Division Multiple Access) mobile communication system performs channel separation using orthogonal codes in order to increase channel capacity. For example, a forward link specified by the IS-95/IS-95A standard separates the channels using the orthogonal codes. This channel separation method can also be applied to a reverse link through time alignment. In addition, a UMTS (Universal Mobile Terrestrial System) down link also spread the channels using the orthogonal codes.

FIG. 1 illustrates the IS-95/IS-95A forward link in which channels are separated by orthogonal codes. Referring to FIG. 1, channels are separated by associated orthogonal codes Wi (where i=0 to 63), respectively, which typically are Walsh codes. The IS-95/IS-95A forward link uses convolutional codes having a code rate R=1/2, employs BPSK (Binary Phase Shift Keying) modulation, and has a bandwidth of 1.2288 MHz. Accordingly, the number of available channels is 1.2288 MHz/(9.6 KHz*2)=64. That is, the IS-95/IS-95A forward link can separate channels using 64 Walsh codes.

As stated above, the number of available orthogonal codes depends on the employed modulation method and the minimum data rate. However, in future CDMA mobile communication systems, channels assigned to the users will increase in number in order to improve performance. To this end, future CDMA mobile communication systems will need to increase the channel capacity of traffic channels, pilot channels and control channels.

However, there are a limited number of available orthogonal codes the improved system can use. Therefore, any increase in channel capacity will be restricted due to the limitation on the number of available orthogonal codes. To solve this problem, it is desirable to generate quasi-orthogonal codes, which will have the least interference with the orthogonal codes and a variable data rate.

SUMMARY OF THE INVENTION

It is, therefore, an object of the present invention to provide a method for generating complex quasi-orthogonal codes having the least interference with orthogonal codes in a CDMA communication system using the orthogonal codes.

It is another object of the present invention to provide a method for generating complex quasi-orthogonal codes having a correlation of below: $\sqrt{L}$ with orthogonal codes of length L by generating and applying complex quasi-orthogonal codes for QPSK (Phase Shift Keying) modulation.

It is still another object of the present invention to provide an apparatus and method for spreading channel data with the complex quasi-orthogonal code generated using a quasi-orthogonal code mask in a CDMA communication system.

It is still another object of the present invention to provide an apparatus and method for spreading channel data with complex quasi-orthogonal codes generated using a sign and a phase of quasi-orthogonal code in a CDMA communication system.

It is yet another object of the present invention to provide a method for generating quasi-orthogonal codes having the least interference with orthogonal codes thereby to increase a channel capacity in a CDMA communication system using the orthogonal codes.

It is yet another object of the present invention to provide a device and method for generating quasi-orthogonal sequences satisfying all the conditions of quasi-orthogonal codes in a CDMA communication system.

It is yet another object of the present invention to provide a column permutation method for generating quasi-orthogonal sequences satisfying all the conditions of quasi-orthogonal codes in a CDMA communication system.

It is yet another object of the present invention to provide quasi-orthogonal codes which can be expressed as a sign code and a phase code and satisfy conditions of the quasi orthogonal codes in a CDMA communication system.

It is yet another object of the present invention to provide a device and method for spreading and despreading a channel signal using the quasi-orthogonal code expressed as a sign code and a phase code in a CDMA communication system.

It is yet another object of the present invention to provide quasi-orthogonal codes which can be expressed as a specific walsh code used as a sign code and a phase code and satisfy conditions of the quasi-orthogonal codes in a CDMA communication system.

It is yet another object of the present invention to provide a device and method for spreading and despreading a channel signal using a quasi-orthogonal code expressed as a specific walsh code used as a sign code and a phase code in a CDMA communication system.

To achieve the above objects, a method for generating a complex quasi-orthogonal code for channel spreading in a CDMA communication system is provided. The method comprises generating an M-sequence having a length N and a specific sequence having a good full correlation property with the M-sequence; generating a predetermined number of other specific sequences by circularly shifting said specific sequence; generating predetermined number of other M-sequences by circularly shifting said M-sequence, and column permutating the circularly shifted specific sequences in a same method as a column permutation method for converting the generated M-sequences to Walsh orthogonal codes to generate candidate masks; generating quasi-orthogonal code representatives by operating the mask candidates and the Walsh orthogonal codes having the same length as the candidate masks; and selecting quasi-orthogonal code candidates satisfying a partial correlation between the Walsh orthogonal codes out of the generated quasi-orthogonal code representatives and a partial correlation between different quasi-orthogonal codes, and selecting masks pertinent to generating the selected quasi-orthogonal codes.

BRIEF DESCRIPTION OF THE DRAWINGS

The above and other objects, features and advantages of the present invention will become more apparent from the following detailed description when taken in conjunction with the accompanying drawings in which:

FIG. 3 is a diagram illustrating a matrix Q for quasi-orthogonal code mask candidates used in generating complex quasi-orthogonal codes according to an embodiment of the present invention;

FIG. 4 is a diagram illustrating a matrix Q' for complex quasi-orthogonal code candidates generated by operating mask candidates for quasi-orthogonal codes and Walsh orthogonal codes according to an embodiment of the present invention;

DETAILED DESCRIPTION OF THE PREFERRED EMBODIMENT

Figure 1:
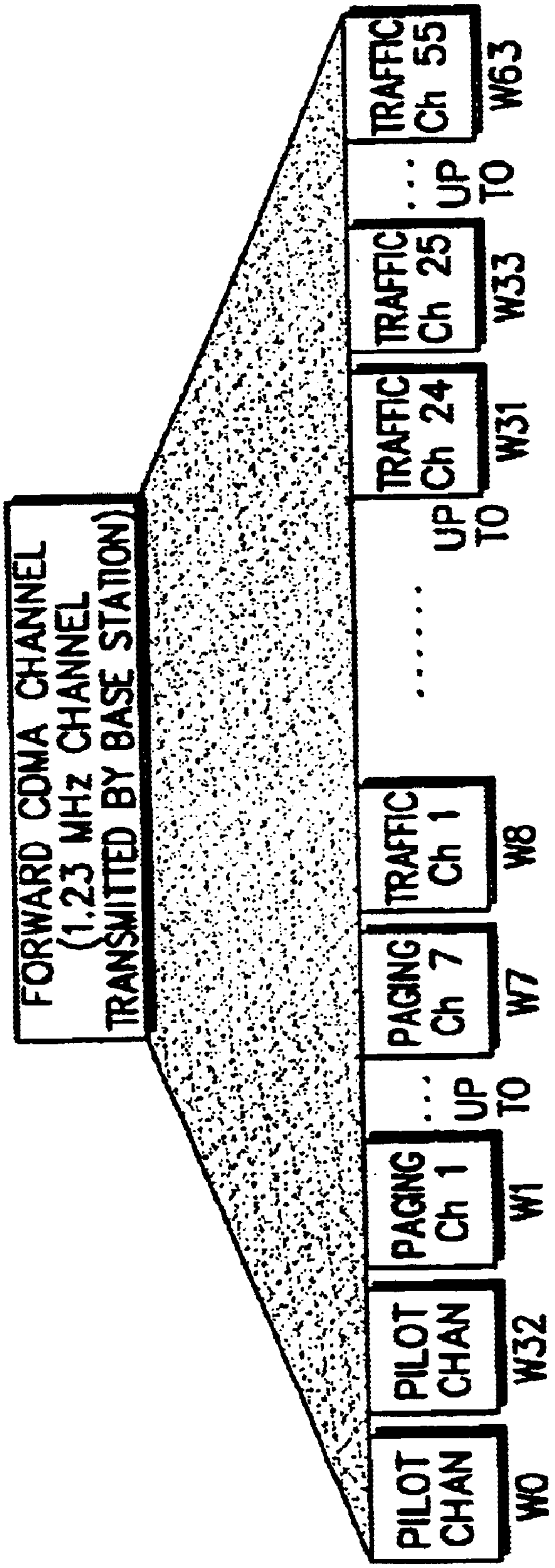
FIG. 1 is a diagram illustrating channel separation using orthogonal codes in a CDMA communication system.

A preferred embodiment of the present invention will be described herein below with reference to the accompanying drawings. In the following description, well-known functions or constructions are not described in detail since they would obscure the invention in unnecessary detail.

The invention aims to generate quasi-orthogonal codes which have the least interference with orthogonal codes, in order to increase the channel capacity or maximize a capacity of a single cell in a CDMA communication system.

Quasi-orthogonal sequences can be generated from Kasami sequences, Gold sequences and Kerdock sequences. These sequences have a common feature that a sequence can be expressed as the sum of sequences having a good (or high) correlation property between PN sequences and the sequences. For this reason, the above sequences can be used in generating quasi-orthogonal codes. Walsh codes can be obtained by performing column permutation on PN sequences. If a sequence comprised of the sum of a certain sequence and PN sequences undergoes column permutation in the same manner as in the column permutation for the PN sequences, the column permuted sequence will maintain a good correlation property with the Walsh code. That is, since the two sequences having the good correlation property have equally undergone column permutation, the good correlation property can remain unchanged in terms of the whole length of the sequences. A sequence remaining after exclusion of the PN sequence from the sum of the two sequences can be given as a mask candidate family for a quasi-orthogonal code, which will be described hereafter. When this sequence is given as a mask candidate family for a quasi-orthogonal code, the full correlation property is basically satisfied.

Below, a detailed description will be made of a procedure for generating complex quasi-orthogonal codes using the Kerdock sequences (i.e., Family A sequences) out of the sequences having the above feature.

Complex quasi-orthogonal codes should satisfy the following conditions expressed by Equations (1) to (3).

< Condition 1 >

$$\left|\sum_{t=1}^{N} j^{S_i(t)+2W_k(t)}\right| \le \theta_{\min}(N) \tag{1}$$

< Condition 2 >

$$\left|\sum_{t=1}^{N} j^{S_i(t)+S_{i'}(t)}\right| \le \theta_{\min}(N) \tag{2}$$

< Condition 3 >

$$\left|\sum_{t=1+\left(\frac{N}{M}l\right)}^{\frac{N}{M}(l+1)} j^{S_i(t)+2W_k(t)}\right| \le \theta_{\min}\left(\frac{N}{M}\right) \tag{3}$$

In addition, it is preferable that the complex orthogonal codes partially satisfy the following condition expressed by Equation (4).

< Condition 4 >

$$\left|\sum_{t=1+\left(\frac{N}{M}l\right)}^{\frac{N}{M}(l+1)} j^{S_i(t)+S_{i'}(t)}\right| \le \theta_{\min}\left(\frac{N}{M}\right) \tag{4}$$

where $i=0,1,2, \ldots, M-1$, and $j=\sqrt{-1}$.

In Equations (1) to (4), $W_k(t)$ denotes the k-th sequence of a Walsh orthogonal code having length N ($1 \leqq k \leqq N$) and $S_i(t)$ denotes an i-th complex quasi-orthogonal code having length N ($1 \leqq i \leqq X$), where X denotes the number of quasi-orthogonal codes satisfying Conditions 1 to 3 and partially satisfying Condition 4. Condition 1 expressed by Equation (1) means that the fill correlation between the k-th orthogonal code $W_k(t)$ ($1 \leqq k \leqq N$, $1 \leqq t \leqq N$) and the i-th quasi-orthogonal code $S_i(t)$ ($1 \leqq i \leqq X$, $1 \leqq t \leqq N$) should not exceed $\theta_{min}(N)$. Condition 2 expressed by Equation (2) means that the full correlation between an i-th line and an i'-th line of a quasi-orthogonal code should not exceed $\theta_{min}(N)$. Condition 3 expressed by Equation (3) means that a partial correlation should not exceed $$\theta_{\min}\left(\frac{N}{M}\right),$$

when the partial correlation is taken for respective parts $$\frac{N}{M}$$

obtained by dividing, by M, the length N of a k-th line of an orthogonal code and an i-th line of a quasi-orthogonal code.

Here, Condition 1 of Equation (1) represents the full correlation property of a Walsh orthogonal code and a complex quasi-orthogonal code, and means the minimum correlation value that a complex quasi-orthogonal code can have theoretically as an absolute correlation value with a Walsh orthogonal code, wherein $\theta_{min}(N)=\sqrt{N}$. Condition 2 of Equation (2) represents a condition for a full correlation property between complex quasi-orthogonal codes. Condition 3 of Equation (3) represents a partial correlation property between a Walsh orthogonal code and a complex quasi-orthogonal code. Condition 4 of Equation (4) represents a partial correlation property between complex quasi-orthogonal codes.

Figure 2:
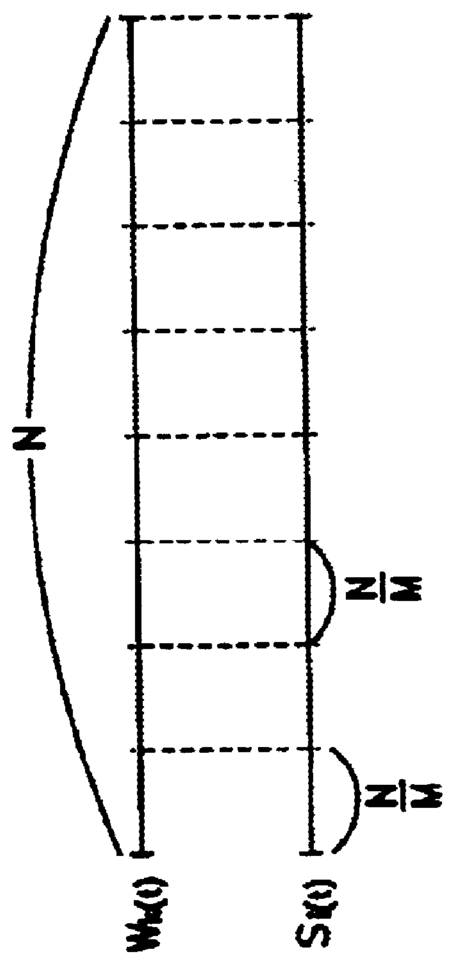
FIG. 2 is a diagram illustrating a partial correlation between a Walsh code and a quasi-orthogonal code.

FIG. 2 is a diagram for explaining a method for taking a partial correlation between a complex quasi-orthogonal code and a Walsh orthogonal code, wherein $M=2^a$ ($0 \leqq a \leqq \log_2 N$). During a data service, if the data rate increases, the N/M parts of the orthogonal code are transmitted. The partial correlation satisfies a correlation property at this moment. For example, when N=256, $$\theta_{\min}\left(\frac{N}{M}\right)$$

values are shown in Table 1. Condition 4 represents a partial correlation between quasi-orthogonal codes, and correlation property values $$\theta_{\min}\left(\frac{N}{M}\right)$$

are identical to those in Condition 3.

TABLE 1

| | | |
|---|---|---|
| N = 256 | M = 1 | $\theta_{\min}(N) = 16$ |
| N = 256 | M = 2 | $\theta_{\min}\left(\frac{N}{M}\right) = 8\sqrt{2}$ |
| N = 256 | M = 4 | $\theta_{\min}\left(\frac{N}{M}\right) = 8$ |
| N = 256 | M = 8 | $\theta_{\min}\left(\frac{N}{M}\right) = 4\sqrt{2}$ |
| N = 256 | M = 16 | $\theta_{\min}\left(\frac{N}{M}\right) = 4$ |
| N = 256 | M = 32 | $\theta_{\min}\left(\frac{N}{M}\right) = 2\sqrt{2}$ |
| N = 256 | M = 64 | $\theta_{\min}\left(\frac{N}{M}\right) = 2$ |

The results of Table 1 can be generally extended. For example, when N=1024 and M=2, for the partial correlation between an orthogonal code of length 1024 and an orthogonal code of length 256, a full correlation bound $\theta_{mim}(N)$ between an orthogonal code of length 512 and a sequence other than the orthogonal code should be considered. Table 2 shows the relationship between the length N and the minimum correlation value $\theta_{mim}(N)$.

TABLE 2

| | |
|---|---|
| N = 2048 | $\theta_{\min}(N) = 32\sqrt{2}$ |
| N = 1024 | $\theta_{\min}(N) = 32$ |
| N = 512 | $\theta_{\min}(N) = 16\sqrt{2}$ |
| N = 256 | $\theta_{\min}(N) = 16$ |
| N = 128 | $\theta_{\min}(N) = 8\sqrt{2}$ |

TABLE 2-continued

| | |
|---|---|
| N = 64 | $\theta_{min}(N) = 8$ |
| N = 32 | $\theta_{min}(N) = 4\sqrt{2}$ |

Sequences satisfying Conditions 1 and 2 include Kasami sequences, Gold sequences and Kerdock sequences. That is, all of these sequence families have a good cross correlation property. A full correlation property for the above sequence families is well known.

However, research has not been conducted to provide a sequence satisfying Condition 3. However, it is very important for the IS-95B standard or the future CDMA system supporting the variable data rate to satisfy Condition 3.

The full correlation of the above sequences is $2^{m+1}$ ($>\sqrt{L}$) for the length $L=2^{2m+1}$ (i.e., the length of odd-numbered exponent of 2). Therefore, the sequences do not have the best correlation for the length $L=2^{2m+1}$. Here, L denotes the length of the sequences.

The present invention provides a device and method for generating sequences expressed in complex numbers so that the correlation becomes $\sqrt{L}$ for the length $L=2^{2m+1}$ and the above conditions are satisfied. In an exemplary embodiment of the present invention, Kerdock sequences are used to generate complex quasi-orthogonal codes.

Figure 5:
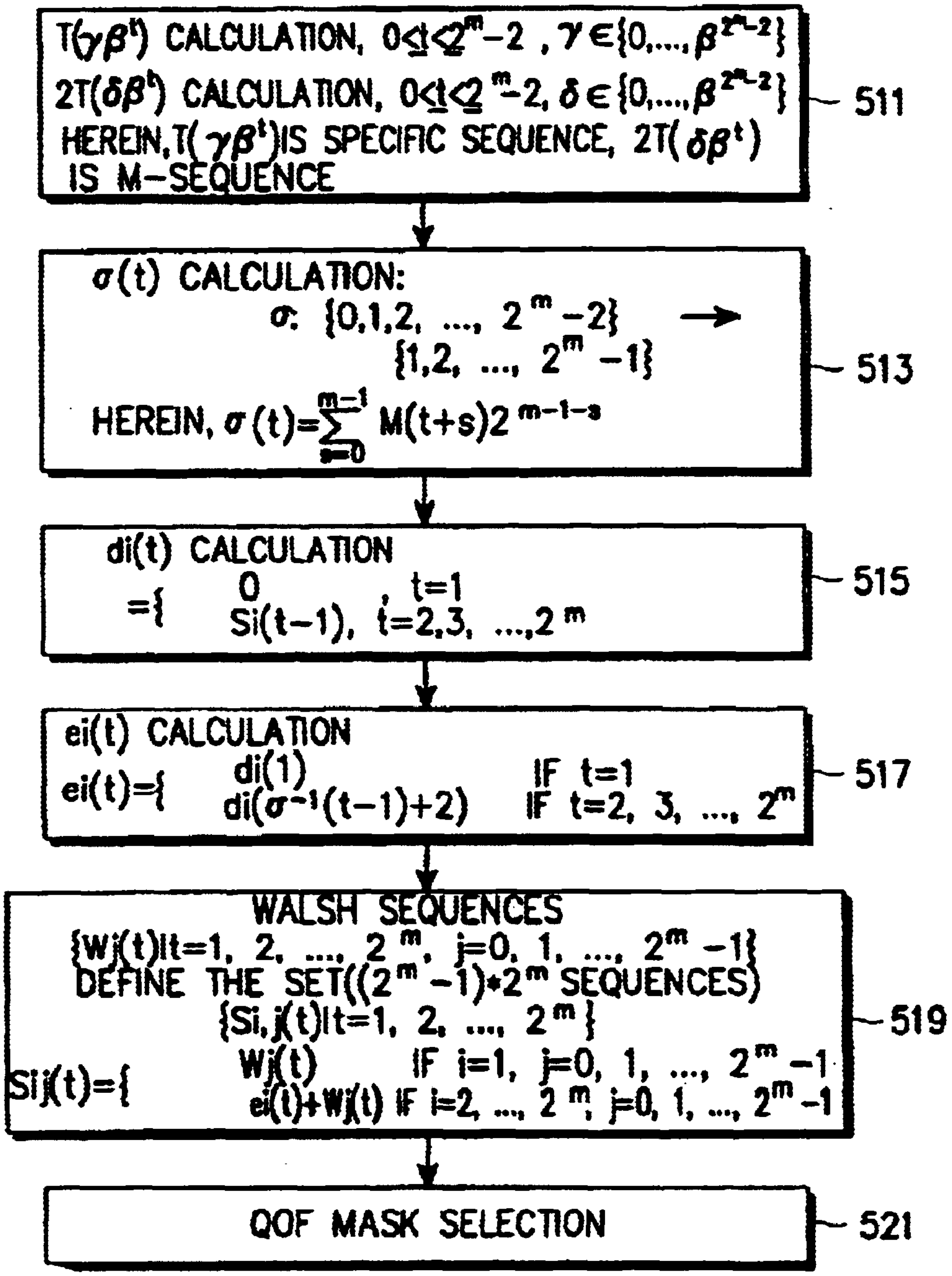
FIG. 5 is a flow diagram illustrating a procedure for generating complex quasi-orthogonal codes according to an embodiment of the present invention.

FIG. 5 illustrates a procedure for generating complex quasi-orthogonal codes for use in a spreading device for a CDMA communication system according to an embodiment of the present invention. Here, a PN sequence is generated from a M-sequence. That is, a Walsh orthogonal code is generated by column permuting the M-sequence.

Referring to FIG. 5, in step 511, an M-sequence and a specific sequence having a good full correlation property are generated to generate a quasi-orthogonal code. In an embodiment of the present invention, Family A, which represents a Kerdock code set generated from Kerdock codes expressed in numbers, is used to generate complex sequences for the above sequences. At this point, there exists homomorphism, H: $n \rightarrow j^n$, ($j=\sqrt{-1}$), corresponding to a complex number set for multiplication in a number set for modulo-4 (hereinafter, referred to as "mod 4" for short) operation. That is, numbers {0,1,2,3} can be expressed as {1,j,−1,−j} in complex numbers. Therefore, after generation of sequences, the generated sequences will undergo conversion in accordance with the homomorphism.

By using a trace function, a binary M-sequence S(t) can be expressed as:

$$S(t)=tr(A\alpha^t) \tag{5}$$

where $tr(a)=a+a^2+a^{2^2}+ \ldots +a^{2^{m-1}}$, $a \in GF(2^m)$, f(x) is a primitive polynomial of Galois field $GF(2^m)$, and $\alpha$ is primitive element which is a root of f(x). (See "Introduction to Finite Fields and Their Applications", Rudolf Lidl & Harald Niederreiter)

Functional values of the above binary formula are 0 and 1, and it is possible to generate a sequence using the trace function in similar manner.

First, in step 511 of FIG. 5, a binary primitive polynomial f(x) of the m-th degree is selected to obtain a quasi-orthogonal code sequence of length $_2{}^m$. A characteristic polynomial g(x) having coefficients is generated by applying Hensel Lift to the binary primitive polynomial f(x), as shown in Equation (6). (See "Finite Rings with Identity", B. R. MacDonald)

$$g(x^2)=(-1)^m f(x)f(-x) \bmod 4 \tag{6}$$

It is possible to construct a Galois ring $GR(4^m)$ using the characteristic polynomial g(x). Further, when $\beta$ is a root of g(x), $\beta=\alpha \bmod \mathbf{2}$. Given $I=\{0,1,\beta,\beta^2, \ldots \beta^{2m-2}\}$, an element a of a Galois ring $GR(4^m)$ can be expressed as $\alpha=\gamma+2\delta$, $\gamma,\delta \in I$. A trace function, which is a linear function, in the Galois ring is expressed as $$T(a) = \sum_{i=0}^{m-1} \gamma^{2^i} + 2\sum_{i=0}^{m-1} \delta^{2^i}.$$

(See "Sequences with Low Correlation", T. Helleseth and P. V. Kumar)

To obtain a sequence S(t) of length $N=2^m-1$, the above formula is expressed as the following Equation (7), which is a general formula of the Kerdock code, by using $\beta$ and trace expression.

$$S(t)=T(\gamma\beta^t)+2T(\delta\beta^t),\ \gamma,\beta \in \{0,1,\beta,\beta^2, \ldots ,\beta^{2m-2}\} \tag{7}$$

where $2T(\delta\beta^t)$ is equal to a value obtained by doubling a binary M-sequence and then applying a mod 4 operation to it. In the embodiment, this sequence portion will be referred to as a M-sequence. An M-sequence can be calculated by substituting 0 or $\beta^i(0 \leqq i \leqq 2^{2m-2})$ for $\delta$, and inserting 0 in a first column. Therefore, in step 511, sequences $S_i(t)=T(\beta^{t+i})$ of length 2m−1 where t=0,1, . . . ,$2^m-2$, and M-sequences $2T(\delta\beta^t)$, which are doubled binary M-sequences, are generated for every i ($0 \leqq i \leqq 2^{m-2}$). This is a process of generating Kerdock codes.

Thereafter, in step 513, the M-sequence is column permuted by performing $$\sigma(t) = \sum_{s=0}^{m-1} (M(t+s))^{2^{m-1-s}}$$

to generate a Walsh code. A column permutation function for the M-sequence is applied to a specific sequence to generate a mask for generating a quasi-orthogonal code. That is, in step 513, when 60 $=\beta \bmod \mathbf{2}$ and $\delta=\beta^r$, $m(t)=tr(a^{(t+r)})$ and a column permutation function $\sigma$ is defined as follows (Definition of column permutation for $T(\gamma\beta^t)$ $\gamma \in \{0,1,\beta,\beta^2, \ldots , \beta^{2m-2}\}$ of Kerdock code):

$$\sigma:\{0,1,2, \ldots ,2^m-2\} \rightarrow \{1,2, \ldots ,2^m-1\}$$

$$\sigma(t) = \sum_{i=0}^{m-1} m(t+i)2^{m-1-i}$$

It is possible to generate $(2^m-1)$ complex sequences of length $2^m$, which simultaneously satisfy Conditions 1 and 2, by inserting "0" at the head of the sequence $T(\gamma\beta^t)$ of length $2^m-1$ in Equation (7) and substituting $\beta^i(0 \leqq i \leqq 2^{2m-2})$ for $\gamma$. Therefore, when $\gamma=\beta^t$, a sequence for $T(\gamma\beta^t)$ will be expressed as $S_i(t)$ in Equation (8) below. Here, $S_i)(t)$ becomes a function of a specific sequence and can be expressed as:

$$K=[S_0(t),S_1(t), \ldots S_{2m-2}(t)] \tag{8}$$

where t=*,0,1,2, . . . ,$2^m-2$, and $S_i(*)=0$.

Thereafter, in step 515, a matrix Q shown in FIG. 3 is generated using sequences of the completed set K of Equation (8). The matrix has $(2^m-1)*2^m$ rows and $2^m$ columns. That is, in step 515, by using $(2^m-1)$ sequences $S_i(t)=T(\beta^{t+i})$, $t=0,1,2, \ldots, 2^m-2$ generated in step 511, a definition is given ("0" is inserted at the head of the sequence $S_i(t)$):

$$[d_i(t) \mid t=1, 2, \ldots, 2^m, \quad i=1, 2, \ldots, 2^m-1]$$

$$d_i(t)=\begin{cases} 0, & \text{if } t=1 \\ S_i(t-1), & \text{if } t=2, 3, \ldots, 2^m \end{cases}$$

Here, it is possible to obtain $(2^m-1)$ sequences of length $2^m$, satisfying Conditions 1 and 2, by applying column permutation to the matrix Q in the same manner as used in column permuting the M-sequence to obtain the Walsh code. Therefore, in step 517, $S_i(t)$ of Equation (7) undergoes column permutation in the same method as used in step 513. That is, in step 517, the sequences generated in step 515 are column permuted according to the column permutation function calculated in step 513. Then, in step 517, new sequences are generated as follows (Column Permutation Process):

$$[e_i(t) \mid t=1, 2, \ldots, 2^m, \quad i=1, 2, \ldots, 2^m-1]$$

$$e_i(t)=\begin{cases} d_i(t), & \text{if } t=1 \\ d_i(\sigma^{-1}(t-1)+2), & \text{if } t=2, 3, \ldots, 2^m \end{cases}$$

The sequence $e_i(t)$ generated in step 517 will be referred to as a quasi-orthogonal mask candidate sequence.

Then, in step 519, another quasi-orthogonal mask candidate sequence satisfying Conditions 1 and 2 is generated by combining (i.e., eXclusive-ORing) the above quasi-orthogonal mask candidate sequence and a Walsh code as shown in FIG. 4. That is, in step 519, quasi-orthogonal code representatives are generated using the sequences generated in step 517, as follows (Quasi-orthogonal Code Candidate Generation):

$$[S_{ij}(t) \mid t=1,2, \ldots, 2^m]$$

$$S_{ij}(t)=e_i(t)+2W_j(t) \pmod 4), \; i=0,1,2, \ldots, 2^m-2, \; j=0,1, \ldots, 2^m-1$$

It is assumed herein that $[W_j(t) \mid t=1,2, \ldots, 2^m, j=0,1, \ldots, 2^m-1]$ means a Walsh sequence which is an orthogonal code, and is represented in symbols of "0" and "1". In the above formula, $e_i(t)$ is $T(\gamma\beta^t)$ of Equation (7), which is column permuted in accordance with the column permutation formula defined in step 513. Therefore, it is possible to obtain $(2^m-1)*2^m$ quasi-orthogonal code candidates by performing step 519.

Thereafter, in step 521, the sequences satisfying Condition 3 are selected from the $(2^m-1)*2^m$ quasi-orthogonal code candidates and then, a used mask candidate for the quasi-orthogonal code is selected as a mask for the quasi-orthogonal code. That is, after the process of step 519, those satisfying Condition 3 are selected from the finally calculated quasi-orthogonal code representatives $S_{ij}(t)$. For selection of the sequences, a full correlation for every Walsh code and length is calculated to determine whether Condition 3 is satisfied, and the mask candidate is selected as a mask when a partial correlation is satisfied for every Walsh code.

For example, when the length of an orthogonal code is 128, a partial correlation is first calculated for every Walsh code having a partial length of 64 and then it is examined whether the partial correlation exceeds 8. If the partial correlation does not exceed 8, the mask candidate is not selected as a mask. Otherwise, if the condition is satisfied, a partial correlation is calculated again for a partial length 32 with respect to this mask candidate. Thereafter, it is determined whether the partial correlation exceeds $4\sqrt{2}$. If the partial correlation does not exceed $4\sqrt{2}$, the mask candidate is not selected as a mask. Otherwise, if the condition is satisfied, the same operation is performed on the next length. After performing the above operation on the partial lengths of up to 4, the mask candidates which have passed the above conditions are selected as quasi-orthogonal code mask candidates satisfying Conditions 1 to 3.

A detailed description will be now made regarding the procedure for generating quasi-orthogonal code candidate sequences with reference to FIG. 5, by way of example.

Herein, it is assumed that $f(x)=x^3+x+1$ is used for the binary primitive polynomial. When the binary primitive polynomial $f(x)=x^3+x+1$ undergoes Hensel Lift in accordance with Equation (6), a characteristic polynomial having coefficients becomes $g(x^2)=(-1^3)(x^3+x+1)(-x^3-x+1)(\text{mod } 4)$. This can be rewritten as $g(x)=x^3+2x^2+x+3$.

Accordingly, in step 511, let the root of g(x) be β to determine specific sequences. That is, $\beta^3+2\beta^2+\beta+3=0$. For convenience, $\beta, \beta^2, \beta^3, \beta^4, \beta^5, \beta^6, \beta^7$ will he first determined, as follows.

$$\beta=\beta$$

$$\beta^2=\beta^2$$

$$\beta^3=2\beta^2+3\beta+1$$

$$\beta^4=2\beta^3+3\beta^2+\beta 2(2\beta^2+3\beta+1)+3\beta^2+2\beta=\beta^2+3\beta+2$$

$$\beta^5=3\beta^3+3\beta^2+2\beta=3(2\beta^2+3\beta+1)+3\beta^2+2\beta=\beta^2+3\beta+3$$

$$\beta^6=\beta^3+3\beta^2+3\beta=(2\beta^2+3\beta+1)+3\beta^2+3\beta=\beta^2+2\beta+1$$

$$\beta^7=\beta^3+2\beta^2+\beta=(2\beta^2+3\beta+1)+2\beta^2+\beta=1$$

When $\gamma=\beta^0=1$, $T(\gamma\beta^t)=T(\beta^t)$ will be determined as follows.

$$\text{for } t=0, \; T(1)=\sum_{i=0}^{2}\beta^{2^i}=1+1+1=3$$

$$\text{for } t=1, \; T(\beta)=\sum_{i=0}^{2}\beta^{2^i}=\beta+\beta^2+\beta^4=2$$

$$\text{for } t=2, \; T(\beta^2)=\sum_{i=0}^{2}(\beta^2)^{2^i}=\beta^2+\beta^4+\beta^8=\beta^2+\beta^4+\beta=2$$

$$\text{for } t=3, \; T(\beta^3)=\sum_{i=0}^{2}(\beta^3)^{2^i}=\beta^3+\beta^6+\beta^{12}=\beta^3+\beta^6+\beta^5=1$$

$$\text{for } t=4, \; T(\beta^4)=\sum_{i=0}^{2}(\beta^4)^{2^i}=\beta^4+\beta^8+\beta^{16}=\beta^4+\beta+\beta^2=2$$

$$\text{for } t=5, \; T(\beta^5)=\sum_{i=0}^{2}(\beta^5)^{2^i}=\beta^5+\beta^{10}+\beta^{20}=\beta^5+\beta^3+\beta^6=1$$

$$\text{for } t=6, \; T(\beta^6)=\sum_{i=0}^{2}(\beta^6)^{2^i}=\beta^6+\beta^{12}+\beta^{24}=\beta^6+\beta^5+\beta^3=1$$

In addition, when $\gamma=\beta^1=\gamma$, $T(\gamma\beta^t)$ will be determined as follows. Then, $T(\beta)=T(\mathbf{1})$ for t=0, $T(\beta^2)=T(\mathbf{1})$ for t=1, $T(\beta^3)=T(\mathbf{1})$ for t=2, $T(\beta^4)=T(\mathbf{1})$ for t=3, $T(\beta^5)=T(\mathbf{1})$ for t=4, $T(\beta^6)=T(\mathbf{1})$ d for t=5 and $T(\beta^7)=T(\mathbf{1})$ for T=6, which is equivalent to shifting once the sequences determined when $\gamma=\beta^0=1$.

In this manner, a sequence 3221211 and its shifted sequence can be determined. A sequence shifted i times will be referred to as $S_i$. In addition, it is possible to determine 1001011 as an associated M-sequence.

In step 513, it is possible to calculate a column permutation function for converting an M-sequence to a Walsh code in accordance with a formula $$\sigma(t) = \sum_{s=0}^{m-1} m(t+s)2^{m-1-s}$$

using the M-sequence 1001011. Here, the formula σ(t) is equivalent to grouping the M-sequence by three (3) consecutive terms and converting them to decimal numbers. That is, the first three terms are 100, which can converted to decimal number 4; the second three terms are 001, which can be converted to decimal number 1; the third three terms are 010, which can be converted to decimal number 2; the fourth three terms are 101, which can be converted to decimal number 3; the fifth three terms are 011, which can be converted to decimal number 3; the fourth three terms are 101, which can be converted to decimal number 7; and the seventh three terms are 011, which can be converted to decimal number 6. The following results can be obtained using the formula $$\sigma(t) = \sum_{s=0}^{m-1} m(t+s)2^{m-1-s}.$$

for $t=0$, $$\sigma(0) = \sum_{s=0}^{2} m(t+s)2^{2-s} = 4\times m(0) + 2\times m(1) + m(2) + (100)_2 = 4$$

for $t=1$, $$\sigma(1) = \sum_{s=0}^{2} m(t+s)2^{2-s} = 4\times m(1) + 2\times m(2) + m(3) + (001)_2 = 1$$

for $t=2$, $$\sigma(2) = \sum_{s=0}^{2} m(t+s)2^{2-s} = 4\times m(2) + 2\times m(3) + m(4) + (010)_2 = 2$$

for $t=3$, $$\sigma(3) = \sum_{s=0}^{2} m(t+s)2^{2-s} = 4\times m(3) + 2\times m(4) + m(5) + (101)_2 = 5$$

for $t=4$, $$\sigma(4) = \sum_{s=0}^{2} m(t+s)2^{2-s} = 4\times m(4) + 2\times m(5) + m(6) + (011)_2 = 3$$

for $t=5$, $$\sigma(5) = \sum_{s=0}^{2} m(t+s)2^{2-s} = 4\times m(5) + 2\times m(6) + m(7) + (111)_2 = 7$$

for $t=6$, $\sigma(6) = \sum_{s=0}^{2} m(t+s)2^{2-s} = 4\times m(6) + 2\times m(7) + m(8) + (110)_2 = 6$ The calculated column permutation functions are shown in Table 3A.

TABLE 3A

| t | Three Consecutive Terms | σ (t) |
|---|---|---|
| 0 | 100 | 4 |
| 1 | 001 | 1 |
| 2 | 010 | 2 |
| 3 | 101 | 5 |
| 4 | 011 | 3 |
| 5 | 111 | 7 |
| 6 | 110 | 6 |

In step 515, "0" is added at the head of every sequence determined in step 511. With regard to the expression of $d_i(t)$ in accordance with $S_i(t)$, when i=0, $d_0(t)$ is the sequence $S_0(t)$, at the head of which "0" is added, determined in step 511 for $\gamma=\beta^0-1$. That is, when $S_0(\mathbf{0})=3$, $S_0(\mathbf{1})=2$, $S_0(\mathbf{2})=2$, $S_0(\mathbf{3})=1$, $S_0(\mathbf{4})=2$, $S_0(\mathbf{5})=1$ and $S_0(\mathbf{6})=1$ as determined in step 511, $d_0(t)$ is determined such that $d_0(\mathbf{0})$ representing the foremost bit is always "0" and $d_0(\mathbf{1})$ to $d_0(\mathbf{7})$ are as shown in Table 3B.

TABLE 3B

| | | | |
|---|---|---|---|
| $d_0(1)$ = | $S_0(1\text{-}1)$ = | $S_0(0)$ = | 3 |
| $d_0(2)$ = | $S_0(2\text{-}1)$ = | $S_0(1)$ = | 2 |
| $d_0(3)$ = | $S_0(3\text{-}1)$ = | $S_0(2)$ = | 2 |
| $d_0(4)$ = | $S_0(4\text{-}1)$ = | $S_0(3)$ = | 1 |
| $d_0(5)$ = | $S_0(5\text{-}1)$ = | $S_0(4)$ = | 2 |
| $d_0(6)$ = | $S_0(6\text{-}1)$ = | $S_0(5)$ = | 1 |
| $d_0(7)$ = | $S_0(7\text{-}1)$ = | $S_0(6)$ = | 1 |

In addition, when i=1, $d_1(t)$ is the sequence $S_1(t)$, at the head of which "0" is added, determined in step 511 for $\gamma=\beta^1=\beta$. That is, when $S_1(\mathbf{0})=2$, $S_1(\mathbf{1})=2$, $S_1(\mathbf{2})=1$, $S_1(\mathbf{3})=2$, $S_1(\mathbf{4})=1$, $S_1(\mathbf{5})=1$ and $S_1(\mathbf{6})=3$ as determined in step 511, $d_1(t)$ is determined such that $d_1(\mathbf{0})$ representing the foremost bit is always "0" and $d_i(\mathbf{1})$ to $d_1(7)$ are as shown in Table 3C.

TABLE 3C

| | | | |
|---|---|---|---|
| $d_1(1)$ = | $S_1(1\text{-}1)$ = | $S_1(0)$ = | 2 |
| $d_1(2)$ = | $S_1(2\text{-}1)$ = | $S_1(1)$ = | 2 |
| $d_1(3)$ = | $S_1(3\text{-}1)$ = | $S_1(2)$ = | 1 |
| $d_1(4)$ = | $S_1(4\text{-}1)$ = | $S_1(3)$ = | 2 |
| $d_1(5)$ = | $S_1(5\text{-}1)$ = | $S_1(4)$ = | 1 |
| $d_1(6)$ = | $S_1(6\text{-}1)$ = | $S_1(5)$ = | 1 |
| $d_1(7)$ = | $S_1(7\text{-}1)$ = | $S_1(6)$ = | 3 |

In step 517, the column shifted sequences are column permutated with the above column permutation functions. First, the column shifted sequences are shown in Table 3D.

TABLE 3D

| $c_1$ | $c_2$ | $c_3$ | $c_4$ | $c_5$ | $c_6$ | $c_7$ |
|---|---|---|---|---|---|---|
| 3 | 2 | 2 | 1 | 2 | 1 | 1 |
| 1 | 3 | 2 | 2 | 1 | 2 | 1 |
| 1 | 1 | 3 | 2 | 2 | 1 | 2 |
| 2 | 1 | 1 | 3 | 2 | 2 | 1 |
| 1 | 2 | 1 | 1 | 3 | 2 | 2 |
| 2 | 1 | 2 | 1 | 1 | 3 | 2 |
| 2 | 2 | 1 | 2 | 1 | 1 | 3 |

In Table 3D, $c_i$ denotes an i-th column. For example, $c_1$ denotes a first column and $c_2$ a second column. If column permuted with the column permutation functions determined in step 513, the sequences of Table 3D become as follows.

TABLE 3E

| $c_4$ | $c_1$ | $c_2$ | $c_5$ | $c_3$ | $c_7$ | $c_6$ |
|---|---|---|---|---|---|---|
| 1 | 3 | 2 | 2 | 2 | 1 | 1 |
| 2 | 1 | 3 | 1 | 2 | 1 | 2 |
| 2 | 1 | 1 | 2 | 3 | 2 | 1 |
| 3 | 2 | 1 | 2 | 1 | 1 | 2 |
| 1 | 1 | 2 | 3 | 1 | 2 | 2 |
| 1 | 2 | 1 | 1 | 2 | 2 | 3 |
| 2 | 2 | 2 | 1 | 1 | 3 | 1 |

Therefore, sequences of length 8 shown in Table 3F are generated; by adding "0" at the head of every sequence determined by column permuting the column shifted sequences with the column permutation functions. The generated sequences become quasi-orthogonal code mask representatives of length 8.

TABLE 3F

| | | | | | | | |
|---|---|---|---|---|---|---|---|
| 0 | 1 | 3 | 2 | 2 | 2 | 1 | 1 |
| 0 | 2 | 1 | 3 | 1 | 2 | 1 | 2 |
| 0 | 2 | 1 | 1 | 2 | 3 | 2 | 1 |
| 0 | 3 | 2 | 1 | 2 | 1 | 1 | 2 |
| 0 | 1 | 1 | 2 | 3 | 1 | 2 | 2 |

TABLE 3F-continued

| | | | | | | | |
|---|---|---|---|---|---|---|---|
| 0 | 1 | 2 | 1 | 1 | 2 | 2 | 3 |
| 0 | 2 | 2 | 2 | 1 | 1 | 3 | 1 |

The quasi-orthogonal code sequences generated in the process of FIG. 5 are determined by the mask function $e_i(t)$. That is, when the mask function $e_i(t)$ satisfies Conditions 1 to 3, it is possible to obtain $(2^m-1)$ complex orthogonal codes. Therefore, if there exist k masks satisfying Conditions 1 to 3, it is possible to obtain $K\times2^m$ complex quasi-orthogonal codes. Table 4 shows the number of[]the complex quasi-orthogonal codes according to the M-sequences. Table 5 shows the mask function $e_i(t)$ for the complex quasi-orthogonal codes determined for m=6. Tables 6 to 8 show the mask function $e_i(t)$ for the complex quasi-orthogonal codes determined for m=7, m=8 and m=9, respectively. Here, 0 denotes 1, 1 denotes j, 2 denoted −1 and 3 denotes −j.

TABLE 4

| m | characteristic polynomial | # of Quasi-orthogonal sequences |
|---|---|---|
| 6 | 1002031 | 4*64 |
| 7 | 10020013 | 4*128 |
| 8 | 102231321 | 4*256 |

TABLE 5

| | $f(X) = 1 + X + X^6$, $g(X) = 1 + 3X + 2X^3 + X^6$ | | | | | | | |
|---|---|---|---|---|---|---|---|---|
| e1 | 00131120 | 22131102 | 20113122 | 20331322 | 11200013 | 33200031 | 31222011 | 31000211 |
| e2 | 03010121 | 21230121 | 10301210 | 10303032 | 23210323 | 23212101 | 30101012 | 12321012 |
| e3 | 00021311 | 31112202 | 33132000 | 02001113 | 02223313 | 11132022 | 13112220 | 00203111 |
| e4 | 01032101 | 12103212 | 30323212 | 23212101 | 01210301 | 30103230 | 30101012 | 01212123 |

TABLE 6

| | $f(X) = 1 + X + X^7$, $g(X) = 3 + X + 2X^4 + X^7$ | | | | | | | |
|---|---|---|---|---|---|---|---|---|
| e1 | 03233010 | 01031012 | 32302321 | 30100323 | 12320323 | 32300103 | 23211012 | 03231232 |
| | 30100323 | 10120103 | 01031012 | 21011232 | 03231232 | 01033230 | 32300103 | 30102101 |
| e2 | 01033230 | 10300121 | 12102123 | 21013010 | 12320323 | 03013032 | 01211030 | 32300103 |
| | 03011210 | 30100323 | 32302321 | 23031030 | 10302303 | 23213230 | 21011232 | 30322123 |
| e3 | 02003331 | 22021333 | 13110002 | 33132000 | 31332220 | 33132000 | 20221113 | 22021333 |
| | 02001113 | 00201333 | 31330002 | 33130222 | 31330002 | 11312000 | 02001113 | 22023111 |
| e4 | 02221113 | 02001131 | 33130200 | 11132000 | 00203133 | 22201333 | 13330002 | 13110020 |
| | 11130222 | 33132022 | 02003313 | 02223331 | 31330020 | 31110002 | 00021333 | 22023133 |

TABLE 7

| | $f(X) = 1 + X^2 + X^3 + X^4 + X^8$<br>$g(X) = 1 + 2X + 3X^2 + X^3 + 3X^4 + 2X^5 + 2X^6 + X^8$ | | | | | | | |
|---|---|---|---|---|---|---|---|---|
| e1 | 03101021 | 23121201 | 21321021 | 23123023 | 03323221 | 23303001 | 21103221 | 23301223 |
| | 23123023 | 03103203 | 01303023 | 03101021 | 23301223 | 03321003 | 01121223 | 03323221 |
| | 30232312 | 32030310 | 12012312 | 32032132 | 30010112 | 32212110 | 12230112 | 32210332 |
| | 10210310 | 12012312 | 32030310 | 12010130 | 10032110 | 12230112 | 32212110 | 12232330 |
| e2 | 00023313 | 20221333 | 11132202 | 31330222 | 33132220 | 31112022 | 00201113 | 02221311 |
| | 20223111 | 00021131 | 13110222 | 33312202 | 31110200 | 33130002 | 20001311 | 22021113 |
| | 11132202 | 31330222 | 00023313 | 20221333 | 00201113 | 02221311 | 33132220 | 31112022 |
| | 31332000 | 11130020 | 02001333 | 22203313 | 02223133 | 00203331 | 13332022 | 11312220 |
| e3 | 02001311 | 31330200 | 02223111 | 31112000 | 22023313 | 11312202 | 22201113 | 11130002 |
| | 22011131 | 33132202 | 22203331 | 33310002 | 20221311 | 31332022 | 20003111 | 31110222 |

TABLE 7-continued

| | $f(X) = 1 + X^2 + X^3 + X^4 + X^8$<br>$g(X) = 1 + 2X + 3X^2 + X^3 + 3X^4 + 2X^5 + 2X^6 + X^8$ | | | | | | | |
|---|---|---|---|---|---|---|---|---|
| | 11132220 | 22203331 | 33132202 | 00203313 | 31110222 | 02221333 | 13110200 | 20221311 |
| | 13330222 | 02223111 | 31330200 | 20223133 | 11130002 | 00023331 | 33130020 | 22023313 |
| e4 | 02011210 | 12322101 | 21231210 | 12320323 | 32122303 | 01033230 | 32120121 | 23213230 |
| | 23033212 | 10122321 | 23031030 | 32302321 | 12100301 | 03233010 | 30320301 | 03231232 |
| | 12322101 | 21233032 | 30102101 | 21231210 | 01033230 | 10300121 | 01031012 | 32120121 |
| | 32300103 | 23033212 | 32302321 | 01213212 | 21011232 | 12100301 | 03231232 | 12102123 |

TABLE 8

| | $f(X) = 1 + X^4 + X^9$, $g(X) = 3 + 2X^2 + 3X^4 + X^9$ | | | | | | | |
|---|---|---|---|---|---|---|---|---|
| e1 | 03232123 | 01212321 | 01032303 | 21230323 | 30103032 | 10301012 | 32303212 | 30323010 |
| | 21232101 | 01030121 | 01210103 | 03230301 | 30321232 | 32301030 | 10303230 | 30101210 |
| | 30323010 | 10121030 | 10301012 | 12321210 | 21230323 | 23210121 | 01212321 | 21010301 |
| | 30101210 | 32121012 | 32301030 | 12103010 | 03230301 | 23032321 | 01030121 | 03010323 |
| | 30323010 | 32303212 | 32123230 | 12321210 | 03012101 | 23210121 | 01212321 | 03232123 |
| | 30201210 | 10303230 | 10123212 | 12103010 | 21012123 | 23032321 | 01030121 | 21232101 |
| | 21010301 | 01212321 | 01032303 | 03012101 | 30103032 | 32123230 | 10121030 | 30323010 |
| | 03010323 | 01030121 | 01210103 | 21012123 | 30321232 | 10123212 | 32121012 | 30101210 |
| e2 | 02221333 | 02003133 | 33130020 | 111300023 | 1112000 | 31330200 | 22021131 | 00021113 |
| | 20223133 | 20001333 | 33310002 | 11310020 | 31332022 | 31110222 | 00023331 | 22023313 |
| | 00203313 | 22201113 | 13332000 | 13110200 | 33132202 | 11132220 | 02223111 | 02001311 |
| | 00021113 | 22021131 | 31330200 | 31112000 | 11130002 | 33130020 | 02003133 | 02221333 |
| | 31112000 | 31330200 | 22021131 | 00021113 | 02221333 | 02003133 | 33130020 | 11130002 |
| | 13110200 | 13332000 | 22201113 | 00201131 | 02001311 | 02223111 | 11132220 | 33132202 |
| | 33132202 | 11132220 | 02223111 | 02001311 | 00201131 | 22201113 | 13332000 | 13110200 |
| | 33312220 | 11312202 | 20221311 | 20003111 | 22203331 | 22023313 | 13112022 | 13330222 |
| e3 | 01212321 | 03232123 | 32301030 | 30321232 | 32121012 | 30101210 | 23210121 | 21230323 |
| | 30101210 | 10303230 | 03012101 | 23210121 | 21010301 | 01212321 | 30321232 | 10123212 |
| | 30103032 | 10301012 | 21232101 | 01030121 | 03230301 | 23032321 | 30323010 | 10121030 |
| | 01210103 | 03230301 | 10121030 | 12101232 | 10301012 | 12321210 | 23212303 | 21232101 |
| | 23212303 | 21232101 | 32123230 | 30103032 | 32303212 | 30323010 | 01210103 | 03230301 |
| | 30323010 | 10121030 | 21012123 | 01210103 | 03010323 | 23212303 | 30103032 | 10301012 |
| | 12103010 | 32301030 | 21010301 | 01212321 | 03012101 | 23210121 | 12323032 | 32121012 |
| | 01032303 | 03012101 | 32121012 | 30101210 | 32301030 | 30321232 | 23030103 | 21010301 |
| e4 | 00203331 | 02003111 | 13110222 | 11310002 | 31112022 | 33312202 | 22201131 | 20001311 |
| | 33132220 | 31332000 | 20221333 | 22021113 | 20001311 | 22201131 | 33312202 | 31112022 |
| | 11310002 | 31332000 | 20221333 | 00203331 | 20001311 | 00023313 | 11130020 | 31112022 |
| | 22021113 | 02003111 | 13110222 | 33132220 | 31112022 | 11130020 | 00023313 | 20001311 |
| | 22023331 | 20223111 | 13112000 | 11312220 | 31110200 | 33310020 | 00021131 | 02221311 |
| | 33130002 | 31330222 | 02001333 | 00201113 | 02221311 | 00021131 | 33310020 | 31110200 |
| | 33130002 | 13112000 | 20223111 | 00201113 | 20003133 | 00021131 | 33310020 | 13332022 |
| | 22023331 | 02001333 | 31330222 | 11312220 | 13332022 | 33310020 | 00021131 | 20003133 |

As described above, when the system runs short of orthogonal codes, it is possible to increase the channel capacity by using the quasi-orthogonal codes generated according to the present invention. In this case, there occurs the least interference with the Walsh orthogonal codes, providing a fixed correlation value. For example, for N=64, the correlation value between a quasi-orthogonal code and a Walsh orthogonal code is either 8 or −8. In addition, for N=256, a partial correlation value is also either 8 or −8 (during the length N=64). This means that it is possible to accurately predict the interference, providing excellent characteristics.

Therefore, as can be appreciated from the foregoing process, to obtain a complex quasi-orthogonal code of length $2^m$, a characteristic polynomial f(X) of the m-th degree is initially selected. Thus, to obtain a complex quasi-orthogonal code of length $128=2^7$, a characteristic polynomial of the $7^{th}$ degree is first selected. At this point, to obtain a sequence of length 128, the characteristic polynomial should be a primitive polynomial, and there are 18 primitive polynomials of the $7^{th}$ degree in total. Table 9 shows mask functions for every complex quasi-orthogonal sequences of length 128 satisfying Conditions 1 to 3 for the 18 primitive polynomials of the $7^{th}$ degree, respectively. Further, in the Tables below, the results for Condition 4 are shown together. Here, "e1+e2" refers to the partial correlation between a first mask and a second mask, and the numerals on the right side of it represent the lengths of the portions where the first and second masks satisfy Condition 4. For example, in Table 9, "e1+e2: 64, 128" means that a partial correlation between quasi-orthogonal codes generated respectively with e1 and e2 masks satisfies Condition 4 only for the partial lengths 64 and 128. Similarly, "e1+e3: 32, 64, 128" means that a partial correlation between quasi-orthogonal codes generated respectively with e1 and e3 masks satisfies Condition 4 only for the partial lengths 32, 64 and 128. Therefore, it can be understood that the partial correlation property becomes better, as the numerals and the kinds of the partial lengths satisfying the partial correlation condition increase more in number. Further, it can be noted from following tables that the partial correlation between the quasi-orthogonal sequences depends on the characteristic polynomials. Therefore, it is preferable to use the characteristic polynomials which generate the quasi-orthogonal codes having a good partial correlation between the quasi-orthogonal sequences.

TABLE 9

$f(X) = 1 + X + X^2 + X^3 + X^5 + X^6 + X^7$
$g(X) = 3 + 3X + X^2 + X^3 + 2X^4 + 3X^5 + X^6 + X^7$

| | | | | | | | | |
|---|---|---|---|---|---|---|---|---|
| e1 | 00021311 | 31112202 | 00021311 | 13330020 | 33130222 | 02003331 | 11312000 | 02003331 |
| | 13332202 | 00023133 | 31110020 | 00023133 | 20223331 | 33132000 | 20223331 | 11310222 |
| e2 | 02113122 | 33022213 | 00313302 | 31222033 | 20333122 | 33020031 | 00311120 | 13002033 |
| | 02111300 | 33020031 | 22133302 | 13002033 | 02113122 | 11200031 | 00313302 | 13000211 |
| e3 | 03010323 | 10301012 | 30321232 | 23030103 | 32123230 | 21232101 | 23030103 | 30321232 |
| | 21010301 | 32301030 | 12321210 | 01030121 | 32301030 | 21010301 | 23212303 | 30103032 |
| e4 | 01033032 | 03011012 | 21233230 | 01033032 | 01213010 | 21013212 | 03231030 | 01213010 |
| | 01211232 | 03233212 | 03233212 | 23033010 | 23213032 | 03013230 | 03013230 | 01031210 |

| | |
|---|---|
| e1 + e2 | 8, 16, 64, 128 |
| e1 + e3 | 8, 16, 32, 64, 128 |
| e1 + e4 | 16, 32, 64, 128 |
| e2 + e3 | 4, 8, 16, 64, 128 |
| e2 + e4 | 4, 8, 32, 64, 128 |
| e3 + e4 | 16, 32, 128 |

In using mask functions for complex quasi-orthogonal sequences of length 128 as shown in Table 9, it is also possible to use $e_i+W_k$ as complex quasi-orthogonal sequence masks instead of the above mask functions $e_i$. The complex quasi-orthogonal sequences generated by $e_i+W_k$ are equal to the complex quasi-orthogonal sequences generated by $e_i$. Therefore, the number of the masks which can be actually used, is $128\times128\times128\times128=128^4$ for the respective characteristic polynomials.

In this method, there exist 16 primitive polynomials of the $8^{th}$ degree; Table 10 below shows mask functions for every complex quasi-orthogonal sequences of length 256 satisfying the three correlation conditions for the 16 primitive polynomials of the $8^{th}$ degree, respectively. Further, in using mask functions for complex quasi-orthogonal sequences of length 256, it is also possible to use $e_i+W_k$ as complex quasi-orthogonal sequence masks instead of the above mask functions $e_i$. At this point, the complex quasi-orthogonal sequences generated by $e_i+W_k$ are equal to the complex quasi-orthogonal sequences generated by $e_i$. Therefore, the number of the masks which can be actually used, is $256\times256\times256\times256=256^4$ for the respective characteristic polynomials.

TABLE 10

$f(X) = 1 + X^3 + X^5 + X^7 + X^8$
$g(X) = 1 + 3X^3 + X^5 + 2X^6 + 3X^7 + X^8$

| | | | | | | | | |
|---|---|---|---|---|---|---|---|---|
| e1 | 03233212 | 01211232 | 32300301 | 30322321 | 21011030 | 23033010 | 32300301 | 30322321 |
| | 32122101 | 12322303 | 21233230 | 01033032 | 32122101 | 12322303 | 03011012 | 23211210 |
| | 12102321 | 32302123 | 23031232 | 03231030 | 12102321 | 32302123 | 01213010 | 21013212 |
| | 01031210 | 03013230 | 12320121 | 10302101 | 23213032 | 21231012 | 12320121 | 10302101 |
| e2 | 02332213 | 13221120 | 00130211 | 11023122 | 22130233 | 33023100 | 20332231 | 31221102 |
| | 02330031 | 13223302 | 22310211 | 33203122 | 00310233 | 11203100 | 20330013 | 31223320 |
| | 20112213 | 13223302 | 22310211 | 11021300 | 22132011 | 11203100 | 20330013 | 13001102 |
| | 02332213 | 31003302 | 22312033 | 11023122 | 22130233 | 11201322 | 02110013 | 31221102 |
| e3 | 03323001 | 10210130 | 23123203 | 30010332 | 12230332 | 23121021 | 32030130 | 03321223 |
| | 12012132 | 23303221 | 32212330 | 03103023 | 21323023 | 32210112 | 01123221 | 12010310 |
| | 01123221 | 12010310 | 21323023 | 32210112 | 10030112 | 21321201 | 30230310 | 01121003 |
| | 32030130 | 03321223 | 12230332 | 23121021 | 01301021 | 12232110 | 21101223 | 32032312 |
| e4 | 02332213 | 02112231 | 11023122 | 11203100 | 13223302 | 31221102 | 00132033 | 22130233 |
| | 11021300 | 33023100 | 02330031 | 20332231 | 22312033 | 22132011 | 31003302 | 31223320 |
| | 31223320 | 13221120 | 00310233 | 22312033 | 20332231 | 20112213 | 11201322 | 11021300 |
| | 00312011 | 00132033 | 31221102 | 31001120 | 33021322 | 11023122 | 02112231 | 20110031 |

| | |
|---|---|
| e1 + e2 | 4, 16, 32, 64, 128, 256 |
| e1 + e3 | 4, 8, 32, 128, 256 |
| e1 + e4 | 4, 256 |
| e2 + e3 | 4, 16, 32, 64, 128, 256 |
| e2 + e4 | 64, 256 |
| e3 + e4 | 4, 32, 256 |

The mask values in Table 10 are expressed in numbers. Further, the mask values can be expressed as complex numbers, wherein "0" represents "1", "1" represents "j", "2" represents "−1" and "3" represents "−j". Therefore, it is noted that the complex numbers can be expressed with 1, j, −1 and −j. Actually, however, in an IS-95 CDMA communication system, complex numbers are expressed with "1+j". "−1+1", "−1−j" and "1−j".

Figure 9:
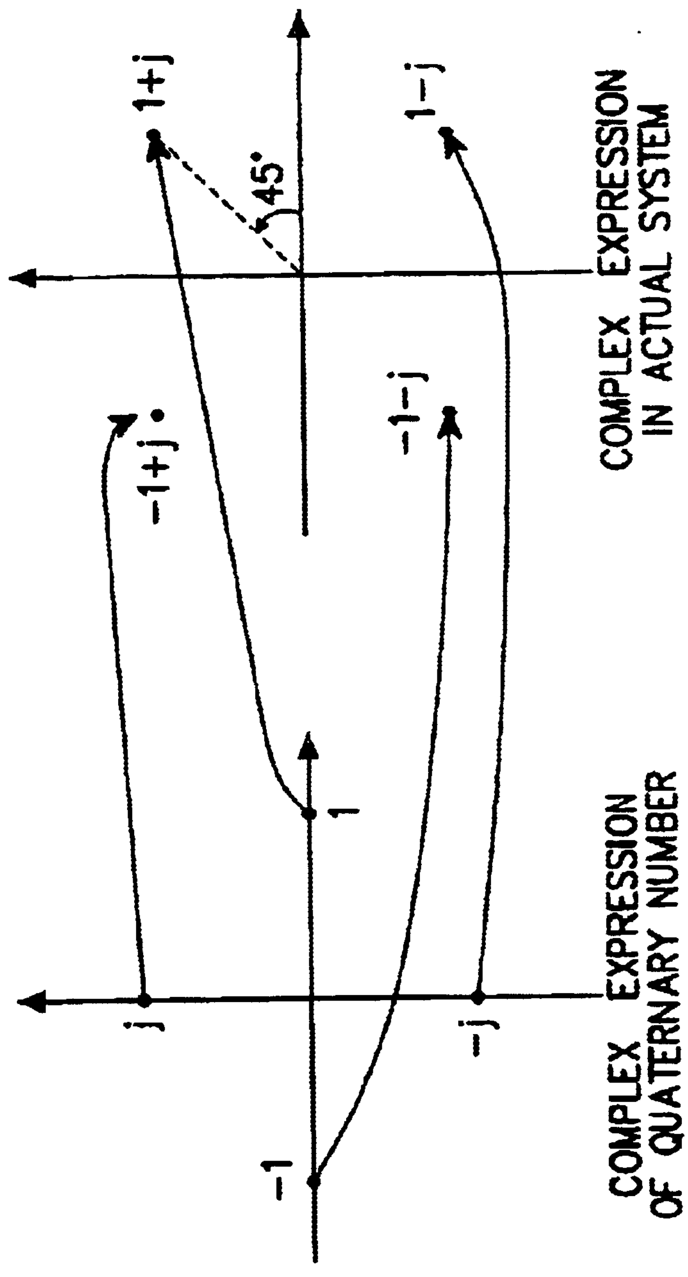
FIG. 9 is a diagram comparing the complex expression for numbers and the complex expression for signal transmission in an actual system on a complex plane.

FIG. 9 compares the complex expression for numbers on the left and the complex expression for signal transmission in an actual system on the right on a complex plane. To convert mask values into the complex expressions used in the actual system, "1+j" is transmitted for "0", "−1+j" for "1", "−1−j" for "2" and "1−j" for 3. This relationship is equivalent to rotating the complex expression of 1, j, −1 and −j by 45°, and can be obtained by multiplying the complex expression by "1+j". By using the above relationship, the mask values can be converted to the complex expression of "1+j", "−1+1", "1−j" and "1−j", and they can be divided into a real part I and an imaginary part Q. Tables 11 and 12 below express the mask values of Tables 9 and 10 in hexadecimal values divided into the real part I and the imaginary part Q. In particular, Tables 9 and 10 show the good partial correlation property of Condition 4 for the full lengths 128 and 256, respectively.

TABLE 11

$f(X) = 1 + X^3 + X^5 + X^7 + X^8$
$g(X) = 1 + 3X^3 + X^5 + 2X^6 + 3X^7 + X^8$

| | | |
|---|---|---|
| e1 | I | 277d411bd882411b7dd8e4417dd81bbeeb4eBd28eb4e72d74e14d78d1ebd78d |
| | Q | 7d27e4be82d8e4bed87dbe1bd87d41e44eebd7724eeb288d144e7228ebb17228 |
| e2 | I | 4ebe27d7e4148d7d41b1d72714e48272beb1d7d8ebe4828d4e41d8d7e4eb727d |
| | Q | 7d72141bd7d8beb1727de4eb2728b1be8d7de414d828b1417d8deb1bd72741b1 |
| e3 | I | 11b4b411e1bb441edd877822d27777d277d2d27787dd2278441ee1bb4beeee4b |
| | Q | 7822dd8777d2d2774beeee4bbbe11e441e44bbe111b4b411d27777d2227887dd |
| e4 | I | 4e7dd7e4b17d28e4d814418dd8eb417272be14d88dbeebd81b267d4e1bd77db1 |
| | Q | 7d4e1b287db11bd714dB72beebdB8dbebe7227ebbeBd27142B1bb182d71b4e82 |

TABLE 12

$f(X) = 1 + X + X^2 + X^3 + X^5 + X^6 + X^7$
$g(X) = 3 + 3X + X^2 + X^3 + 2X^4 + 3X^5 + X^6 + X^7$

| | | |
|---|---|---|
| e1 | I | 1b7d1b622741d8418d147214b128b1d7 |
| | Q | 148d1472d74e284e7d1b821bbed8be27 |
| e2 | I | 771e117887111e887811e18877e11187 |
| | Q | 4bdd2dbbbbd2224b44d2dd4b4b222d44 |
| e3 | I | 128b1d8474ed841dd148de4748d1b821 |
| | Q | 4721b7d1deb8d1b784e27412e284ed8b |
| e4 | I | 411be44172d728727d272782b114144e |
| | Q | 1b41be1b288d7228277d7dd8eb4e4e14 |

The above complex quasi-orthogonal codes can be used for every link in the CDMA system using the Walsh orthogonal codes. When the complex quasi-orthogonal codes are used together with the orthogonal codes, the following three options can be considered.

Option 1

In a system using the Walsh orthogonal codes and providing a service at a variable data rate, it is possible to freely use the complex quasi-orthogonal codes without restriction on the length. Further, it is possible to use every complex quasi-orthogonal code sequences at full length.

Option 2

One of a Walsh orthogonal code group and a complex quasi-orthogonal code group is selected to make two orthogonal sets, and the two groups both can provide a service at the variable data rate.

Option 3

It is possible to use the Walsh orthogonal code group and every complex quasi-orthogonal code group as one group to allow every code group to support the variable data rate. In this case, there may occur a random code characteristic between the complex quasi-orthogonal code groups.

It is preferable to use the complex quasi-orthogonal codes according to the types of application, taking into consideration the above three options. In general, when only the Walsh codes are used, the modulating side exchanges a predetermined orthogonal code number with the demodulating side. Therefore, when the orthogonal codes and the complex quasi-orthogonal codes are used, it is necessary to exchange a predetermined orthogonal code number and a group number (i.e., an index i of the Q' matrix $e_i(t)$ shown in FIG. 4). In this case, the orthogonal code group is defined as a Group 0, and subsequently, the group numbers are redefined up to $2^m-1$.

A description will now be made regarding a method for applying the complex quasi-orthogonal code group to a system supporting the variable data rate, like the orthogonal code group. An element of the complex quasi-orthogonal code group are comprised of a Walsh number corresponding to the orthogonal code number and a complex quasi-orthogonal code mask corresponding to the group number. The group number indicates which $e_i(t)$ is selected in FIG. 4. To service the variable data rate using the complex quasi-orthogonal code group, a previously allocated orthogonal code number is used as a Walsh orthogonal code number and then, allocated $e_i(t)$ is added to it every length N. At this point, when signals are expressed with "0" and "1", addition is performed; when signals are expressed with "1" and "−1", multiplication is performed.

Figure 6:
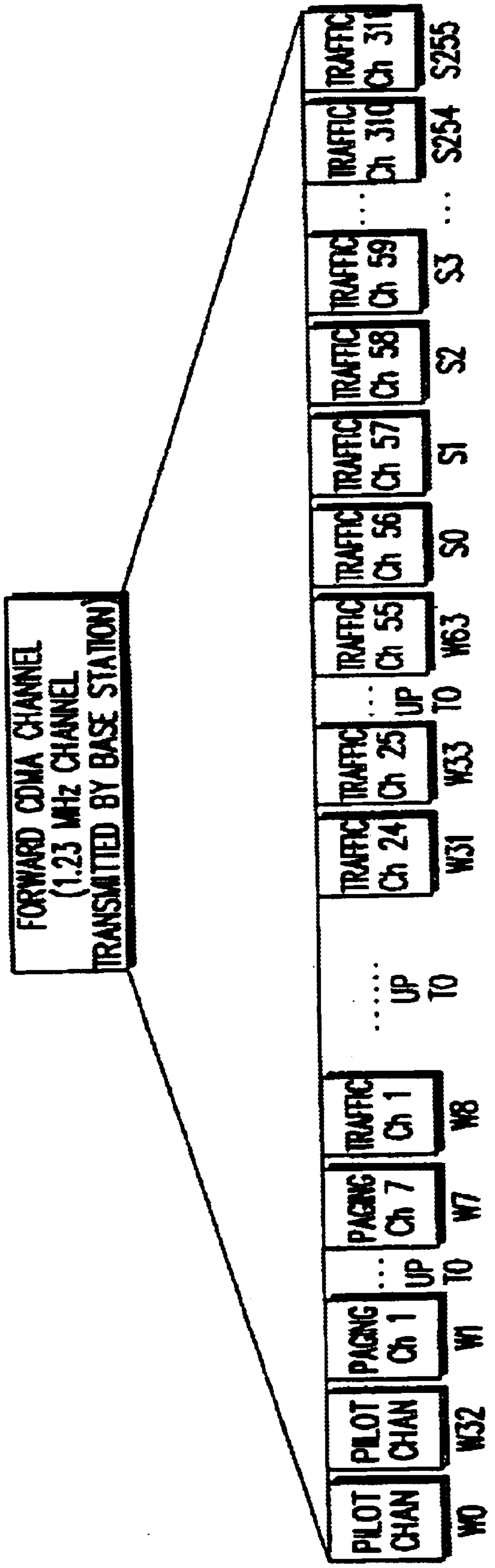
FIG. 6 is a diagram illustrating channel separation using Walsh orthogonal codes and quasi-orthogonal codes in a CDMA communication system according to an embodiment of the present invention.

FIG. 6 illustrates a channel separation method using the Walsh orthogonal codes and the complex quasi-orthogonal codes in an IS-95/IS-95A forward link to extend the channel capacity according to an embodiment of the present invention. FIG. 6 shows an exemplary embodiment where the channels which can be assigned with the Walsh orthogonal codes are used in the same method as in the IS-95 system, and the complex quasi-orthogonal codes are used to expand the channel capacity. However, it is also possible to assign the Walsh orthogonal codes to common channels and assign the remaining Walsh orthogonal codes and the complex quasi-orthogonal codes to traffic channels. Here, the traffic channels refer to dedicated channels. In addition, although FIG. 6 shows an embodiment which uses the complex quasi-orthogonal codes of length 256, the complex quasi-orthogonal codes can be varied in length, when necessary.

In FIG. 6, Walsh orthogonal codes are represented by Wi (where i=0, 1, . . . , 63), and respective channels are separated by previously allocated unique orthogonal codes. Further, in FIG. 6, complex quasi-orthogonal codes are represented by Sj (where j=0,1, . . . , 255), and are assigned to the traffic channels. As illustrated, an IS-95/IS-95A forward link can separate 64 channels using the Walsh orthogonal codes, and 256 channels, which is 4 times the number of the Walsh orthogonal codes, using the complex quasi-orthogonal codes. Therefore, it is possible to expand the channels five times by using the Walsh orthogonal codes and the complex quasi-orthogonal codes.

Figure 7:
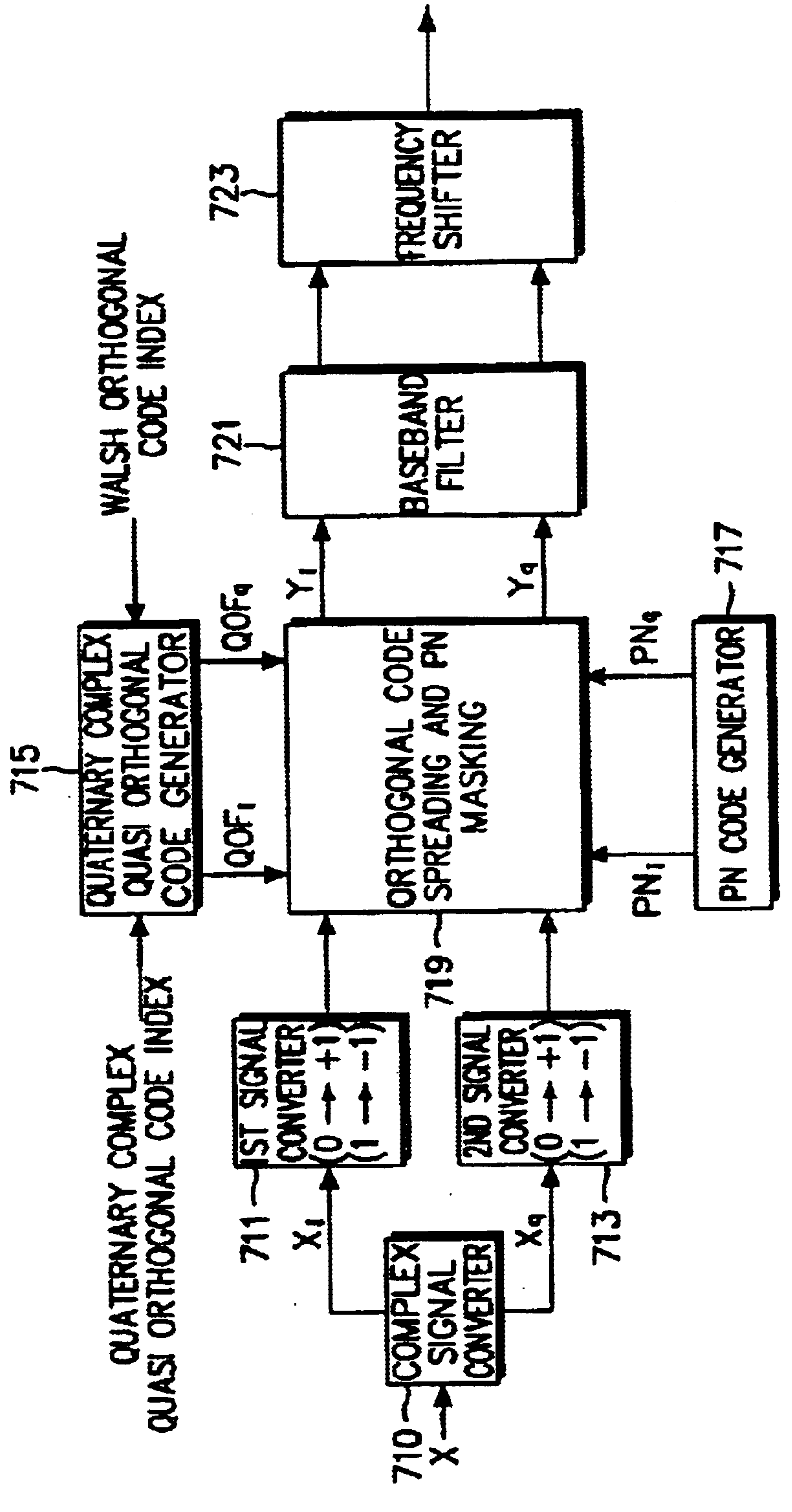
FIG. 7 is a block diagram illustrating a channel spreading device which uses complex quasi-orthogonal codes, in a CDMA communication system according to an embodiment of the present invention.

FIG. 7 illustrates a transmitter for a mobile communication system, including a spreader which uses Walsh orthogonal code and complex quasi-orthogonal codes according to an embodiment of the present invention. Unlike the IS-95 system, the mobile communication system of FIG. 7 includes a channel transmitter which uses the complex quasi-orthogonal codes for channel spreading codes.

Referring to FIG. 7, a complex signal converter 710 converts an input data bit stream to complex signals and divides the complex signal into a real signal Xi and an imaginary signal Xq. First and second signal converters (or signal mappers) 711 and 713 convert the complex data bit streams Xi and Xq output from the complex signal converter 710, respectively. More specifically, the first signal converter 711 converts the input bit stream Xi by converting a bit "0" to "+1" and a bit "1" to "−1", and demultiplexes the converted signal to a channel spreading and PN masking part 719. The second signal converter 713 converts the input bit stream Xq by converting a bit "0" to "+1" and a bit "1" to "−1", and demultiplexes the converted signal to the channel spreading and PN masking part 719.

A complex quasi-orthogonal code generator 715 receives complex quasi-orthogonal code indexes and Walsh orthogonal code indexes, and generates complex quasi-orthogonal codes QOFi and QOFq. The complex quasi-orthogonal code generator 715 stores therein quasi-orthogonal code masks generated and selected in the process of FIG. 5, and selects a mask according to the complex quasi-orthogonal code index. Further, the complex quasi-orthogonal code generator 715 includes a Walsh orthogonal code generator to generate a Walsh orthogonal code according to the Walsh orthogonal code index. Thereafter, the complex quasi-orthogonal code generator 715 uses the selected quasi-orthogonal code mask and the Walsh orthogonal code to generate complex quasi-orthogonal codes QOFi and QOFq.

A PN code generator 717 generates a real PN code PNi and an imaginary PN code PNq, and applies the generated PN codes to the channel spreading and PN masking part 719. The channel spreading and PN masking part 719 spreads the signals output from the first and second signal converters 711 and 713 by multiplying the output signals by the complex quasi-orthogonal codes QOFi and QOFq and then PN-masks the spread signals by multiplying the spread signals by the real and imaginary PN codes PNi and PNq, thereby generating output signals Yi and Yq. A baseband filter 721 baseband-filters the spread signals Yi and Yq output from the channel spreading and PN masking part 719. A frequency shifter 723 converts the signals output from the baseband filter 721 to an RF (Radio Frequency) signal.

Figure 8:
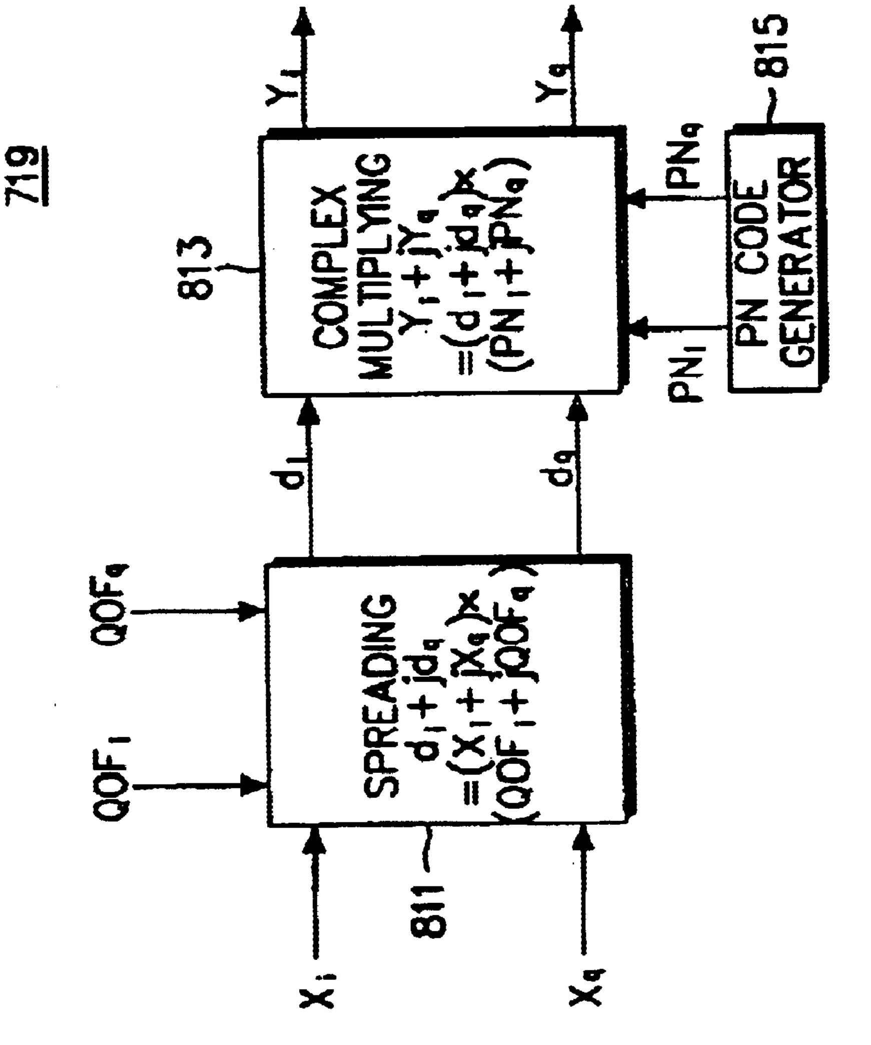
FIG. 8 is a detailed block diagram illustrating the channel spreading and PN masking part of FIG. 7 for complex quasi-orthogonal codes.

FIG. 8 illustrates the channel spreading and PN masking part 719 of FIG. 7, which performs channel spreading using the complex quasi-orthogonal codes QOFi and QOFq and performs PN masking using the complex PN codes PNi and PNq.

Referring to FIG. 8, a spreader 811 multiplies the complex channel signals Xi and Xq by the complex quasi-orthogonal codes QOFi and QOFq, respectively, to output channel spread signals di and dq. The signals, di+dq, output from the spreader 811, which were spread with the complex quasi-orthogonal codes, become (Xi+jXq)*(QOFi+jQOFq). A complex multiplier 813 multiplies the spread signals di and dq output from the spreader 811 by the PN codes PNi and PNq to output PN masked signals Yi and Yq. The output signals of the complex multiplier 813 become Yi+Yq=(di+dq)*(PNi+jPNq). The complex multiplier 813 performs complex PN masking.

Figure 10:
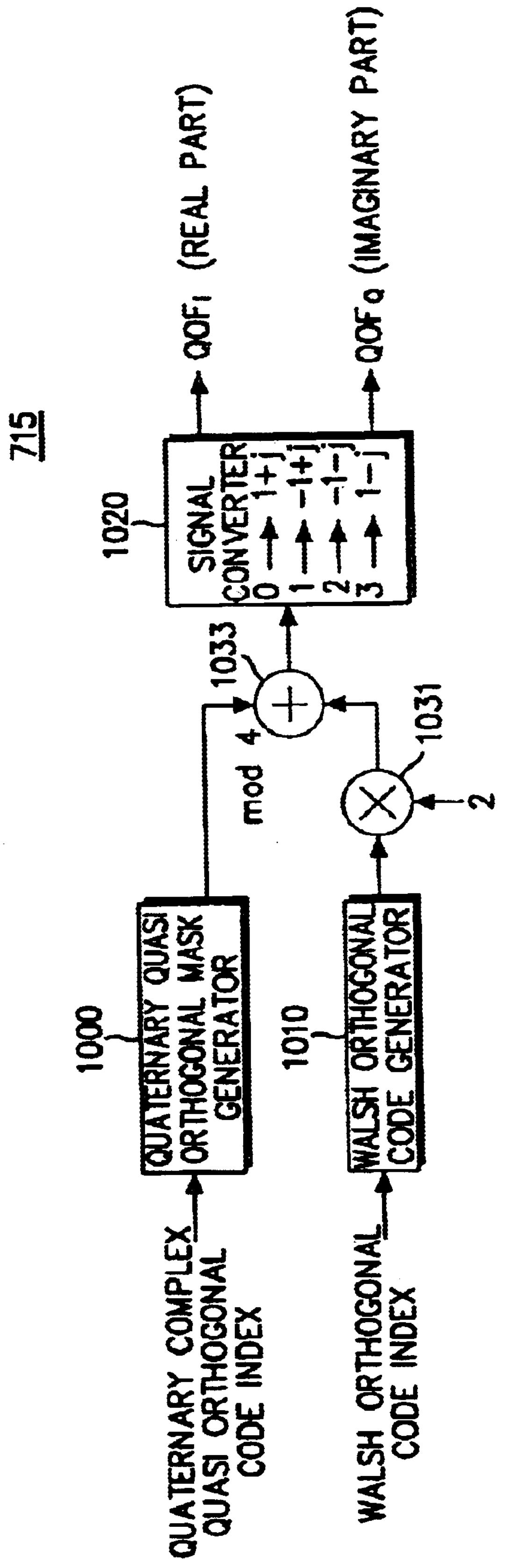
FIG. 10 is a detailed block diagram illustrating the complex quasi-orthogonal code generator of FIG. 7, which generates quasi-orthogonal code masks in numbers.
Figure 11:
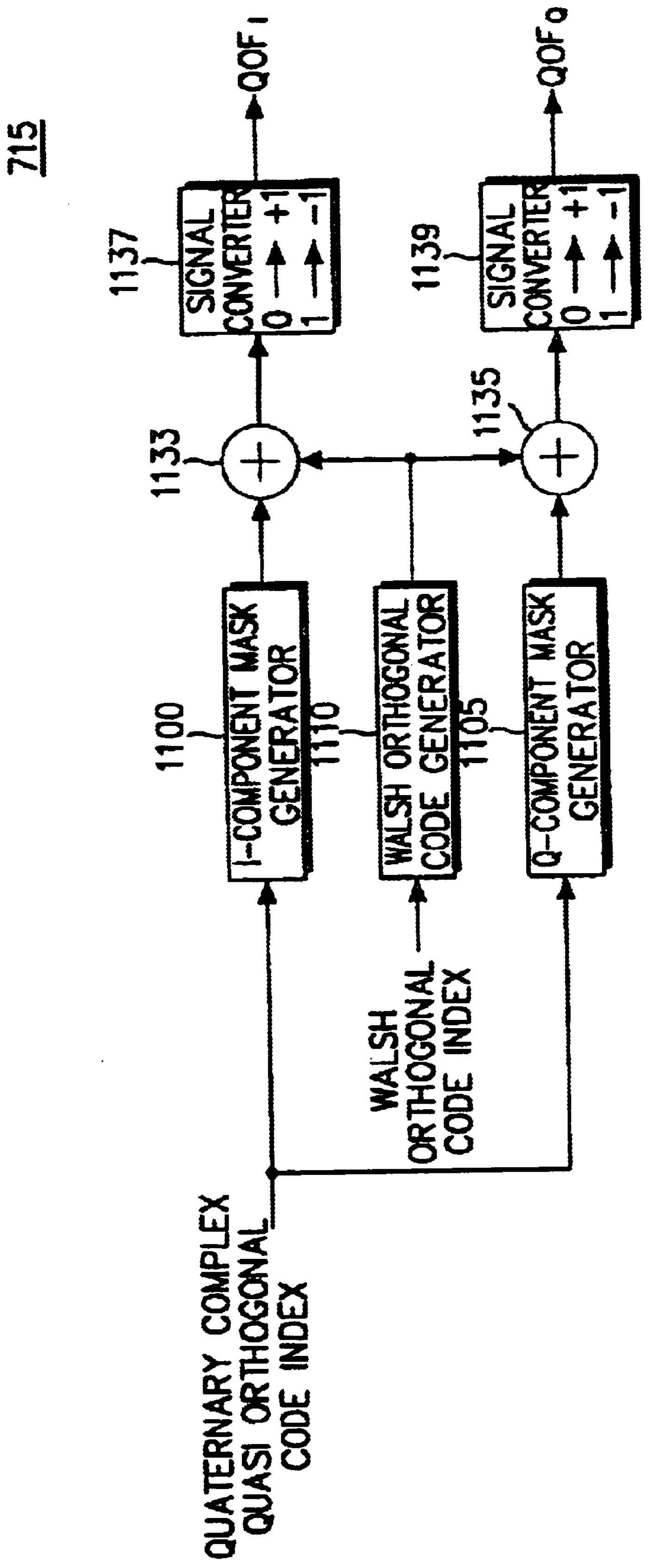
FIG. 11 is a detailed block diagram illustrating the complex quasi-orthogonal code generator of FIG. 7, which generates quasi-orthogonal code masks in I and Q values.

FIGS. 10 and 11 illustrate the complex quasi-orthogonal code generator 715 of FIG. 7 according to different embodiments of the present invention. The complex quasi-orthogonal code generator 715 can be differently constructed according to the structure of the mask. That is, the complex quasi-orthogonal code generator 715 can be differently constructed according to whether the output mask will be generated with values, with I and Q components, or with sign and direction components. FIG. 10 illustrates the complex quasi-orthogonal code generator 715, which generates quasi-orthogonal code masks in values as shown in Table 9, and FIG. 11 illustrates a complex quasi-orthogonal code generator 715, which generates quasi-orthogonal code masks in I and Q values as shown in Table 11.

Referring to FIG. 10, upon receipt of a quasi-orthogonal code index, a quasi-orthogonal mask generator 1000 generates a quasi-orthogonal mask according to the quasi-orthogonal code index. Also, the quasi-orthogonal mask generator 1000 can directly generate a mask using the quasi-orthogonal code index. Further, the quasi-orthogonal mask generator 1000 can store quasi-orthogonal code masks, and selectively outputs a mask corresponding to the received quasi-orthogonal code index. Upon receipt of a Walsh orthogonal code index, a Walsh orthogonal code generator 1010 generates a Walsh orthogonal code corresponding to the Walsh orthogonal code index. At this point, the Walsh orthogonal code is output with the values of "0" and "1". A multiplier 1031 then multiplies the Walsh orthogonal code output from the Walsh orthogonal code generator 1010 by "2" to express the Walsh orthogonal code in a number, and provides its output to an adder 1033. The adder 1033 then adds the quasi-orthogonal code mask output from the quasi-orthogonal mask generator 1000 and the Walsh orthogonal code output from the multiplier 1031. At this moment, the adder 1033 performs addition on the two input signals, since the two input signals are both signals. A signal converter 1020 receiving the signals output from the adder 1033 converts the quasi-orthogonal code to a complex quasi-orthogonal code, by converting "0" to "1+j", "1" to "−1+j", "2" to "−1−j" and "3" to "1−j" and then outputting a real part as a I signal QOFi and an imaginary part as a Q signal QOFq.

Referring to FIG. 11, upon receipt of a quasi-orthogonal code index, an I-component mask generator 1100 and a Q-component mask generator 1105 generate I- and Q-component masks, expressed with "0" and "1", corresponding to the quasi-orthogonal code index, respectively. The I- and Q-component masks output from the mask generators 1100 and 1105 are applied to adders 1133 and 1135, respectively. Further, upon receipt of a Walsh orthogonal code index, a Walsh orthogonal code generator 1110 generates a Walsh orthogonal code corresponding to the Walsh orthogonal code index and provides the generated Walsh orthogonal code to the adders 1133 and 1135. As a result, the adders 1133 adds the I-component mask and the Walsh orthogonal code to generate an I-component quasi-orthogonal code, and the adder 1135 adds the Q-component mask and the Walsh orthogonal code to generate a Q-component quasi-orthogonal code. Signal converters 1137 and 1139 convert input signals of "0" to "+1" and input signals of "1" to "−1", and provide the converted signals to the spreader 811.

The quasi-orthogonal sequence masks can be expressed in several ways. First, the quasi-orthogonal sequence masks can be expressed in binary values of 0, 1, 2 and 3 as shown in the above tables. Second, the binary values can be expressed in 1, −1, j and −j by gray mapping. Third, 1, −1, j and −j can be expressed in 1+j, −1−j, −1+j and −j by phase shifting 1, −1, j and −j by 45°. Fourth, 1, −1, j and −j can be expressed in sign and phase values of a polar coordinate.

Fifth, 1, −1, j and −j can be expressed in only the sign value of the polar coordinate. In addition, 1, −1, j and −j can also be expressed in complex values. Therefore, although the above tables show the values, the same masks can be expressed in various ways according to the above gray mapping rule.

In this complex expression, the complex numbers can be divided into real numbers and imaginary numbers. As an alternative method, polar coordinates are used to express the complex numbers with a coordinate on a Gauss complex plane, wherein the complex numbers are expressed as a phase value between the coordinate and a positive portion of the real number and an absolute value indicating a distance from the origin (0) to the coordinate. At this point, when the quasi-orthogonal sequences are expressed with 1, −1, j and −j, the absolute value is always 1. Further, when the phase is over 180° it is equivalent to the complex number being multiplied by −1. Therefore, it is also possible to express the complex numbers with the phase and sign on the Gauss complex plane as shown in Equation (9) below.

$$a+jb=(\text{sign})\times(\cos(\text{phase})+j\sin(\text{phase})) \quad (9)$$

By using Equation (9), the complex number of 1, −1, j and −j can be expressed as follows:

$$1=(+1)\times(\cos 0°+j\sin 0°)$$

$$-1=(-1)\times(\cos 0°+j\sin 0°)$$

$$i=(+1)\times(\cos 90+j\sin 90°)$$

$$-j=(-1)\times(\cos 90+j\sin 90°)$$

It is noted from the above formula that the complex number of 1, −1, j and −j can be expressed with the sign and phase. Thus, the masks expressed with 0, 1, 2 and 3 in the above tables can be converted to 1, −1, j and −j using gray mapping. With regard to the quasi-orthogonal sequence expressed with 1, −1, j and −j; a sign 1 is expressed with a sign control signal "0" and a phase control signal "0"; a sign −1 is expressed with a sign control signal "1" and a phase control signal "0"; a sign j is expressed with a sign control signal "0" and a phase control signal "1"; a sign −j is expressed with a sign control signal "1" and a phase control signal "1".

In the spreading device for spreading an input signal with the complex quasi-orthogonal sequence, when the complex quasi-orthogonal sequence is expressed in the polar coordinate to spread the input signal, the masks of length 256 show in Table 10 and the masks of length 128 shown in Table 9 can be expressed with the sign and phase values of Tables 13 and 14 below, respectively. Here, the sign value of "0" indicates a positive sign (+) and the sign value of "1" indicates a negative sign (−). Further, the phase control value of "0" indicates the real component and the phase control value of "1" indicates the imaginary component obtained by phase shifting the signal by 90°.

TABLE 13

| | | |
|---|---|---|
| $f(X) = 1 + X^3 + X^5 + X^7 + X^8$<br>$g(X) = 1 + 3X^3 + X^5 + 2X^6 + 3X^7 + X^8$ | | |
| e1 | Phase | 0101101001011010101001011010010101011010010110101010010110100101 |
| | | 1010010110100101010110100101101010100101101001010101101001011010 |
| | | 1010010110100101010110100101101010100101101001010101101001011010 |
| | | 0101101001011010101001011010010101011010010110101010010110100101 |
| | Sign | 0111110100100111111001001011111010000001011011000111001001011110 |
| | | 1101100001111101101111100001101111011000011111010100000111100100 |
| | | 0100111011101011110101110111001001001110111010110010100010001101 |
| | | 0001010001001110011100100010100011101011101100010111001000101000 |
| e2 | Phase | 0011001111001100001100111101100001100111100110000110011110011100 |
| | | 0011001111001100001100111100110000110011110011000011001111001100 |
| | | 0011001111001100001100111100110000110011110011000011001111001100 |
| | | 0011001111001100001100111100110000110011110011000011001111001100 |
| | Sign | 0111111010111001000010100000110111101011111011000101111101011000 1 |
| | | 0111001001111101111001001110101100100111001010001011000110111110 |
| | | 1000110101111101111001000001010011011000001010001011000101000001 |
| | | 0111111011000110111101011000110111101011100100111010000011011000 1 |
| e3 | Phase | 0110100110010110011010011001011010010110011010011001011001101001 |
| | | 1001011001101001100101100110100101101001100101100110100110010110 |
| | | 0110100110010110011010011001011010010110011010011001011001101001 |
| | | 1001011001101001100101100110100101101001100101100110100110010110 |
| | Sign | 0111100000100010110111011000011101110111110100101101001001110111 |
| | | 0100101111101110111011100100101110111011111000010001111001000100 |
| | | 0001111001000100101110111110000100010001101101001011010000010001 |
| | | 1101001001110111011101111101001000100010011110001000011111011101 |
| e4 | Phase | 0011001100110011110011001100110011001100110011000011001100110011 |
| | | 1100110011001100001100110011001100110011001100111100110011001100 |
| | | 1100110011001100001100110011001100110011001100111100110011001100 |
| | | 0011001100110011110011001100110011001100110011000011001100110011 |
| | Sign | 0111110101001110000110110010100001111101101100010001101111010111 |
| | | 0001010011011000011100101011111011101011110110001000110110111110 |
| | | 1011111100111001000100111111010111011111010001101001001110001010 0 |
| | | 0010100000011011101100011000001011010111000110110100111010000010 |

TABLE 14

$f(X) = 1 + X + X^2 + X^3 + X^5 + X^6 + X^7$
$g(X) = 3 + 3X + X^2 + X^3 + 2X^4 + 3X^5 + X^6 + X^7$

| | | |
|---|---|---|
| e1 | Phase | 0000111111110000000011111111000011110000000011111111000000001111<br>1111000000001111111100000000111100001111111100000000111111110000 |
| | Sign | 0001010010001101000101000111001011010111010011100010100001001110<br>0111110100011011100000100001101110111110110110001011111000100111 |
| e2 | Phase | 0011110011000011001111001100001100111100110000110011110011000011<br>0011110011000011001111001100001100111100110000110011110011000011 |
| | Sign | 0100101111011101001011011011101110111011110100100010001001001011<br>0100010011010010110111010100101101001011001000100010110101000100 |
| e3 | Phase | 0101010110101010101010100101010110101010010101010101010110101010<br>0101010110101010101010100101010110101010010101010101010110101010 |
| | Sign | 0100011100100001101101111101000111011110101110001101000110110111<br>1000010011100010011101000000100101110001010000100111011011000101 1 |
| e4 | Phase | 0101101001011010010110100101101001011010010110100101101001011010<br>0101101001011010010110100101101001011010010110100101101001011010 |
| | Sign | 0001101101000000110111111000011011001010001000110101110010001010 00<br>0010011101111101011111011101100011101011010011100100111000010100 |

Figure 12:
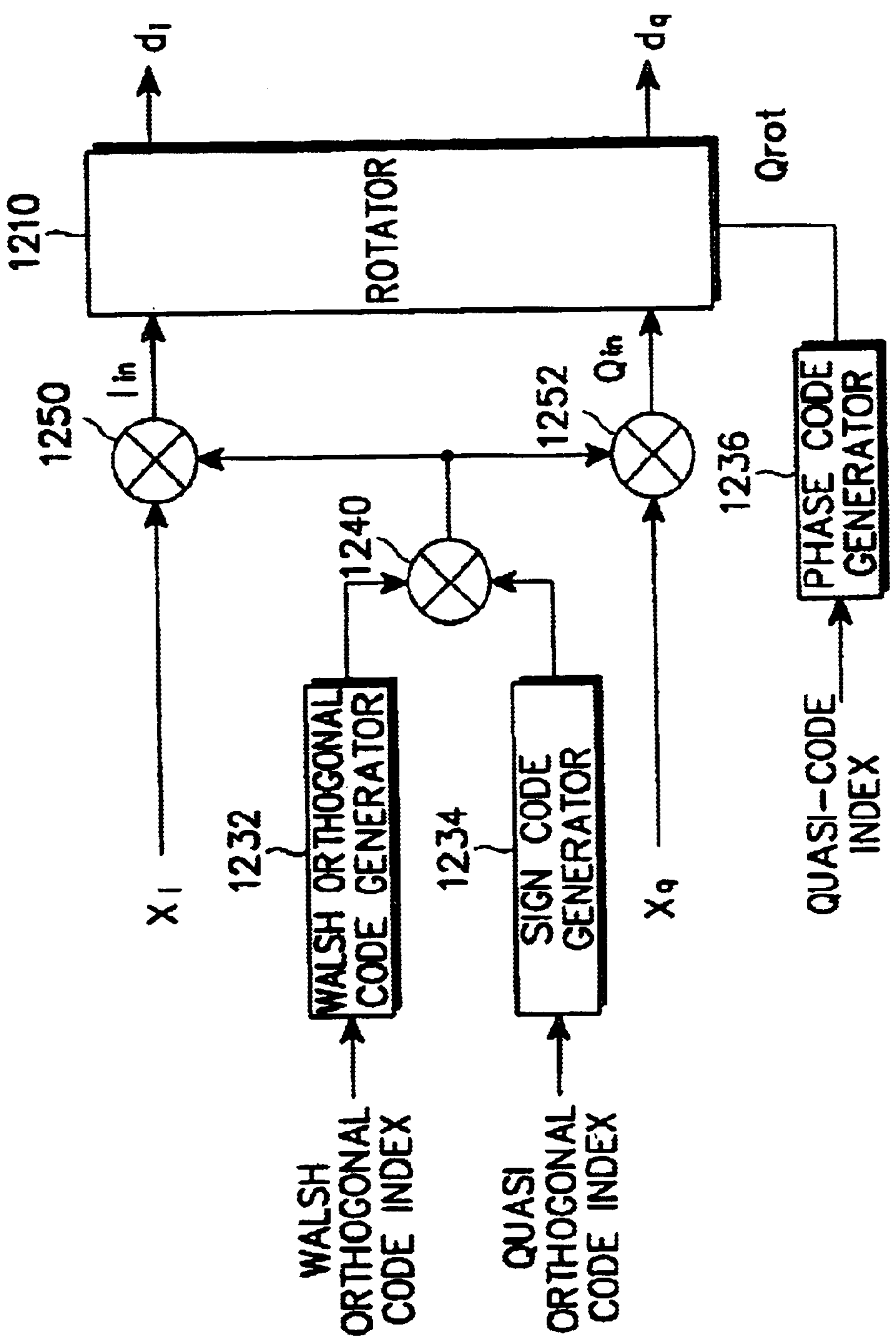
FIG. 12 is a detailed block diagram illustrating a complex quasi-orthogonal code spreading device in the channel spreading and PN masking part of FIG. 7 according to a first embodiment of the present invention.

FIG. 12 shows the spreader 811 of FIG. 8, for spreading input signals using one of the above masks when expressing the quasi-orthogonal sequences in the polar coordinate. Referring to FIG. 12, multipliers 1250 and 1252 receive the input signals Xi and Xq, respectively, At the same time, a Walsh orthogonal code generator 1232 generates a Walsh orthogonal code corresponding to a Walsh orthogonal code index for channel assignment, and a sign code generator 1234 generates a sign value representing a sign code of a quasi-orthogonal code corresponding to a quasi-orthogonal code index for channel assignment. A multiplier 1240 then multiplies the Walsh orthogonal code by the sign value, and provides its output to the multipliers 1250 and 1252. The multiplier 1250 multiplies the input signal Xi by the output of the multiplier 1240 to output a signal Ian. The multiplier 1252 multiplies the input signal Xq by the output of the multiplier 1240 to output a signal Qin. The signals Ian and Qin are input to a rotator 1210. A phase code generator 1236 generates a phase value corresponding to the quasi-orthogonal code index and provides the generated phase value to the rotator 1210 as a rotation select signal. The rotator 1210 controls the output phases of the multipliers 1250 and 1252 according to the rotation select signal Qrot output from the phase code generator 1236. For example, the rotator 1210 outputs the input signals Iin+jQin as channel spread signals di and dq, when the phase value representing a phase of the quasi-orthogonal code is 0. However, when the phase value is 1, the rotator 1210 multiplies the input signal Iin+jQin by j to output the signals −Qin+jIin as the channel spread signals di and dq.

The quasi-orthogonal code index input to the sign code generator 1234 has the same value as the quasi-orthogonal code index input to the phase code generator 1236. The sign code generator 1234 is chip synchronized with the phase code generator 1236. Therefore, the sign codes and the phase codes shown in Tables 13 and 14 are output from the sign code generator 1234 and the phase code generator 1236. When the sign code generator 1234 generates a sign code (e.g., e1 sign) for a specific orthogonal code, the phase code generator 1236 also generates a phase code (e.g., e1 phase) corresponding to the generated sign code, wherein the sign code is chip synchronized with the phase code.

Figure 13:
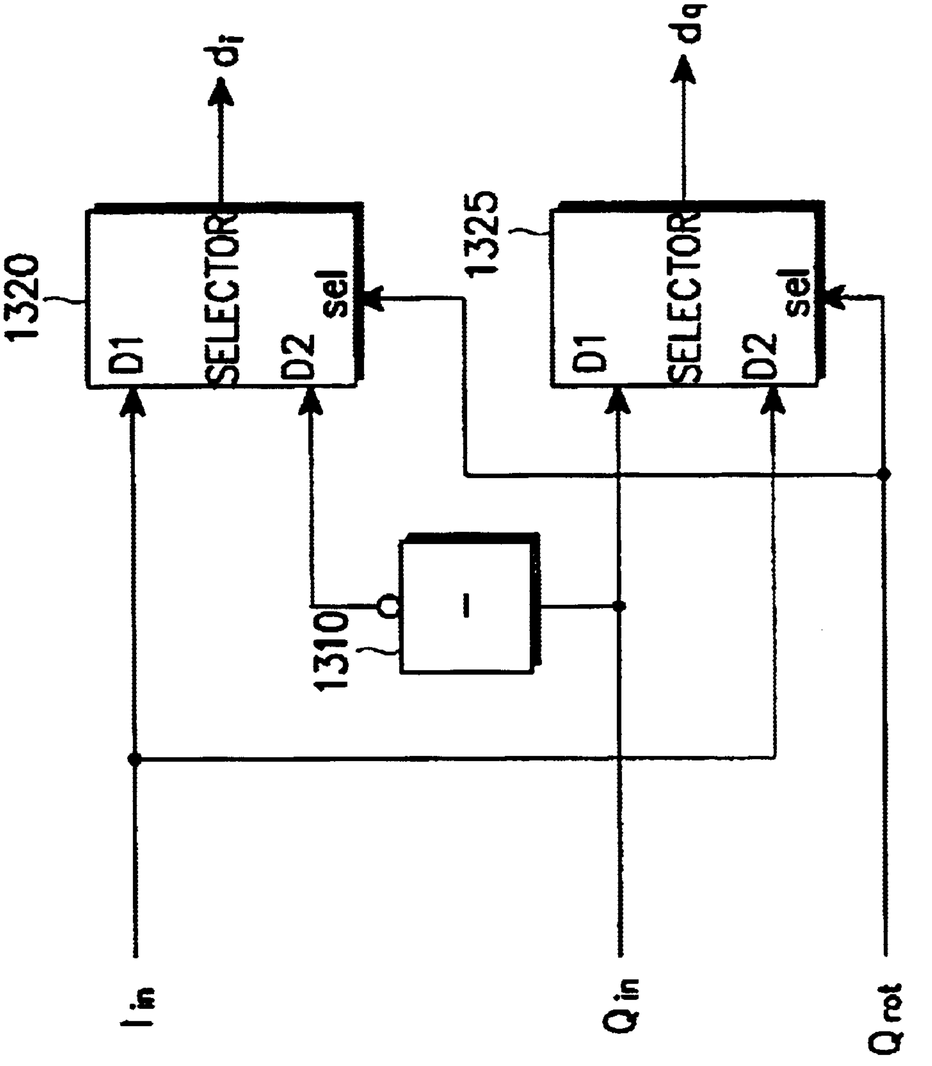
FIG. 13 is a detailed block diagram illustrating the rotator of FIG. 12.

FIG. 13 shows the rotator 1210 of FIG. 12. Referring to FIG. 13, the signal Iin is input to a D1 node of a selector 1320 and a D2 node of a selector 1325, and the signal Qin is input to an inverter 1310 and a D1 node of the selector 1325. The inverter 1310 inverts the signal Qin and provides the inverted signal to a D2 node of the selector 1320. At the same time, the phase value Qrot representing the phase of the quasi-orthogonal code is commonly input to each select node SEL of the selectors 1320 and 1325. For example, the selectors 1320 and 1325 select the signals Iin and Qin received at their D1 nodes as the channel spread signals di and dq, respectively, when the phase value is 0. Otherwise, when the phase value is 1, the selectors 1320 and 1325 select the signals −Qin and Iin received at their D2 nodes as the channel spread signals di and dq, respectively.

As shown in Equation (9), the complex number can be expressed with the phase and sign on the Gauss complex plane. Therefore, with regard to the quasi-orthogonal sequence which can be expressed with the complex number of 1, −1, j and −j; 1 is expressed with a sign code of 0 and a phase code of 0; −1 is expressed with a sign code of 1 and a phase code of 0; j is expressed with a sign code of 0 and a phase code of 1; −j is expressed with a sign code of 1 and a phase code of 1. Therefore, by controlling a phase of the channel spread signal using the phase code corresponding to the sign code, after expressing the masks, which can be expressed with the complex number, with the sign code and the phase code and spreading a channel signal by mixing the sign code with the Walsh code, it is possible to obtain the same results of spreading the channel signal using the quasi-orthogonal code.

Although the channel spreader of FIG. 12 first spreads the channel signals using the sign code and the Walsh orthogonal code and then spreads the quasi-orthogonal code by controlling a phase of the spread signal, it is also possible to first control a phase of the signal to be channel spread using the phase code and then spread the phase controlled channel signal using the sign code and the Walsh orthogonal code. That is, it is possible that the rotator 1210 first controls phases of the input signals Xi and Xq according to the phase value Qrot and then, the multipliers 1250 and 1252 spread the phase controlled signals Xi and Xq with the mixed signal of the sign code and the Walsh orthogonal code, output from the multiplier 1240.

In addition, unlike the method shown in FIG. 12, it is also possible to express the complex number of 1, −1, j and −j with only the phase code, excluding the sign code, as shown in Equation (12) below.

$$a+jb=\cos(\text{phase})+j\sin(\text{phase}) \tag{12}$$

By using Equation (12), the complex number of 1, −1, j and −j can be expressed as follows:

$$1=\cos 0°+j \sin 0°$$

$$-1=\cos 180°+j \sin 180°$$

$$j=\cos 90°+j \sin 90°$$

$$-j=\cos 270°+j \sin 270°$$

It therefore follows from Equation (12) that the complex number of 1, −1, j and −j can be expressed with only the phase. With regard to the quasi-orthogonal sequence expressed with 1, −1, j and −j; 1, which is phase shifted by 0°, is expressed with a phase code "0"; −1, which is phase shifted by 180°, is expressed with a phase code "2"; j, which is phase shifted by 90°, is expressed with a phase code "1"; −j, which is phase shifted by 270°, is expressed with a phase code "3".

In the spreading device for spreading an input signal with the complex quasi-orthogonal sequence, when the complex quasi-orthogonal sequence is expressed in the polar coordinate to spread the input signal, the masks of length 256 shown in Table 10 and the masks of length 128 shown in Table 9 can be expressed with the phase values of Tables 13 and 14 below, respectively. Here, the phase control value of "0" indicates that the signal to be spread is phase shifted by 0°; the phase control value of "1" indicates that the signal to be spread is phase shifted by 90°; the phase control value of "2" indicates that the signal to be spread is phase shifted by 180°; the phase control value of "3" indicates that the signal to be spread is phase shifted by 270°.

Figure 14:
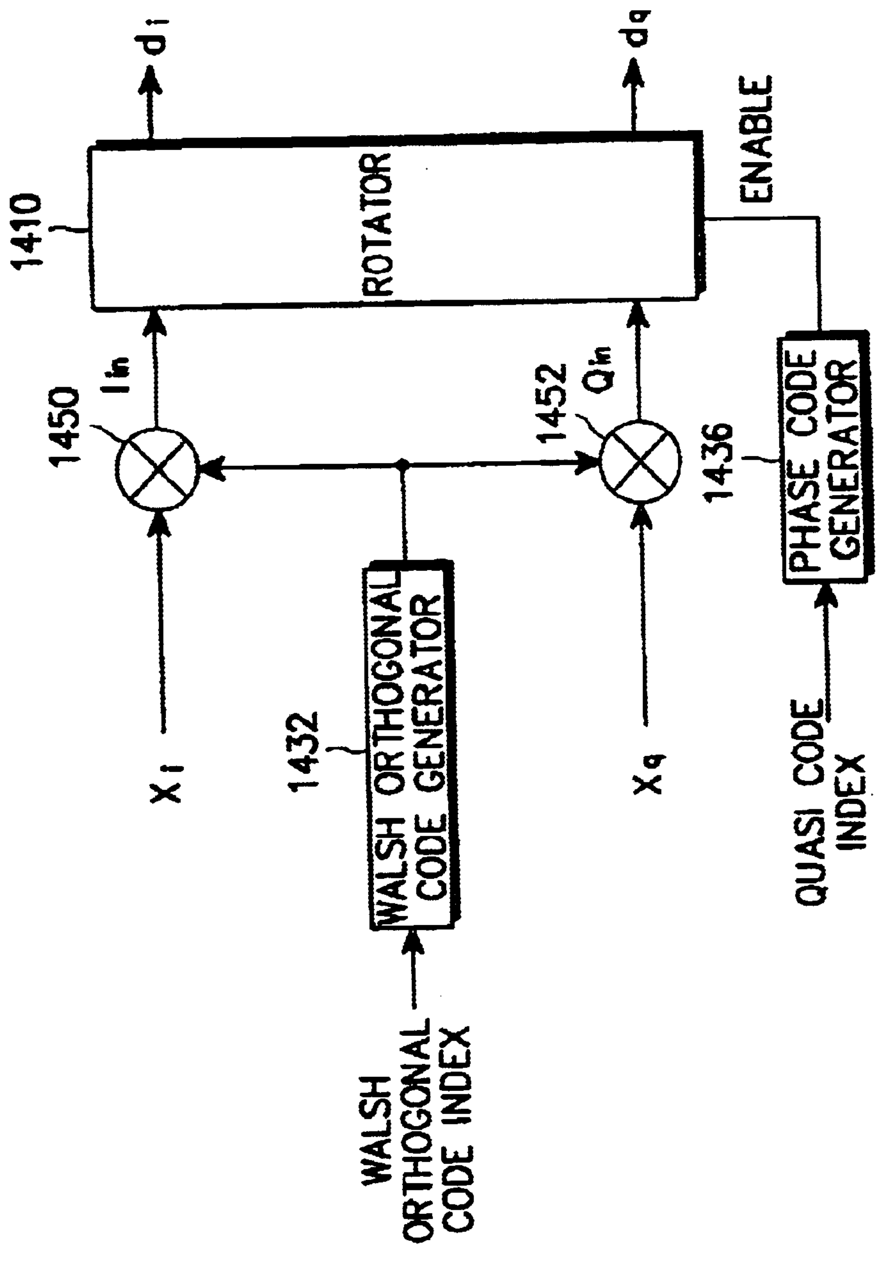
FIG. 14 is a detailed block diagram illustrating a complex quasi-orthogonal code spreading device in the channel spreading and PN masking part of FIG. 7 according to a second embodiment of the present invention.

FIG. 14 shows the spreader 811 of FIG. 8, for spreading input signals using the above masks when expressing the quasi-orthogonal sequences in the polar coordinate. Referring to FIG. 14, multipliers 1450 and 1452 receive the input signals Xi and Xq, respectively. At the same time, a Walsh orthogonal code generator 1432 generates a Walsh orthogonal code corresponding to a Walsh orthogonal code index for channel assignment, and provides the generated Walsh orthogonal code to the multipliers 1450 and 1452. The multiplier 1450 multiplies the input signal Xi by the Walsh orthogonal code to output a channel spread signal Iin. The multiplier 1452 multiplies the input signal Xq by the Walsh orthogonal code to output a channel spread signal Qin. The signals Iin and Qin are input to a rotator 1410. A phase code generator 1436 generates a phase code Qrot representing a phase of the quasi-orthogonal code corresponding to the quasi-orthogonal code index for channel assignment and provides the generated phase code Qrot to the rotator 1410. The rotator 1410 controls the phases of channel spread signals Iin and Qin according to the phase code Qrot. For example, the rotator 1410 outputs the input signals Iin and jQin as the channel spread signals di and dq when the phase value is 0. When the phase value is 1, the rotator 1410 multiplies the input signals Iin and jQin by j to output the signals −Qin+jIin as the channel spread signals di and dq. When the phase value is 2, the rotator 1410 multiplies the input signals Iin and jQin by −1 to output the signals −Iin−jQin as the channel spread signals di and dq. When the phase value is 3, the rotator 1410 multiplies the input signals Iin and jQin by −j to output the signals Qin−jIin as the channel spread signals di and dq.

Figure 15:
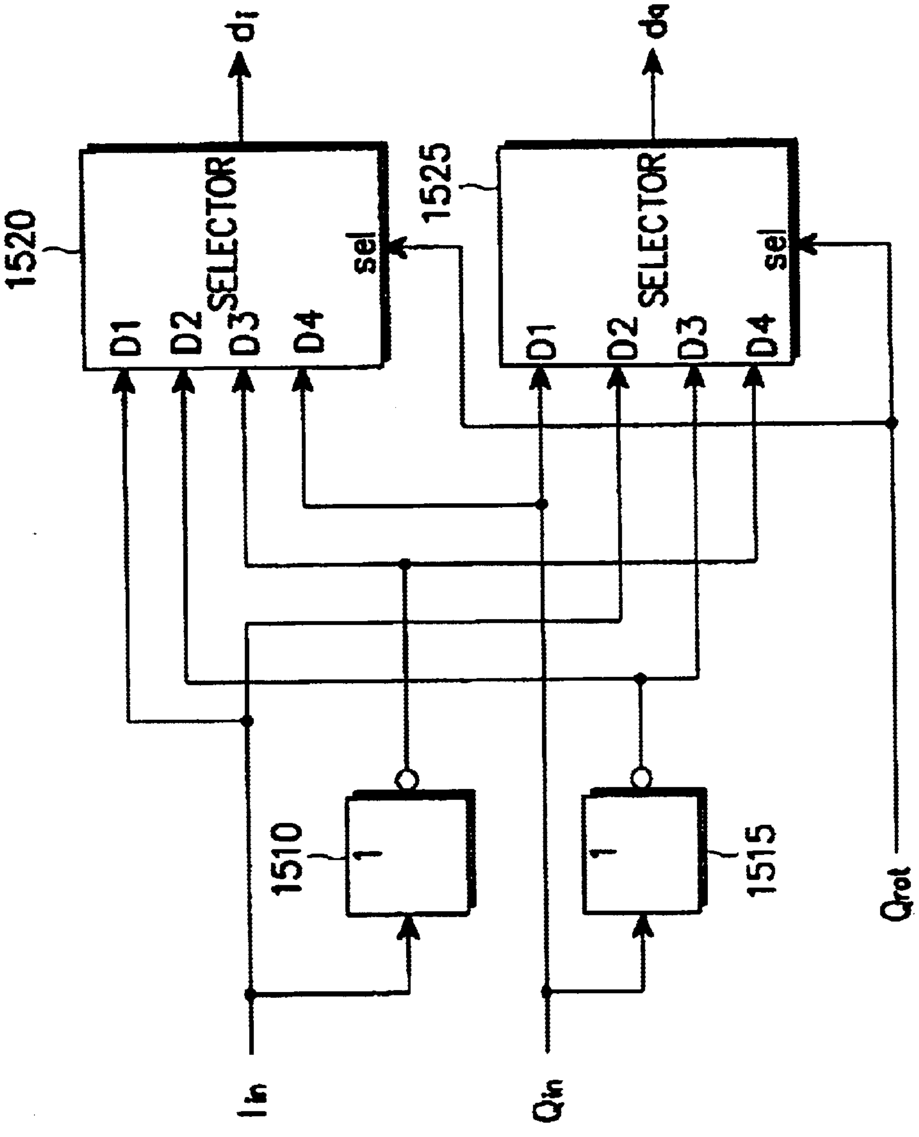
FIG. 15 is a detailed block diagram illustrating the rotator of FIG. 14.

FIG. 15 shows the rotator 1410 of FIG. 14. Referring to FIG. 15, the signal Iin is input to an inverter 1510, a D1 node of a selector 1520 and a D2 node of a selector 1525, and the signal Qin is input to an inverter 1515, a D4 node of the selector 1520 and a D1 node of the selector 1525. The inverter 1510 inverts the input signal Iin and provides the inverted signal to a D3 node of the selector 1520 and a D4 node of the selector 1525. The inverter 1515 inverts the input signal Qin and provides the inverted signal to a D2 node of the selector 1520 and a D3 node of the selector 1525. Further, a phase code Qrot representing a phase of the quasi-orthogonal code is input to the selectors 1520 and 1525. The selectors 1520 and 1525 then control phases of the spread signals Iin and Qin according to the phase code Qrot. For example, the selectors 1520 and 1525 select the signals received at their D1 nodes, when the phase code is 0; the selectors 1520 and 1525 select the signals received at their D2 nodes, when the phase code is 1; the selectors 1520 and 1525 select the signals received at their D3 nodes, when the phase code is 2; the selectors 1520 and 1525 select the signals received at their D4 nodes, when the phase code is 3.

Although the channel spreader of FIG. 14 first spreads the channel signals using the Walsh orthogonal code and then spreads the quasi-orthogonal code by controlling a phase of the spread signal, it is also possible to first control a phase of the signal to be channel spread using the phase code and then spread the phase controlled channel signal using the Walsh orthogonal code. That is, it is possible that the rotator 1410 first controls phases of the input signals Xi and Xq according to the phase code Qrot and then, the multipliers 1450 and 1452 spread the phase controlled signals Xi and Xq with the Walsh orthogonal code.

Figure 16:
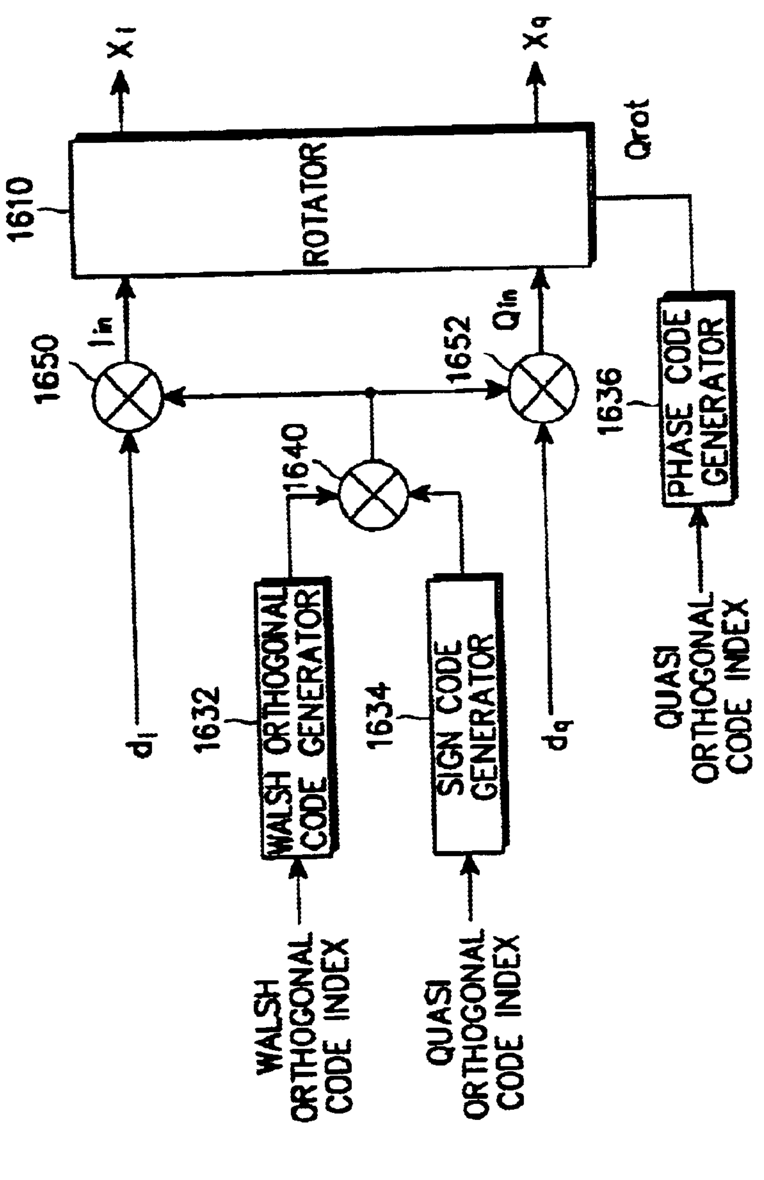
FIG. 16 is a block diagram illustrating a device for despreading signals transmitted from the complex quasi-orthogonal code spreading device of FIG. 12.

A despreader for a receiver for receiving the output of the transmitter has a reverse structure of the spreader shown in FIG. 7. Herein, a description will be made of a complex quasi-orthogonal code despreading device in the despreader;

FIG. 16 shows a despreader for a receiver, which corresponds to the complex quasi-orthogonal code spreader of FIG. 12. Referring to FIG. 16, multipliers 1650 and 1652 receive the input signals di and dq, respectively. A Walsh orthogonal code generator 1632 generates a Walsh orthogonal code corresponding to a Walsh orthogonal code index, and a sign code generator 1634 generates a sign code corresponding to a quasi-orthogonal code index. A multiplier 1640 then multiplies the Walsh orthogonal code by the sign code, and provides its output to the multipliers 1650 and 1652. The multiplier 1650 despreads the input signal di with the output of the multiplier 1640 to output a signal Iin. The multiplier 1652 despreads the input signal dq with the output of the multiplier 1640 to output a signal Qin. The signals Iin and Qin are input to a rotator 1610. A phase code generator 1636 generates a phase code corresponding to the quasi-orthogonal code index and provides the generated phase code to the rotator 1610. The rotator 1610 then outputs the input signals Iin and jQin as channel despread signals Xi and Xq, when the phase code is 0. Otherwise, when the phase code is 1, the rotator 1610 multiplies the input signals Iin and jQin by −j to output signals Qin−jIin as the channel despread signals Xi and Xq.

In FIG. 16, it is also possible that the channel despreader first controls phases of the PN despread signals Xi and Xq using the phase code and then despreads the phase controlled signals with a signal obtained by multiplying the Walsh code by the sign code.

Figure 17:
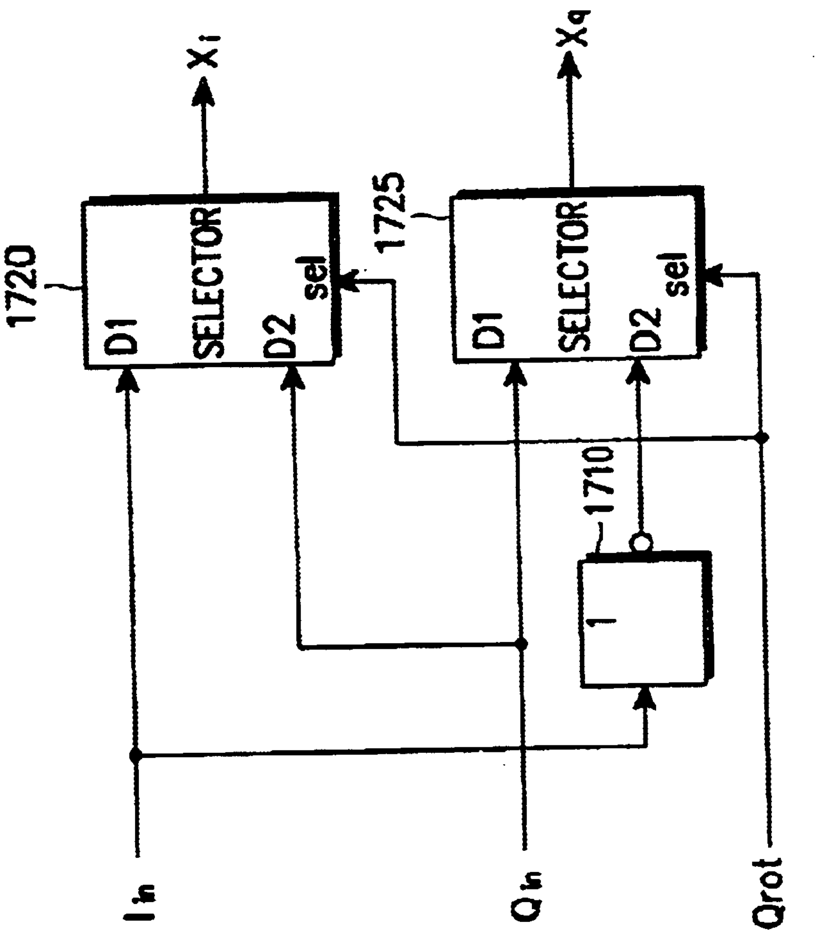
FIG. 17 is a detailed block diagram illustrating the rotator of FIG. 16.

FIG. 17 shows the rotator 1610 of FIG. 16. Referring to FIG. 17, the signal Iin is input to a D1 node of a selector 1720 and an inverter 1710, and the signal Qin is input to a D2 node of the selector 1720 and a D1 node of the selector 1725. The inverter 1710 inverts the signal Iin and provides the inverted signal to a D2 node of the selector 1725. At the same time, the phase code Qrot representing the phase of the quasi-orthogonal code is commonly input to the selectors 1720 and 1725. For example, the selectors 1720 and 1725 select the signals received at their D1 nodes, when the phase value is 0. Otherwise, when the phase value is 1, the selectors 1720 and 1725 select the signals received at their D2 nodes.

Figure 18:
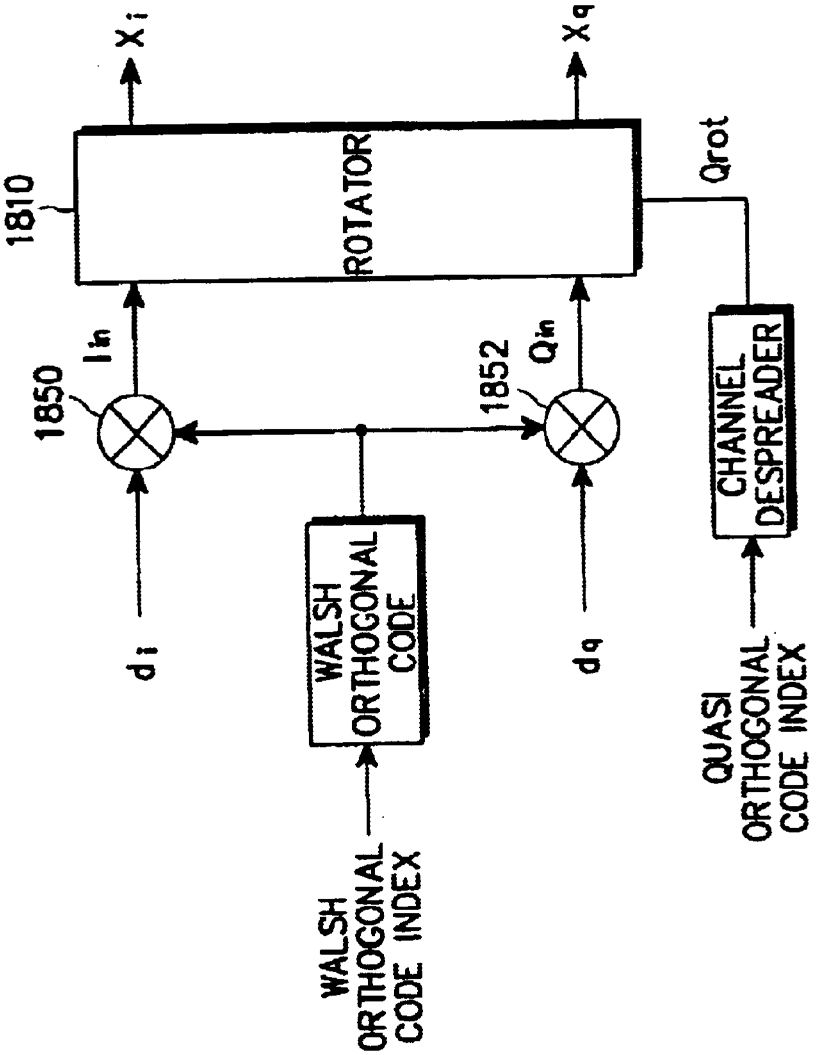
FIG. 18 is a block diagram illustrating a device for despreading signals transmitted from the complex quasi-orthogonal code spreading device of FIG. 14.

FIG. 18 shows the despreader for a receiver, which corresponds to the channel spreader of FIG. 14. Referring to FIG. 18, multipliers 1850 and 1852 receive the input signals di and dq, respectively. At the same time, a Walsh orthogonal code generator 1832 generates a Walsh orthogonal code corresponding to a Walsh orthogonal code index for channel assignment, and provides, the generated Walsh orthogonal code to the multipliers 1850 and 1852. The multiplier 1850 multiplies the input signal di by the Walsh orthogonal code to output a channel spread signal Iin. The multiplier 1852 multiplies the input signal dq by the Walsh orthogonal code to output a channel spread signal Qin. The signals Iin and Qin are input to a rotator 1810. A phase code generator 1836 generates a phase code Qrot representing a phase of the quasi-orthogonal code corresponding to the quasi-orthogonal code index for channel assignment and provides the generated phase code Qrot to the rotator 1810. The rotator 1810 controls the phases of channel spread signals Iin and Qin according to the phase code Qrot. For example, the rotator 1810 outputs the input signals Iin and jQin as the channel despread signals Xi and Xq when the phase code is 0. When the phase code is 1, the rotator 1810 multiplies the input signals Iin and jQin by j to output the signals −Qin+jIin as the channel despread signals Xi and Xq. When the phase code is 2, the rotator 1810 multiplies the input signals Iin and jQin by −1 to output the signals −Iin−jQin as the channel despread signals Xi and Xq. When the phase code is 3, the rotator 1810 multiplies the input signals Iin and jQin by −j to output the signals Qin−jIin as the channel despread signals Xi and Xq.

Figure 19:
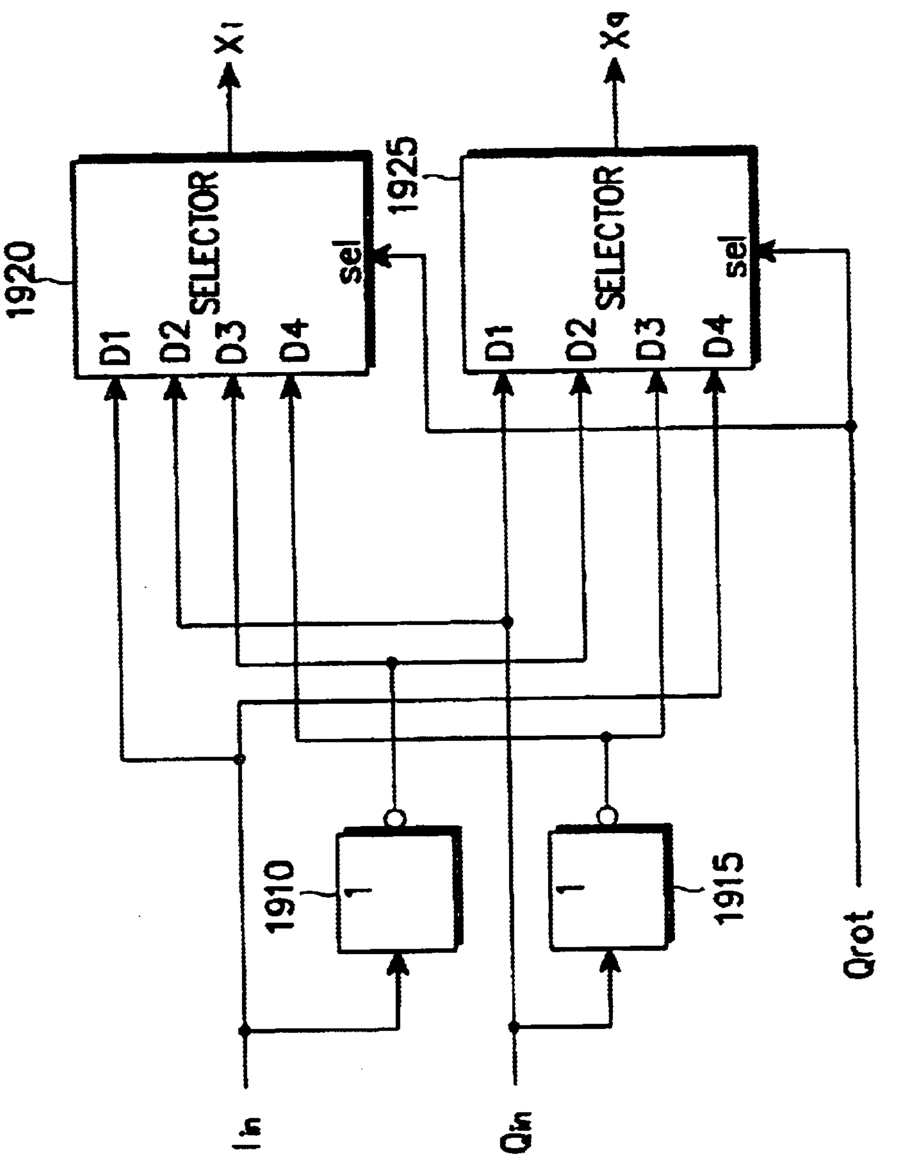
FIG. 19 is a detailed block diagram illustrating the rotator of FIG. 18.

FIG. 19 shows the rotator 1810 of FIG. 18. Referring to FIG. 19, the signal Iin is input to an inverter 1910, a D1 node of a selector 1920 and a D4 node of a selector 1925, and the signal Qin is input to an inverter 1915, a D2 node of the selector 1920 and a D1 node of the selector 1925. The inverter 1910 inverts the input signal Iin and provides the inverted signal to a D3 node of the selector 1920 and a D2 node of the selector 1925. The inverter 1915 inverts the input signal Qin and provides the inverted signal to a D4 node of the selector 1920 and a D3 node of the selector 1925. Further, a phase code Qrot representing a phase of the quasi-orthogonal code is input to the selectors 1920 and 1925. The selectors 1920 and 1925 then control phases of the spread signals Iin and Qin according to the phase code Qrot. For example, the selectors 1920 and 1925 select the signals received at their D1 nodes, when the phase code is 0; the selectors 1920 and 1925 select the signals received at their D2 nodes, when the phase code is 1; the selectors 1920 and 1925 select the signals received at their D3 nodes, when the phase code is 2; the selectors 1920 and 1925 select the signals received at their D4 nodes, when the phase code is 3.

Although the channel spreader of FIG. 18 first despreads the channel signals using the Walsh orthogonal code and then spreads the quasi-orthogonal code by controlling a phase of the despread signal, it is also possible to first control a phase of the signal to be channel despread using the phase code and then despread the phase controlled channel signal using the Walsh orthogonal code.

When spreading is performed using the sign and phase as described above, a spreading device can be implemented using another method. A method according to an embodiment of the present invention generates a complex quasi-orthogonal code mask, and converts the generated quasi-orthogonal code mask into the polar coordinate to generate the sign code and the phase code, wherein the phase code is expressed as a specific Walsh orthogonal code of the corresponding length. That is, in the complex quasi-orthogonal code masks shown in Tables 13 and 14, the values of the phase codes become a specific Walsh orthogonal code. Therefore, when spreading and despreading the channel signals using the methods of FIGS. 12 and 16, the sequence for the phase is actually equal to the sequence of the Walsh orthogonal code. That is, when using the complex quasi-orthogonal code masks of length 256, a phase sequence for a mask e1 is a sequence of a $213^{th}$Walsh orthogonal code; a phase sequence for a mask e2 is a sequence of a $10^{th}$ Walsh orthogonal code; a phase sequence for a mask e3 is a sequence of a $111^{th}$ Walsh orthogonal code; and a phase sequence for a mask e4 is a sequence of a $242^{nd}$ Walsh orthogonal code.

Figure 20:
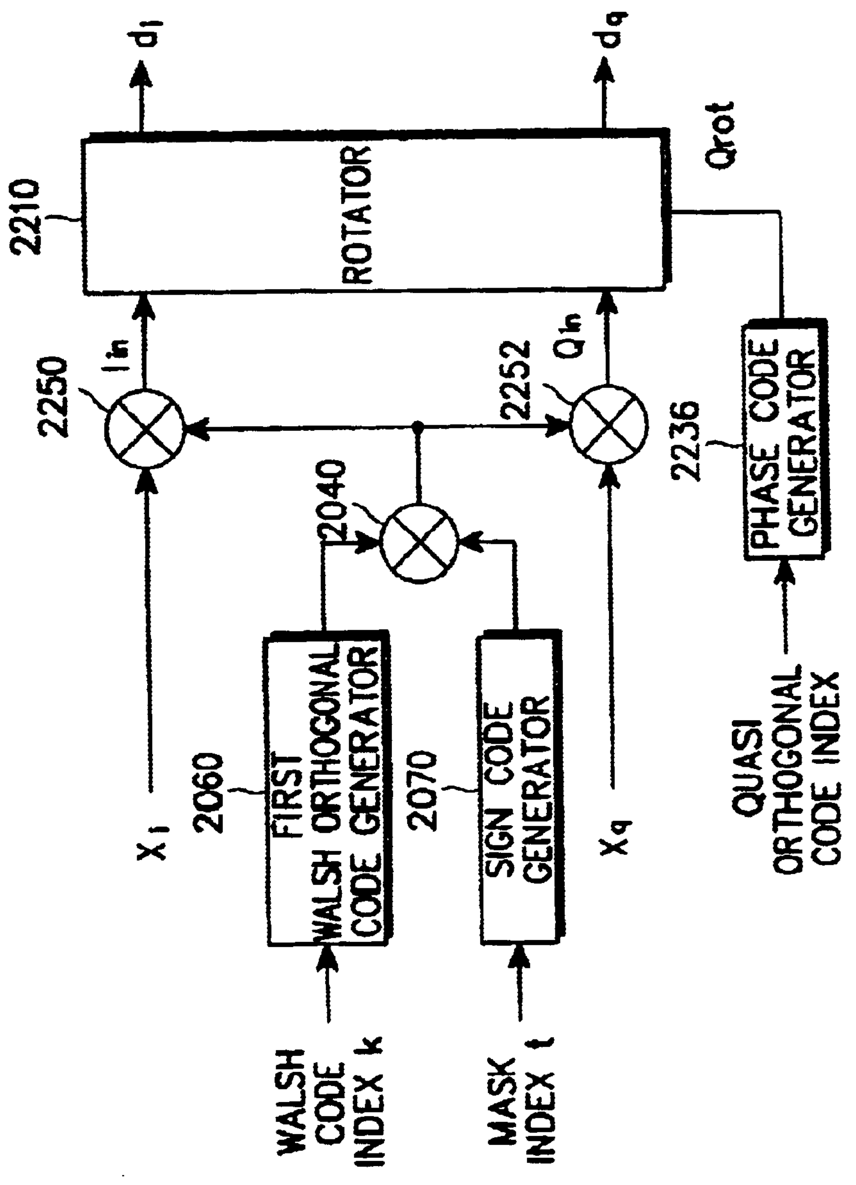
FIG. 20 is a detailed block diagram illustrating a complex quasi-orthogonal code spreading device in the channel spreading and PN masking part of FIG. 7 according to a third embodiment of the present invention.

Therefore, for channel spreading, it is possible to use a spreading device of FIG. 20, wherein a sequence for the phase is changed to a sequence of the Walsh orthogonal code. A Walsh orthogonal code generator mentioned below can either store all the Walsh orthogonal codes in a memory to read a Walsh orthogonal code corresponding to the Walsh orthogonal code index from the memory, or generate a Walsh orthogonal code using a specific device for generating the Walsh orthogonal code.

Referring to FIG. 20, multipliers 2050 and 2052 receive the input signals Xi and Xq, respectively. At the same time, a first Walsh orthogonal code generator 2060 generates a k-th Walsh orthogonal code corresponding to a Walsh orthogonal code index k for the channel assignment, and a sign code generator 2070 generates a sign code corresponding to a t-th quasi-orthogonal code index t. Here, the sign code generator 2070 can either store the sign codes of Table 13 in a memory to read a sign code corresponding to the mask index, or use a separate device for generating the sign code. A multiplier 2040 then multiplies the Walsh-orthogonal code by the sign code, and provides its output to the multipliers 2250 and 2252. The multiplier 2250 multiplies the input I-component signal Xi by the output of the multiplier 2040 to output a signal Iin. The multiplier 2252 multiplies the input Q-component signal Xq by the output of the multiplier 2040 to output a signal Qin. The signals Iin and Qin are input to a rotator 2210. A second Walsh orthogonal code generator 2236 generates a Walsh orthogonal code corresponding to the mask index k and provides the generated Walsh orthogonal code to the rotator 2210. When the sign codes-and the phase codes of length 256 shown in Table 13 are used for the sign code and the Walsh orthogonal code, a $213^{th}$ Walsh orthogonal code sequence is output for the Walsh orthogonal code index t=1; a $10^{th}$ Walsh orthogonal code sequence is output for the Walsh orthogonal code index t=2; a $111^{th}$ Walsh orthogonal code sequence is output for the Walsh orthogonal code index t=3; a $_{243}{}^{rd}$ Walsh orthogonal code sequence is output for the Walsh orthogonal code index t=4. The rotator 2010 rotates the input signals according to the Walsh orthogonal code sequence values. The rotator 2210 has the structure shown in FIG. 13.

Unlike the channel despreader of FIG. 16, the channel despreader of FIG. 20 uses the Walsh orthogonal code sequence instead of the phase code, thereby reducing the hardware complexity. That is, when using the Walsh orthogonal code, it is possible to use the Walsh orthogonal code generator included in the channel spreader and despreader. Therefore, memory is not required for storing the phase codes nor is a device for generating the phase codes, thus reducing the hardware complexity.

In the spreader for spreading the input signal with the complex quasi-orthogonal code, when the complex quasi-orthogonal code is expressed in the polar coordinate to spread the input signal, it is possible to use the sign code of length 256 and the sign code of length 128 shown in Tables 15 and 16, respectively, wherein "0" denotes the positive sign (+) and "1" denotes the negative sign (−).

TABLE 15

| | | |
|---|---|---|
| e1 | Sign | 0111110100100111111001001011111010000010110110001110010010111110 |
| | | 1101100001111101101111100001101111011000011111010100000111100100 |
| | | 0100111011101011110101110111001001001110111010110010100010001101 |
| | | 0001010001001110011100100010100011101011101100010111001000101000 |
| e2 | Sign | 0111110101110010000101000001101111010111110110001011111010110001 |
| | | 0111001001111101111001001110101100100111001010001011000110111110 |
| | | 1000110101111101111001000001010011011000001010001011000101000001 |
| | | 0111110110001101111010110001101111010111001001110100000110110001 |
| e3 | Sign | 0111100000100010110111011000011101110111110100101101001001110111 |
| | | 0100101111101110111011100100101110111011111000010001111001000100 |
| | | 0001111001000100101110111110000100010001101101001011010000010001 |
| | | 1101001001110111011101111101001000100010011110001000011111011101 |
| e4 | Sign | 0111110101001110000110110010100001111101101100010001101111010111 |
| | | 0001010011011000011100101011110111010111101100010001101101111110 |
| | | 1011111001110010001001111110101110111110100011010010011100010100 |
| | | 0010100000011011101100011000001011010111000110110100111010000010 |

TABLE 16

| | | |
|---|---|---|
| e1 | Sign | 0001010010001101000101000111001011010111010011100010100001001110 |
| | | 0111110100011011100000100001101110111110110110001011111000100111 |
| e2 | Sign | 0100101111011101001011011011101110111011110100100010001001001011 |
| | | 0100010011010010110111010100101101001011001000100010110101000100 |
| e3 | Sign | 0100011100100001101101111101000111011110101110001101000110110111 |
| | | 1000010011100010011101000001001011100010100001001110110110001011 |
| e4 | Sign | 0001101101000001101111100001101100101000100011010111001000101000 |
| | | 0010011101111101011111011101100011101011010011100100111000010100 |

In addition, the rotator 2210 of FIG. 20 operates with a clock having a very high rate, such as a chip rate, where the clock rate of the input signal is equal to an output rate of the Walsh orthogonal code.

Figure 21:
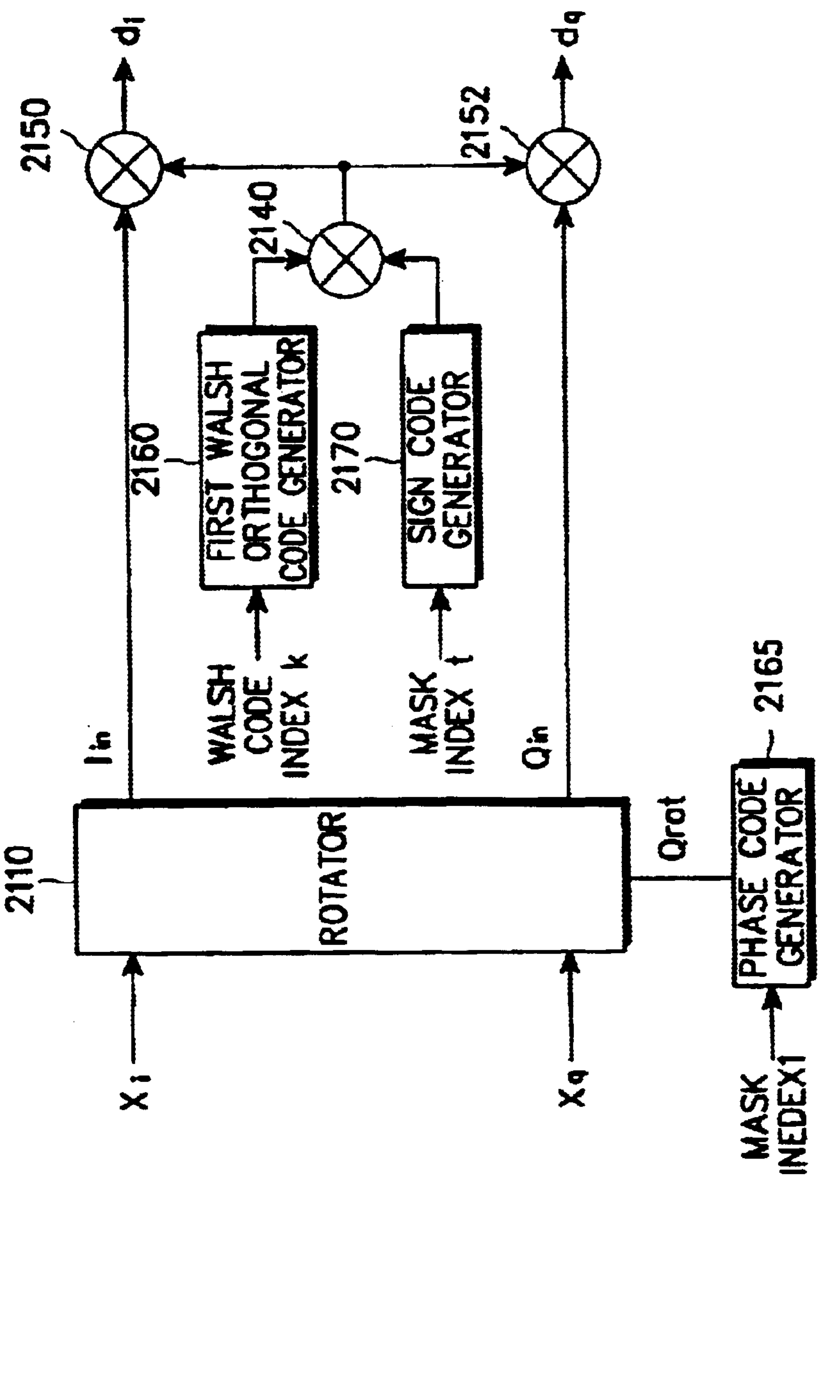
FIG. 21 is a detailed block diagram illustrating a complex quasi-orthogonal code spreading device in the channel spreading and PN masking part of FIG. 7 according to a fourth embodiment of the present invention.

FIG. 21 shows a modified despreader in which the position of a rotator 2110 is change. Since the rotator 2110 receives data symbols, the clock rate for the input signal of the rotator 2110 should be equal to the symbol rate. Now, a description will be made of a method for reducing the clock rate of the input signal of the rotator by changing the position of the rotator.

Referring to FIG. 21, the rotator 2110 receives input signals Xi and Xq at a clock rate, and at the same time, a Walsh orthogonal code generator 2165 generates a Walsh orthogonal code corresponding to an input mask index t. That is, when using the sign code and the phase code of length 256 shown in Table 13, the Walsh orthogonal code generator 2165 generates a $213^{th}$ Walsh orthogonal code sequence for a Walsh orthogonal code index t=1, a $10^{th}$ Walsh orthogonal code sequence for a Walsh orthogonal code index t=2, a $111^{th}$ Walsh orthogonal code sequence for a Walsh orthogonal code index t=3, and a $242^{nd}$ Walsh orthogonal code sequence for a Walsh orthogonal code index t=4. The Walsh orthogonal code sequences generated from the Walsh orthogonal code generator 2165 are input to the rotator 2110, which operates in the same manner as described with reference to FIG. 16. The rotator 2110 provides the output signals Iin and Qin to multipliers 2150 and 2152. At the same time, a Walsh orthogonal code generator 2160 generates a k-th Walsh orthogonal code corresponding to an input Walsh orthogonal code index k and provides the generated Walsh orthogonal code to a multiplier 2140. Further, a sign code generator 2170 generates a t-th sign code corresponding an input quasi-orthogonal code index t and provides the generated sign code to the multiplier 2140. Here, the sign code generator 2170 can either store the sign codes of Table 13 to read a sign code corresponding to the mask index t when necessary, or use a separate device for generating a sign code. The multiplier 2140 multiplies the Walsh orthogonal code by the sign code and provides its output to the multipliers 2150 and 2152. The multiplier 2150 multiplies the input signal Iin by the signal output from the multiplier 2140 and the multiplier 2152 multiplies the input signal Qin by the signal output from the multiplier 2140.

Herein, the rotators 2210 and 2110 of FIGS. 20 and 21 have the same structure as the rotator 1610 of FIG. 16.

A quasi-orthogonal code mask function having a good property for Condition 4 could be determined using the column permutation function $$\sigma(t)=\sum_{i=0}^{m-1} m(t+i)2^{m-1-i}$$

calculated in step 513 of FIG. 5. The above column permutation function converts the M-sequence to the Walsh orthogonal code, and there are several types of column permutation functions. Therefore, it is possible to use the different column permutation functions other than the above column permutation function. By using a proper column permutation function, it is possible to determine quasi-orthogonal code mask functions satisfying Condition 4. In an embodiment described below, there is provided a method for generating the above quasi-orthogonal code mask sequence using the different column permutation function. In the embodiment, the column permutation function is generated using a trace orthogonal basis on the Galois field $GF(2^m)$.

First, the trace orthogonal basis is $\{bi\ |0 \leqq i \leqq m-1\}$ of $GF(2^m)$, satisfying Equation (10) below.

$$Tr(b_i b_j)=0 \quad i \neq j$$

$$Tr(b_i b_j)=0 \quad i=j \qquad \text{Equation 10}$$

A column permutation function $\sigma^{-1}(t)$ can be generated using the trace orthogonal basis in accordance with Equation (11) below:

$$\sigma^{-1}(t)=\log_{\alpha}(c_0 c_0+c_1 b_1+\ldots+c_{m-1} b_{m-1})$$

$$t=c_{m-1}2^{m-1}+c_{m-2}2^{m-2}+\ldots+c_0 \qquad \text{Equation 11}$$

In the above orthogonal code generation method, the different orthogonal code mask function can be obtained by changing the column permutation function. In particular, when using the column permutation function generated from the trace orthogonal basis, it is possible to generate different masks. Further, several pairs of the generated quasi-orthogonal code mask functions can be selected to fully satisfy Conditions 1 to 4 for the quasi-orthogonal codes. In the embodiment below, a description will be made of a procedure for determining quasi-orthogonal code pairs completely satisfying Conditions 1 to 4 by using the trace orthogonal basis.

In this embodiment, a procedure for generating quasi-orthogonal code sequences which fully satisfy Conditions 1 to 4 is equal to the steps 511, 515, 517 and 519 of FIG. 5 for generating the quasi-orthogonal masks. Further, the trace orthogonal basis method is used in the step 513 for generating a column permutation function. Therefore, a description will be made focusing on the step for generating the column permutation function.

Here, a description will be made of an operation of generating column permutation functions using the trace orthogonal basis method in the process of generating the quasi-orthogonal code masks satisfying Conditions 1 to 4. It will be assumed herein that the embodiment generates a quasi-orthogonal code mask of length $2^7=128$. Further, it is assumed that a Galois generator polynomial for determining the quasi-orthogonal code mask is $f(x)=x^7+x^6+x^5+x^3+x^2+x+1$, trace orthogonal bases $\{\alpha^2, \alpha^{92}, \alpha^{16}, \alpha, \alpha^{80}, \alpha^5, \alpha^{88}\}$ (where a is a root of the generator polynomial f(x)) are used, and a set of the bases is referred to as an orthogonal basis set. In this case, a change in the sequence of the trace orthogonal bases will vary a partial correlation of the quasi-orthogonal mask. Therefore, the sequence of the trace orthogonal bases is used as specified above.

First, a column permutation function for the code length 128 can be calculated using Equation (11). More specifically, the column permutation function can be calculated by expressing the numbers 1 to 127 in an expansion $c_{m-1}2^{m-1}+c_{m-2}2^{m-2}+\ldots+c_0$, and taking finite logarithms for Galois finite elements calculated by permuting $2^i$ with the corresponding trace orthogonal basis $b_i$. For this, the numbers 1 to 127 can be expressed in the decimal expansion $c_{m-1}2^{m-1}+c_{m-2}2^{m-2}+\ldots+c_0$, as follows:

$(1)_{10}=(0000001)_2=0\times2^6+0\times2^5+0\times2^4+0\times2^3+0\times2^2+0+2^1+1\times2^0$ $(2)_{10}=(0000010)_2=0\times2^6+0\times2^5+0\times2^4+0\times2^3+0\times2^2+1\times2^1+0\times2^0$ $(3)_{10}=(0000011)_2=0\times2^6+0\times2^5+0\times2^4+0\times2^3+0\times2^2+1\times2^1 0\times2^0$ $(4)_{10}=(0000101)_2=0\times2^6+0\times2^5+0\times2^4+0\times2^3+1\times2^2+0\times2^1+0\times2^0$ $(5)_{10}=(0000101)_2=0\times2^6+0\times2^5+0\times2^4+0\times2^3+1\times2^2+0\times2^1+1\times2^0$ $(6)_{10}=(0000000)_2=0\times2^6+0\times2^5+0\times2^4+0\times2^3+1\times2^2+1\times2^1+1\times2^0$ $(7)_{10}=(0000111)_2=0\times2^6+0\times2^5+0\times2^4+1\times2^3+0\times2^2+0\times2^1+0\times2^0$ $(8)_{10}=(0001000)_2=0\times2^6+0\times2^5+0\times2^4+1\times2^3+0\times2^2+0\times2^1+0\times2^0$ $(9)_{10}=(0001001)_2=0\times2^6+0\times2^5+0\times2^4+1\times2^3+0\times2^2+0\times2^1+1\times2^0$ $(10)_{10}=(0001010)_2=0\times2^6+0\times2^5+0\times2^4+1\times2^3+0\times2^2+1\times2^1+0\times2^0$ $(116)_{10}=(1110100)_2=1\times2^6+1\times2^5+1\times2^4+0\times2^3+1\times2^2+0\times2^1+0\times2^0$ $(117)_{10}=(1110101)_2=1\times2^6+1\times2^5+1\times2^4+0\times2^3+1\times2^2+0\times2^1+1\times2^0$ $(118)_{10}=(1110110)_2=1\times2^6+1\times2^5+1\times2^4+0\times2^3+1\times2^2+1\times2^1+0\times2^0$ $(119)_{10}=(1110111)_2=1\times2^6+1\times2^5+1\times2^4+0\times2^3+1\times2^2+1\times2^1+1\times2^0$ $(120)_{10}=(1111000)_2=1\times2^6+1\times2^5+1\times2^4+1\times2^3+0\times2^2+0\times2^1+0\times2^0$ $(121)_{10}=(1111001)_2=1\times2^6+1\times2^5+1\times2^4+1\times2^3+0\times2^2+0\times2^1+1\times2^0$ $(122)_{10}=(1111010)_2=1\times2^6+1\times2^5+1\times2^4+1\times2^3+0\times2^2+1\times2^1+0\times2^0$ $(123)_{10}=(1111011)_2=1\times2^6+1\times2^5+1\times2^4+1\times2^3+0\times2^2+1\times2^1+1\times2^0$ $(124)_{10}=(1111100)_2=1\times2^6+1\times2^5+1\times2^4+1\times2^3+1\times2^2+0\times2^1+0\times2^0$ $(125)_{10}=(1111101)_2=1\times2^6+1\times2^5+1\times2^4+1\times2^3+1\times2^1+0\times2^1+1\times2^0$ $(126)_{10}=(1111110)_2=1\times2^6+1\times2^5+1\times2^4+1\times2^3+1\times2^2+1\times2^1+0\times2^0$ $(127)_{10}=(1111111)_2=1\times2^6+1\times2^5+1\times2^4+1\times2^3+1\times2^2+1\times2^1+1\times2^0$ By permuting $\mathbf{2}^i$ with the corresponding trace orthogonal bases $b_i$ (i.e., permuting $\mathbf{2}^0$ with $\alpha^2$, $2^1$ with $\alpha^{92}$, $2^2$ with $\alpha^{16}$, $2^3$ with $\alpha$, $2^4$ with $\alpha$, $2^5$ with $\alpha^5$, and $2^6$ with $\alpha^{88}$), the Galois finite element sequences are generated as follows:

$(0000001)_2\rightarrow0\times\alpha^{88}+0\times\alpha^5+0\times\alpha^{80}+0\times\alpha+0\times\alpha^{16}+0\times\alpha^{92}+1\times\alpha^2=\alpha^2$ $(0000010)_2\rightarrow0\times\alpha^{88}+0\times\alpha^5+0\times\alpha^{80}+0\times\alpha+0\times\alpha^{16}+1\times\alpha^{92}+0\times\alpha^2=\alpha^{92}$ $(0000011)_2\rightarrow0\times\alpha^{88}+0\times\alpha^5+0\times\alpha^{80}+0\times\alpha+0\times\alpha^{16}+1\times\alpha^{92}+0\times\alpha^2=\alpha^{81}$ $(0000100)_2\rightarrow0\times\alpha^{88}+0\times\alpha^5+0\times\alpha^{80}+0\times\alpha+1\times\alpha^{16}+0\times\alpha^{92}+0\times\alpha^2=\alpha^{16}$ $(0000101)_2\rightarrow0\times\alpha^{88}+0\times\alpha^5+0\times\alpha^{80}+0\times\alpha+1\times\alpha^{16}+0\times\alpha^{92}+1\times\alpha^2=\alpha^{42}$ $(0000110)_2\rightarrow0\times\alpha^{88}+0\times\alpha^5+0\times\alpha^{80}+0\times\alpha+1\times\alpha^{16}+1\times\alpha^{92}+0\times\alpha^2=\alpha^{84}$ $(0000111)_2\rightarrow0\times\alpha^{88}+0\times\alpha^5+0\times\alpha^{80}+0\times\alpha+1\times\alpha^{16}+1\times\alpha^{92}+1\times\alpha^2=\alpha^{60}$ $(0001000)_2\rightarrow0\times\alpha^{88}+0\times\alpha^5+0\times\alpha^{80}+1\times\alpha+0\times\alpha^{16}+0\times\alpha^{92}+0\times\alpha^2=\alpha$ $(0001001)_2\rightarrow0\times\alpha^{88}+0\times\alpha^5+0\times\alpha^{80}+1\times\alpha+0\times\alpha^{16}+0\times\alpha^{92}+1\times\alpha^2=\alpha^{56}$ $(0001010)_2\rightarrow0\times\alpha^{88}+0\times\alpha^5+0\times\alpha^{80}+1\times\alpha+0\times\alpha^{16}+1\times\alpha^{92}+0\times\alpha^2=\alpha^{65}$ $(1110100)_2\rightarrow1\times\alpha^{88}+1\times\alpha^5+1\times\alpha^{80}+0\times\alpha+1\times\alpha^{16}+0\times\alpha^{92}+0\times\alpha^2=\alpha^{41}$ $(1110101)_2\rightarrow1\times\alpha^{88}+1\times\alpha^5+1\times\alpha^{80}+0\times\alpha+1\times\alpha^{16}+0\times\alpha^{92}+1\times\alpha^2=\alpha^{44}$ $(1110110)_2\rightarrow1\times\alpha^{88}+1\times\alpha^5+1\times\alpha^{80}+0\times\alpha+1\times\alpha^{16}+1\times\alpha^{92}+0\times\alpha^2=\alpha^{33}$ $(1110111)_2\rightarrow1\times\alpha^{88}\times1\times\alpha^5+0\times\alpha^{80}+0\times\alpha+1\times\alpha^{16}+1\times\alpha^{92}+1\times\alpha^2=\alpha^{55}$ $(1111000)_2\rightarrow1\times\alpha^{88}+1\times\alpha^5+1\times\alpha^{80}+1\times\alpha+0\times\alpha^{16}+0\times\alpha^{92}+0\times\alpha^2=\alpha^{70}$ $(1111001)_2\rightarrow1\times\alpha^{88}+1\times\alpha^5+1\times\alpha^{80}+1\times\alpha+0\times\alpha^{16}+0\times\alpha^{92}+1\times\alpha^2=\alpha^{78}$ $(1111010)_2\rightarrow1\times\alpha^{88}+1\times\alpha^5+1\times\alpha^{80}+1\times\alpha+1\times\alpha^{16}+1\times\alpha^{92}+0\times\alpha^2=\alpha^{39}$ $(1111011)_2\rightarrow1\times\alpha^{88}+1\times\alpha^5+1\times\alpha^{80}+1\times\alpha+0\times\alpha^{16}+1\times\alpha^{92}+1\times\alpha^2=\alpha^{118}$ $(1111010)_2\rightarrow1\times\alpha^{88}+1\times\alpha^5+1\times\alpha^{80}+1\times\alpha+0\times\alpha^{16}+1\times\alpha^{92}+1\times\alpha^2=\alpha^{15}$ $(1111101)_2\rightarrow1\times\alpha^{88}+1\times\alpha^5+1\times\alpha^{80}+1\times\alpha+1\times\alpha^{16}+0\times\alpha^{92}+1\times\alpha^2=\alpha^{122}$ $(1111110)_2\rightarrow1\times\alpha^{88}+1\times\alpha^5+1\times\alpha^{80}+1\times\alpha+1\times\alpha^{16}+1\times\alpha^{92}+1\times\alpha^2=\alpha^{110}$ $(1111111)_2\rightarrow1\times\alpha^{88}+1\times\alpha^5+1\times\alpha^{80}+1\times\alpha+1\times\alpha^{16}+1\times\alpha^{92}+1\times\alpha^2=\alpha^0$ By taking logarithms having the calculated Galois element sequences as bases a which are Galois elements (i.e., enumerating exponents of the respective element sequences), it is possible to calculate the column permutation function for the code length 128.

Therefore, the column permutation function $\sigma^{-1}$ (t) can be calculated as follows, in accordance with Equation (11):

2 92 81 16 42 84 60 1 56 65 29 82 30 22 9 80
86 51 8 107 76 46 67 91 125 19 21 63 48 104 113 5
90 106 73 53 121 95 6 94 124 75 74 100 14 24 98 52
20 66 93 116 109 34 111 120 18 45 123 87 126 57 3 88
117 54 101 89 103 50 13 102 38 32 37 4 112 7 99 12
69 40 36 105 47 85 23 49 77 43 31 72 62 79 97 26
71 11 27 83 17 108 64 10 61 68 114 59 119 115 28 25
96 35 58 41 44 33 55 70 78 39 118 15 122 110 0

By applying the above column permutation function $\sigma^{-1}$ (t) to the step 513 of FIG. 5, it is possible to calculate the quasi-orthogonal code mask completely satisfying Condition 4, as follows:

TABLE 17

| $f(X) = 1 + X + X^2 + X^3 + X^5 + X^6 + X^7$ <br> $g(X) = 3 + 3X + X^2 + X^3 + 2X^4 + 3X^5 + X^6 + X^7$ | | | | | | | | |
|---|---|---|---|---|---|---|---|---|
| e1 | 03323221 | 32212110 | 10030332 | 03323221 | 10030332 | 03323221 | 21101003 | 10030332 |
| | 10030332 | 03323221 | 21101003 | 10030332 | 21101003 | 10030332 | 32212110 | 21101003 |
| e2 | 03230301 | 12103010 | 10303230 | 23212303 | 21232101 | 12323032 | 32301030 | 23032321 |
| | 32301030 | 23032321 | 03010323 | 30101210 | 32121012 | 01030121 | 03230301 | 12103010 |
| e3 | 02113122 | 22133302 | 20333122 | 00313302 | 31222033 | 33020031 | 13002033 | 11200031 |
| | 20113100 | 22311102 | 02333100 | 00131102 | 31000233 | 11020013 | 13220233 | 33200013 |

Figure 22:
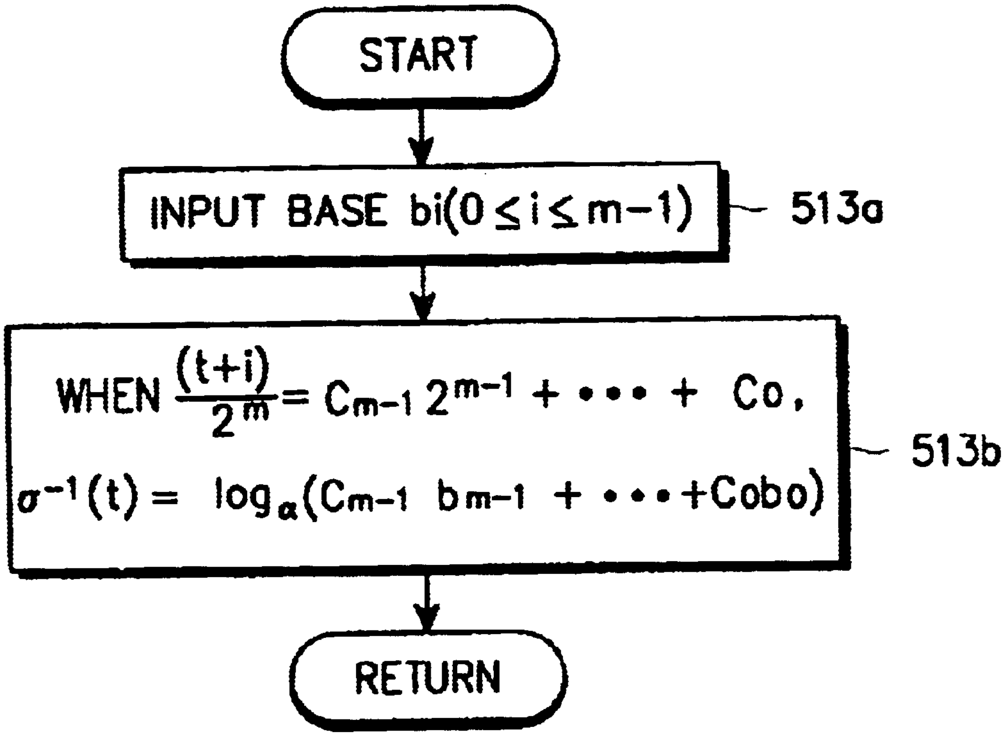
FIG. 22 is a flow diagram illustrating a procedure for generating a column permutation function in the quasi-orthogonal code generation process of FIG. 5 according to an embodiment of the present invention.

FIG. 22 shows a procedure for generating the column permutation function. Referring to FIG. 22, when the bases $b_i$ are input in step 513*a*, the column permutation function $\sigma^{-1}$ (t) is generated in accordance with Equation (11) in step 513*b*. Thereafter, step 515 of FIG. 5 is performed using the calculated $\sigma^{-1}$ (t), and the succeeding process is performed in the same method.

Such a column permutation function can also be generated from the bases satisfying Equation (10) using the same process as stated above, even for the lengths 256 and 512. Further, it is also possible to generate quasi-orthogonal code masks completely satisfying Condition 4.

Tables 18 and 19 below shows quasi-orthogonal code masks of lengths 256 and 512, respectively, which are generated from the bases shown below and completely satisfy Condition 4.

TABLE 18

| $f(X) = 1 + X + X^3 + X^5 + X^8$ <br> $g(X) = 1 + 3X + 2X^2 + X^3 + 3X^5 + X^8$ | | | | | | | | |
|---|---|---|---|---|---|---|---|---|
| e1 | 02330031 | 00312011 | 22130233 | 02330031 | 02112231 | 22312033 | 22312033 | 20330013 |
| | 22312033 | 02112231 | 20330013 | 22312033 | 22130233 | 20112213 | 20112213 | 00312011 |
| | 11201322 | 31001120 | 31001120 | 33023100 | 11023122 | 13001102 | 31223320 | 11023122 |
| | 13001102 | 11023122 | 11023122 | 31223320 | 13223302 | 33023100 | 11201322 | 13223302 |
| e2 | 01031012 | 12102123 | 01033230 | 12100301 | 12100301 | 23211012 | 12102123 | 23213230 |
| | 23213230 | 12102123 | 23211012 | 12100301 | 30322123 | 23211012 | 30320301 | 23213230 |
| | 32122303 | 21011232 | 10302303 | 03231232 | 21013010 | 10302303 | 03233010 | 32122303 |
| | 10300121 | 21011232 | 32120121 | 03231232 | 03231232 | 10302303 | 21011232 | 32122303 |
| e3 | 01121223 | 10210310 | 21323203 | 12230112 | 30230130 | 21101003 | 10032110 | 23121201 |
| | 21103221 | 30232312 | 23123023 | 10030332 | 10212132 | 01123001 | 12232330 | 21321021 |
| | 23301223 | 32030310 | 21321021 | 12232330 | 30232312 | 21103221 | 32212110 | 01301201 |
| | 21101003 | 30230130 | 01303023 | 32210332 | 32032132 | 23303001 | 12230112 | 21323203 |

TABLE 19

| $f(X) = 1 + X^4 + X^9$ <br> $g(X) = 3 + 2X^2 + 3X^4 + X^8$ | | | | | | | | |
|---|---|---|---|---|---|---|---|---|
| e1 | 03103203 | 32032132 | 32032132 | 21321021 | 10210310 | 03103203 | 03103203 | 32032132 |
| | 10210310 | 03103203 | 03103203 | 32032132 | 21321021 | 10210310 | 10210310 | 03103203 |
| | 10210310 | 03103203 | 03103203 | 32032132 | 21321021 | 10210310 | 10210310 | 03103203 |
| | 21321021 | 10210310 | 10210310 | 03103203 | 32032132 | 21321021 | 21321021 | 10210310 |
| | 12012312 | 23123023 | 23123023 | 30230130 | 01301201 | 12012312 | 12012312 | 23123023 |
| | 01301201 | 12012312 | 12012312 | 23123023 | 30230130 | 01301201 | 01301201 | 12012312 |
| | 01301201 | 12012312 | 12012312 | 23123023 | 30230130 | 01301201 | 01301201 | 12012312 |
| | 30230130 | 01301201 | 01301201 | 12012312 | 23123023 | 30230130 | 30230130 | 01301201 |
| e2 | 00131102 | 13002033 | 13222011 | 00311120 | 00133320 | 13000211 | 13220233 | 00313302 |
| | 13000211 | 22311102 | 00313302 | 31002011 | 31220211 | 00131102 | 22133302 | 13222011 |
| | 13222011 | 00311120 | 22313320 | 31220211 | 31002011 | 22131120 | 00133320 | 13000211 |
| | 22131120 | 13220233 | 13000211 | 22311102 | 22133302 | 13222011 | 13002033 | 22313320 |
| | 00133320 | 13000211 | 31002011 | 22131120 | 22313320 | 31220211 | 13222011 | 00311120 |
| | 31220211 | 00131102 | 00311120 | 31000233 | 31222033 | 00133320 | 00313302 | 31002011 |
| | 13220233 | 00313302 | 00133320 | 13000211 | 13222011 | 00311120 | 00131102 | 13002033 |
| | 00311120 | 31000233 | 13002033 | 22313320 | 22131120 | 13220233 | 31222033 | 00133320 |
| e3 | 03230301 | 01030121 | 23032321 | 03010323 | 10303230 | 12103010 | 30101210 | 10123212 |
| | 23210121 | 21010301 | 21230323 | 01212321 | 12101232 | 10301012 | 10121030 | 30103032 |
| | 23032321 | 03010323 | 03230301 | 01030121 | 12323032 | 32301030 | 32121012 | 30321232 |
| | 03012101 | 23030103 | 01032303 | 03232123 | 10121030 | 30103032 | 12101232 | 10301012 |
| | 12101232 | 32123230 | 32303212 | 30103032 | 23210121 | 03232123 | 03012101 | 01212321 |
| | 32121012 | 12103010 | 30101210 | 32301030 | 21012123 | 01030121 | 23032321 | 21232101 |
| | 10121030 | 12321210 | 30323010 | 10301012 | 03012101 | 01212321 | 23210121 | 03232123 |
| | 30101210 | 32301030 | 32121012 | 12103010 | 01210103 | 03010323 | 03230301 | 23212303 |

As stated above, the complex number of 1, −1, j and −j can be expressed using the sign and phase. In Tables 18 and 19, and other tables for the complex quasi-orthogonal code masks, the masks expressed with 0, 1, 2 and 3 can, be converted to 1, −1, j and −j, by gray mapping. In addition, with regard to the quasi-orthogonal code sequences which can be expressed with 1, −1, j and −j, "1" can, be expressed with a sign code "0" and a phase code "0"; "−1" can be expressed with a sign code "1" and a phase code "0"; "j" can be expressed with a sign code "0" and a phase code "1"; and "−j" can be expressed with a sign code "1" and a phase code "1".

In the spreading device for spreading an input signal with the complex quasi-orthogonal sequence, when the complex quasi-orthogonal sequence is expressed in the polar coordinate to spread the input signal, the masks of lengths 128, 256 and 512 can be expressed with the sign and phase values of Tables 20A, 21A and 22A below, respectively. Here, the sign value of "0" indicates a positive sign (+) and the sign value of "1" indicates a negative sign (−). Further, the phase control value of "0" indicates the real component and the phase control value of "1" indicates the imaginary component obtained by phase shifting the signal by 90°.

Table 20A below shows the values determined by converting the quasi-orthogonal code masks of length 128, shown in Table 17, satisfying Conditions 1 to 4 to the sign and phase values of the polar coordinate.

TABLE 20A

| | | |
|---|---|---|
| e1 | Sign | 0111111011101000000101110111111100001011101111111010000000100010111<br>0001011101111111010000000100010111100000001000101111111010001000000 1 |
| | Phase | 0110100110010110100101100110100110010110011010010110100110010110<br>1001011001101001011010011001011001101001100101101001011001101001 |
| e2 | Sign | 0111010001001000000101110111011011011100001111011111100010110111 10<br>1110001011011110010001111000010011010001000100100111010001001000 |
| | Phase | 0101010110101010101010100101010101010101101010101010101001010101<br>1010101001010101010101011010101010101010010101010101010110101010 |
| e3 | Sign | 0100101111011101101110110010110111011110100100100101100100010<br>1000100011100001011110000000100011000011100010001011101111100001 |
| | Phase | 0011110000111100001111000011110011000011110000111100001111000011<br>0011110000111100001111000011110011000011110000111100001111000011 |

Table 21A below shows the values determined by converting the quasi-orthogonal code masks of length 128, shown in Table 18, satisfying Conditions 1 to 4 to the sign and phase values of the polar coordinate.

TABLE 21A

| | | |
|---|---|---|
| e1 | Sign | 0111001000101000110101110111001001001110111010111110101110110001<br>1110101101001110101100011110101111010111100011011000110100101000<br>0010011110000010100000101101100000001101101000001101111100001101 1<br>0100000100011011000110111011111100111110111011000001001110111110 1 |
| | Phase | 0011001100110011001100110011001100110011001100110011001100110011<br>0011001100110011001100110011001100110011001100110011001100110011<br>1100110011001100110011001100110011001100110011001100110011001100<br>1100110011001100110011001100110011001100110011001100110011001100 |
| e2 | Sign | 0001000101001011000111100100010001000100111000010100101111101110<br>1110111001001011111000010100010010111011111000011011010011101110<br>1101110110000111001011010111011110001000001011010111100011011101<br>0010001010000111111010010011101110111011100101101100001111011101 |
| | Phase | 0101101010100101010110101010010110100101010110101010010101011010<br>0101101010100101010110101010010110100101010110101010010101011010<br>1010010101011010101001010101101001011010101001010101101010100101<br>1010010101011010101001010101101001011010101001010101101010100101 |
| e3 | Sign | 0001011100100100101111010111000110110010100000001000110001101010 0<br>1000111010111101110110110001011100101011000110000111111010110010<br>1110011111010100101100100111111010111101100011101110100000100100<br>1000000110110010001010111110011111011011111010000111000110111101 |
| | Phase | 0110100110010110011010011001011010010110011010011001011001101001<br>0110100110010110011010011001011010010110011010011001011001101001<br>0110100110010110011010011001011010010110011010011001011001101001<br>0110100110010110011010011001011010010110011010011001011001101001 |

Table 22A below shows the values determined by converting the quasi-orthogonal code masks length 128, shown in Table 19, satisfying Conditions 1 to 4 to the sign and phase values of the polar coordinate.

TABLE 22A

| | | |
|---|---|---|
| e1 | Sign | 0100110111011011110110111011001000100100010011010100110111011011 |
| | | 0010010001001101010011011101101110110010001001000010010001001101 |
| | | 0010010001001101010011011101101110110010001001000010010001001101 |
| | | 1011001000100100001001000100110111011011101100101011001000100100 |
| | | 0100110111011011110110111011001000100100010011010100110111011011 |
| | | 0010010001001101010011011101101110110010001001000010010001001101 |
| | | 0010010001001101010011011101101110110010001001000010010001001101 |
| | | 1011001000100100001001000100110111011011101100101011001000100100 |
| | Phase | 0110100110010110100101100110100110010110011010010110100110010110 |
| | | 1001011001101001011010011001011001101001100101101001011001101001 |
| | | 1001011001101001011010011001011001101001100101101001011001101001 |
| | | 0110100110010110100101100110100110010110011010010110100110010110 |
| | | 1001011001101001011010011001011001101001100101101001011001101001 |
| | | 0110100110010110100101100110100110010110011010010110100110010110 |
| | | 0110100110010110100101100110100110010110011010010110100110010110 |
| | | 1001011001101001011010011001011001101001100101101001011001101001 |
| e2 | Sign | 00010001010010110111110000010001000011110010001000111011100101101 |
| | | 0100010011100001001011011000100010110100000100011101110101111000 |
| | | 0111100000100010111011101011010010001000110100100001111001000100 |
| | | 1101001001110111010001001110000111011101011110000100101111101110 |
| | | 0001111001000100100010001101001011101110101101000111100000100010 |
| | | 10110100000010001001000101000011110111011000111100010110110001000 |
| | | 01110111001011010001111001000100011110000001000100001000101001011 |
| | | 0010001010000111010010111110111011010010011101111011101100011110 |
| | Phase | 0011110011000011110000110011110000111100110000111100001100111100 |
| | | 1100001100111100001111001100001111000011001111000011110011000011 |
| | | 1100001100111100001111001100001111000011001111000011110011000011 |
| | | 0011110011000011110000110011110000111100110000111100001100111100 |
| | | 0011110011000011110000110011110000111100110000111100001100111100 |
| | | 1100001100111100001111001100001111000011001111000011110011000011 |
| | | 1100001100111100001111001100001111000011001111000011110011000011 |
| | | 0011110011000011110000110011110000111100110000111100001100111100 |
| e3 | Sign | 01110100000010010110111100100011100101110010010001000010000011101 |
| | | 1110001010000100101101110010111001000111001000010001001010001011 |
| | | 110111100100011101110100000010010011110111111000101101000110110111 |
| | | 0100100011010001000111010111101100010010100010110100011100100001 |
| | | 0100011111011110111011011000101111100010011110110100100000101110 |
| | | 1101000101001000100001001110001010001011000100101101111010111000 |
| | | 000100100111010010111000000100001010010000001011101110001001111011 |
| | | 10000100111000101101000101001000000100001010001110111010011101101 |
| | Phase | 0101010101010101010101010101010101101010101010101010101010101010 |
| | | 0101010101010101010101010101010101101010101010101010101010101010 |
| | | 0101010101010101010101010101010101101010101010101010101010101010 |
| | | 0101010101010101010101010101010101101010101010101010101010101010 |
| | | 1010101010101010101010101010101010010101010101010101010101010101 |
| | | 1010101010101010101010101010101010010101010101010101010101010101 |
| | | 1010101010101010101010101010101010010101010101010101010101010101 |
| | | 1010101010101010101010101010101010010101010101010101010101010101 |

The phase values shown in Tables 20A, 21A and 22A are specific Walsh orthogonal code values of the corresponding lengths. That is, for the quasi-orthogonal code masks of length 128 shown in Table 20A, the phase value for e1 is equal to that of the $127^{th}$ Walsh orthogonal code, the phase value for e2 is equal to that of the $89^{th}$ Walsh orthogonal code, and the phase value for e3 is equal to that of the $38^{th}$ Walsh orthogonal code, wherein the Walsh orthogonal numbers are 0 to 127. In addition, for the quasi-orthogonal code masks of length 256 shown in Table 21A, the phase value for e1 is equal to that of the $130^{th}$ Walsh orthogonal code, the phase value for e2 is equal to that of the $173^{rd}$ Walsh orthogonal code, and the phase value for e3 is equal to that of the $47^{th}$ Walsh orthogonal code, wherein the Walsh orthogonal numbers are 0 to 255. Further, for the quasi-orthogonal code masks of length 512 shown in Table 22A, the phase value for e1 is equal to that of the $511^{st}$ Walsh orthogonal code, the phase value for e2 is equal to that of the $222^{nd}$ Walsh orthogonal code, and the phase value for e3 is equal to that of the $289^{th}$ Walsh orthogonal code, wherein the Walsh orthogonal numbers are 0 to 511.

When using the quasi-orthogonal codes for channel spreading and despreading, it is also possible to store only the sign values of Tables 20B, 21B and 22B below in the channel spreader and despreader, and generate the phase values using the Walsh orthogonal code generator.

TABLE 20B

| | | |
|---|---|---|
| e1 | Sign | 0111111011101000000101110111111100001011101111111010000000100010111 |
| | | 00010111011111110100000001000101111000000010001011111110100010000001 |
| | Phase | $127^{th}$ Walsh |
| e2 | Sign | 0111010001001000000101110111011011011100001110111110001011011110 |

TABLE 20B-continued

| | | |
|---|---|---|
| | Phase | $89^{th}$ Walsh |
| e3 | Sign | 0100101111011101101110110010110110111011110100100100101100100010<br>1000100011100001011110000000100011000011100010001011101111100001 |
| | Phase | $38^{th}$ Walsh |

TABLE 21B

| | | |
|---|---|---|
| e1 | Sign | 0111001000101000110101110111001001001110111010111101011101100 01<br>1110101101001110101100011110101111010111100011011000110100101000<br>0010011110000010100000101101100000011011010000011011111000011011<br>0100000100011011000110111011111001111101110110000010011101111101 |
| | Phase | $130^{th}$ Walsh |
| e2 | Sign | 0001000101001011000111100100010001000100111000010100101111101110<br>1110111001001011111000010100010010111011111000011011010011101110<br>1101110110000111001011010111011110001000001011010111100011011101<br>0010001010000111110100100111011101110111001011011000011111011101 |
| | Phase | $173^{rd}$ Walsh |
| e3 | Sign | 0001011100100100101111010111000110110010100000010001100011010100<br>1000111010111101110110110001011100101011000110000111111010110010<br>1110011111010100101100100111111010111101100011101110100000100100<br>1000000110110010001010111110011111011011111010000111000110111101 |
| | Phase | $47^{th}$ Walsh |

TABLE 22B

| | | |
|---|---|---|
| e1 | Sign | 0100110111011011110110111011001000100100010011010100110111011011<br>0010010001001101010011011101101110110010001001000010010001001101<br>0010010001001101010011011101101110110010001001000010010001001101<br>1011001000100100001001000100110111011011101100101011001000100100<br>0100110111011011110110111011001000100100010011010100110111011011<br>0010010001001101010011011101101110110010001001000010010001001101<br>0010010001001101010011011101101110110010001001000010010001001101<br>1011001000100100001001000100110111011011101100101011001000100100 |
| | Phase | $511^{th}$ Walsh |
| e2 | Sign | 0001000101001011011110000010001000011110010001000111011100101101<br>0100010011100001001011011000100010110100000100011101110101111000<br>0111100000100010111011101011010010001000110100100001111001000100<br>1101001001110111010001001110000111011101011110000100101111101110<br>0001111001000100100010001101001011101110101101000111100000100010<br>1011010000010001001000101000011110111011000111100010110110001000<br>0111011100101101000111100100010001111000001000100001000101001011<br>0010001010000111010010111110111011010010011101111011101100011110 |
| | Phase | $222^{nd}$ Walsh |
| e3 | Sign | 0111010000010010110111100100011100101110010010001000010000011101<br>1110001010000100101101110010111001000111001000010001001010001011<br>1101111001000111011101000000100100111101111100010110100011011011 1<br>0100100011010001000111010111101100010010100010110100011100100001<br>0100011111011110111011011000101111100010011110110100100000101110<br>1101000101001000100001001110001010001011000100101101111010111000<br>0001001001110100101110000001000010100100000010111011100010011110 11<br>1000010011100010110100010100100000100001010001110111010011101101 |
| | Phase | $289^{th}$ Walsh |

Therefore, it is possible to generate three types of quasi-orthogonal codes which can be used in the channel spreader and despreader according to an embodiment of the present invention. That is, in the embodiment, it is possible to generate the quasi-orthogonal code masks completely satisfying Conditions 1 to 4 by using the trace orthogonal basis method described with reference to FIGS. 5 and 22. The quasi-orthogonal code masks generated according to the procedure of FIGS. 5 and 22 are complex masks shown in Tables 17 and 19.

First, when performing channel spreading and despreading using the quasi-orthogonal code masks of Tables 17 to 19, the spreading code generator can have the structure of FIG. 10 or 11. In the channel spreading and despreading device having the spreading code generator of FIG. 10 or 11, the spreading code generator generates the quasi-orthogonal codes for channel spreading by adding the quasi-orthogonal code masks assigned as shown in Tables 17 to 19 and the Walsh orthogonal codes. Here, the quasi-orthogonal code mask generator in the spreading code generator can be so designed as to store the masks of Tables 17 to 19 in a table and selectively output the quasi-orthogonal code mask according to the assigned mask index.

Second, the complex quasi-orthogonal code masks of Tables 17 to 19 can be expressed in the sign code and phase code of the polar coordinate as shown in Tables 20A to 22A. When performing channel spreading and despreading using the quasi-orthogonal code masks of Tables 20A to 22A, the channel spreader can be designed as shown in FIGS. 12 and 14, and the channel despreader can be designed as shown in FIGS. 16 and 18. The channel spreading and despreading device first multiples the designated Walsh orthogonal code by the sign code, and then spreads the input I and Q channel signals by the multiplied signal. Thereafter, channel spread signals are generated by rotating the spread signals using the phase code. Further, in addition to the above channel spreading method, it is also possible to first control a phase of an input signal using the phase code, and then spread the phase controlled input signal using the combined signal of the sign code and the Walsh orthogonal code. The channel despreading operation is also performed in the same procedure.

In the channel spreading and despreading device, the sign code generator and the phase code generator can be designed to store the masks of Tables 20A to 22A in a table and selectively outputs the quasi-orthogonal code mask according to the assigned mask index. At this point, the same mask index t should be used to select the sign code and the phase code. Alternatively, for the sign code generator and the phase code generator can be implemented by designing the separate devices for generating the sign code and phase code of Tables 20A to 22A.

Third, the phase codes shown in Tables 20A to 22A have the type of the specific Walsh orthogonal codes. Therefore, in the masks shown in Tables 20A to 22A, the phase codes are the specific Walsh orthogonal codes of the corresponding length. When performing channel spreading and despreading, the channel spreading and despreading devices of FIGS. 21 and 22 can be design to have the sign codes of Tables 20B to 22B and use the existing Walsh orthogonal codes for the phase codes. The channel spreading and despreading device first multiplies the designated Walsh orthogonal code by the sign code, and then spreads the input I and Q channel signals with the multiplied signals. Thereafter, the channel spread signals are generated by controlling the phase of the spread signals using the assigned second Walsh orthogonal code. In addition, it is possible to use a different channel spreading method. This method first controls a phase of the input signal using the second Walsh orthogonal code, and then spreads the phase controlled input signal using the combined signal of the sign code and the Walsh orthogonal code. The channel despreading operation is also performed in the same procedure.

In the channel spreading and despreading device, the sign code generator stores the masks of Tables 20B to 22B in a table, and the second Walsh orthogonal code generator can be implemented by a device or a table for generating specific Walsh orthogonal codes for controlling the phase. Therefore, the sign code generator and the second Walsh orthogonal code generator can be so designed as to generate the sign code and the second Walsh orthogonal code corresponding to the mask index assigned for channel spreading. At this point, the same mask index t should be used to select the sign code and the second Walsh orthogonal code. Alternatively, the sign code generator and the second Walsh orthogonal code generator can be implemented by designing the separate devices for generating the sign code and phase code of Tables 20B to 22B.

As described above, the embodiment of the present invention can generate complex quasi-orthogonal codes having the least interference with the orthogonal codes. In addition, it is possible to increase the channel capacity without restriction on the number of the orthogonal codes by using the complex quasi-orthogonal codes in a mobile communication system which performs channel separation using the orthogonal codes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a complex quasi-orthogonal code for channel spreading in a CDMA (Code Division Multiple Access) communication system, comprising the steps of:

generating an M-sequence having a length N and a specific sequence having a correlation property with the M-sequence that exceeds a threshold;

generating a predetermined number of other specific sequences by circularly shifting said specific sequence;

generating a predetermined number of other M-sequences by circularly shifting said M-sequence, and column permutating the circularly shifted specific sequences in a same method as a column permutation method for converting the generated M-sequences to Walsh orthogonal codes to generate candidate masks;

generating quasi-orthogonal code representatives by operating on the candidate masks and the Walsh orthogonal codes having the same length as the candidate masks; and selecting quasi-orthogonal code candidates satisfying a partial correlation between the Walsh orthogonal codes out of the generated quasi-orthogonal code representatives and a partial correlation between different quasi-orthogonal codes, and selecting masks pertinent to generating the selected quasi-orthogonal codes.

2. The method as claimed in claim 1, wherein the candidate masks generating step comprises the steps of:

selecting one of a plurality of trace orthogonal basis sets given by a generator polynomial for generating the M-sequence;

expressing each length 1, 2, . . . , N−1 for the specific length N in a binary expression of $C_{m-1}2^{m-1}+C_{m-2}2^{m-2}+\ldots+C_0 2^0$ (where $C_{m-1}, C_{m-2}, \ldots, C_0$ are 0 or 1);

permutating $2^{m-1}, 2^{m-2}, \ldots, 2^0$ with the selected trace orthogonal basis set, and generating element sequences of a Galois field, each having the length N−1 and being expressed as an exponent of a root ax of the generator polynomial;

generating a column permutation function by taking a logarithm having a as a basis for each element of the generated element sequences; and generating the mask candidates by column permutating the specific sequences with the generated column permutation function.

3. The method as claimed in claim 2, wherein the specific sequence is a Kerdock sequence.

4. The method as claimed in claim 3, wherein the step of circularly shifting the specific sequence comprises the step of inserting zero (0) before the shifted specific sequences.

5. The method as claimed in claim 3, wherein the mask selecting step comprises the steps of:

(a) selecting a mask for generating the quasi orthogonal code candidate as the complex quasi orthogonal code mask, when a correlation value for respective parts of a length N/M, where N is a whole length of the complex quasi orthogonal code candidate and the Walsh orthogonal code does not exceed $$\sqrt{\frac{N}{M}};$$

and (b) selecting and storing a mask for generating the quasi orthogonal code candidate as the complex quasi orthogonal code mask, when a correlation value for respective parts of a length N/M, where N is the whole length of a complex quasi orthogonal code candidate generated with the mask selected in step (a) and another complex quasi orthogonal code, does not exceed $$\sqrt{\frac{N}{M}}.$$

6. The method as claimed in claim 3, wherein for N=128, the generated candidate masks are as follows:

$f(x) = 1 + X + X^2 + X^3 + X^5 + X^6 + X^7$
$g(X) = 3 + 3X + X^2 + X^3 + 2X^4 + 3X^5 + X^6 + X^7$

| | | | | | | | | |
|---|---|---|---|---|---|---|---|---|
| e1 | 03323221 | 32212110 | 10030332 | 03323221 | 10030332 | 03323221 | 21101003 | 10030332 |
| | 10030332 | 03323221 | 21101003 | 10030332 | 21101003 | 10030332 | 32212110 | 21101003 |
| e2 | 03230301 | 12103010 | 10303230 | 23212303 | 21232101 | 12323032 | 32301030 | 23032321 |
| | 32301030 | 23032321 | 03010323 | 30101210 | 32121012 | 01030121 | 03230301 | 12103010 |
| e3 | 02113122 | 22133302 | 20333122 | 00313302 | 31222033 | 33020031 | 13002033 | 11200031 |
| | 20113100 | 22311102 | 02333100 | 00131102 | 31000233 | 11020013 | 13220233 | 33200013 |

wherein f(A) is a primitive polynomial;

g(X) is a characteristic polynomial; and ei (where i=1,2,3) is a quasi orthogonal mask candidate sequence.

7. The method as claimed in claim 3, wherein for N=256, the generated candidate masks are as follows:

$f(X) = 1 + X + X^3 + X^5 + X^8$
$g(X) = 1 + 3X + 2X^2 + X^3 + 3X^5 + X^8$

| | | | | | | | | |
|---|---|---|---|---|---|---|---|---|
| e1 | 02330031 | 00312011 | 22130233 | 02330031 | 02112231 | 22312033 | 22312033 | 20330013 |
| | 22312033 | 02112231 | 20330013 | 22312033 | 22130233 | 20112213 | 20112213 | 00312011 |
| | 11201322 | 31001120 | 31001120 | 33023100 | 11023122 | 13001102 | 31223320 | 11023122 |
| | 13001102 | 11023122 | 11023122 | 31223320 | 13223302 | 33023100 | 11201322 | 13223302 |
| e2 | 01031012 | 12102123 | 01033230 | 12100301 | 12100301 | 23211012 | 12102123 | 23213230 |
| | 23213230 | 12102123 | 23211012 | 12100301 | 30322123 | 23211012 | 30320301 | 23213230 |
| | 32122303 | 21011232 | 10302303 | 03231232 | 21013010 | 10302303 | 03233010 | 32122303 |
| | 10300121 | 21011232 | 32120121 | 03231232 | 03231232 | 10302303 | 21011232 | 32122303 |
| e3 | 01121223 | 10210310 | 21323203 | 12230112 | 30230130 | 21101003 | 10032110 | 23121201 |
| | 21103221 | 30232312 | 23123023 | 10030332 | 10212132 | 01123001 | 12232330 | 21321021 |
| | 23301223 | 32030310 | 21321021 | 12232330 | 30232312 | 21103221 | 32212110 | 01301201 |
| | 21101003 | 30230130 | 01303023 | 32210332 | 32032132 | 23303001 | 12230112 | 21323203 |

wherein f(X) is a primitive polynomial;

g(X) is a characteristic polynomial; and ei (where i=1,2,3) is a quasi orthogonal mask candidate sequence.

8. The method as claimed in claim 3, wherein for N=512, the generated candidate masks are as follows:

$f(X) = 1 + X^4 + X^9$
$g(X) = 3 + 2X^2 + 3X^4 + X^8$

| | | | | | | | | |
|---|---|---|---|---|---|---|---|---|
| e1 | 03103203 | 32032132 | 32032132 | 21321021 | 10210310 | 03103203 | 03103203 | 32032132 |
| | 10210310 | 03103203 | 03103203 | 32032132 | 21321021 | 10210310 | 10210310 | 03103203 |
| | 10210310 | 03103203 | 03103203 | 32032132 | 21321021 | 10210310 | 10210310 | 03103203 |
| | 21321021 | 10210310 | 10210310 | 03103203 | 32032132 | 21321021 | 21321021 | 10210310 |
| | 12012312 | 23123023 | 23123023 | 30230130 | 01301201 | 12012312 | 12012312 | 23123023 |
| | 01301201 | 12012312 | 12012312 | 23123023 | 30230130 | 01301201 | 01301201 | 12012312 |
| | 01301201 | 12012312 | 12012312 | 23123023 | 30230130 | 01301201 | 01301201 | 12012312 |
| | 30230130 | 01301201 | 01301201 | 12012312 | 23123023 | 30230130 | 30230130 | 01301201 |
| e2 | 00131102 | 13002033 | 13222011 | 00311120 | 00133320 | 13000211 | 13220233 | 00313302 |
| | 13000211 | 22311102 | 00313302 | 31002011 | 31220211 | 00131102 | 22133302 | 13222011 |
| | 13222011 | 00311120 | 22313320 | 31220211 | 31002011 | 22131120 | 00133320 | 13000211 |
| | 22131120 | 13220233 | 13000211 | 22311102 | 22133302 | 13222011 | 13002033 | 22313320 |
| | 00133320 | 13000211 | 31002011 | 22131120 | 22313320 | 31220211 | 13222011 | 00311120 |
| | 31220211 | 00131102 | 00311120 | 31000233 | 31222033 | 00133320 | 00313302 | 31002011 |
| | 13220233 | 00313302 | 00133320 | 13000211 | 13222011 | 00311120 | 00131102 | 13002033 |
| | 00311120 | 31000233 | 13002033 | 22313320 | 22131120 | 13220233 | 31222033 | 00133320 |
| e3 | 03230301 | 01030121 | 23032321 | 03010323 | 10303230 | 12103010 | 30101210 | 10123212 |
| | 23210121 | 21010301 | 21230323 | 01212321 | 12101232 | 10301012 | 10121030 | 30103032 |
| | 23032321 | 03010323 | 03230301 | 01030121 | 12323032 | 32301030 | 32121012 | 30321232 |
| | 03012101 | 23030103 | 01032303 | 03232123 | 10121030 | 30103032 | 12101232 | 10301012 |
| | 12101232 | 32123230 | 32303212 | 30103032 | 23210121 | 03232123 | 03012101 | 01212321 |
| | 32121012 | 12103010 | 30101210 | 32301030 | 21012123 | 01030121 | 23032321 | 21232101 |
| | 10121030 | 12321210 | 30323010 | 10301012 | 03012101 | 01212321 | 23210121 | 03232123 |
| | 30101210 | 32301030 | 32121012 | 12103010 | 01210103 | 03010323 | 03230301 | 23212303 |

wherein f(X) is a primitive polynomial;

g(X) is a characteristic polynomial; and ei (where i=1,2,3) is a quasi orthogonal mask candidate sequence.

9. The method as claimed in claim 6, wherein the masks generated for N=128 are converted to sign and phase values in a polar coordinate as follows:

| | | |
|---|---|---|
| $f(X) = 1 + X + X^2 + X^3 + X^5 + X^6 + X^7$ | | |
| $g(X) = 3 + 3X + X^2 + X^3 + 2X^4 + 3X^5 + X^6 + X^7$ | | |
| e1 | Sign | 0111111011101000000101110111111100001011101111111010000000100010111<br>00010111011111110100000001000101111000000010001011111110100010000001 |
| | Phase | 0110100110010110100101100110100110010110011010010110100110010110<br>1001011001101001011010011001011001101001100101101001011001101001 |
| e2 | Sign | 01110100010010000001011101110110110111000011110111110001011011110<br>1110001011011110010001111000010011010001000100100111010001001000 |
| | Phase | 0101010110101010101010100101010101010101101010101010101001010101<br>1010101001010101010101011010101010101010010101010101010110101010 |
| e3 | Sign | 0100101111011101101110110010110110111011110100100100101100100010<br>10001000111000010111100000001000110000111000100010111011111100001 |
| | Phase | 0011111000001111100000111110000011111001100000111110000011111000001111100000 11<br>001111100000111110000011111000001111100110000011111000001111100000111110000011. |

10. The method as claimed in claim 7, wherein the masks generated for N=256 are converted to sign and phase values in a polar coordinate as follows:

| | | |
|---|---|---|
| $f(X) = 1 + X + X^3 + X^5 + X^8$ | | |
| $g(X) = 1 + 3X + 2X^2 + X^3 + 3X^5 + X^8$ | | |
| e1 | Sign | 0111001000101000110101110111001001001110111010111110101110110001<br>1110101101001110101100011110101111010111100011011000110100101000<br>0010011110000010100000101101100000011011010000011011111000011011<br>0100000100011011000110111011111100111110111011000001001110111101 |
| | Phase | 0011001100110011001100110011001100110011001100110011001100110011<br>0011001100110011001100110011001100110011001100110011001100110011<br>1100110011001100110011001100110011001100110011001100110011001100<br>1100110011001100110011001100110011001100110011001100110011001100 |
| e2 | Sign | 0001000101001011000111100100010001000100111000010100101111101110<br>1110111001001011111000010100010010111011111000011011010011101110<br>1101110110000111001011010111011110001000000101101011110001101110 1<br>0010001010000111111010010011101110111011100101101100001111101110 1 |
| | Phase | 0101101010100101010110101010010110100101010110101010010101011010<br>0101101010100101010110101010010110100101010110101010010101011010<br>1010010101011010101001010101101001011010101001010101101010100101<br>1010010101011010101001010101101001011010101001010101101010100101 |
| e3 | Sign | 0001011100100100101111010111000110110010100000001000110001101 0100<br>1000111010111101110110110001011100101011000110000111111010110010<br>1110011111010100101100100111111010111101100011101110100000100100<br>1000000110110010001010111110011111011011110100001110001101111101 |
| | Phase | 0110100110010110011010011001011010010110011010011001011001101001<br>0110100110010110011010011001011010010110011010011001011001101001<br>0110100110010110011010011001011010010110011010011001011001101001<br>0110100110010110011010011001011010010110011010011001011001101001. |

11. The method as claimed in claim 8, wherein the masks generated for N=512 are converted to sign and phase values in a polar coordinate as follows:

$f(X) = 1 + X^4 + X^9$
$g(X) = 3 + 2X^2 + 3X^4 + X^8$

| | | |
|---|---|---|
| e1 | Sign | 0100110111011011110110111011001000100100010011010100110111011011 |
| | | 0010010001001101010011011101101110110010001001000010010001001101 |
| | | 0010010001001101010011011101101110110010001001000010010001001101 |
| | | 1011001000100100001001000100110111011011101100101011001000100100 |
| | | 0100110111011011110110111011001000100100010011010100110111011011 |
| | | 0010010001001101010011011101101110110010001001000010010001001101 |
| | | 0010010001001101010011011101101110110010001001000010010001001101 |
| | | 1011001000100100001001000100110111011011101100101011001000100100 |
| | Phase | 0110100110010110100101100110100110010110011010010110100110010110 |
| | | 1001011001101001011010011001011001101001100101101001011001101001 |
| | | 1001011001101001011010011001011001101001100101101001011001101001 |
| | | 0110100110010110100101100110100110010110011010010110100110010110 |
| | | 1001011001101001011010011001011001101001100101101001011001101001 |
| | | 0110100110010110100101100110100110010110011010010110100110010110 |
| | | 0110100110010110100101100110100110010110011010010110100110010110 |
| | | 1001011001101001011010011001011001101001100101101001011001101001 |
| e2 | Sign | 0001000101001011011110000010001000011110010001000111011100101101 |
| | | 0100010011100001001011011000100010110100000100011101110101111000 |
| | | 0111100000100010111011101011010010001000110100100001111001000100 |
| | | 1101001001110111010001001110000111011101011110000100101111101110 |
| | | 0001111001000100100010001101001011101110101101000111100000100010 |
| | | 1011010000010001001000101000011110111011000111100010110110001000 |
| | | 0111011100101101000111100100010001111000001000100001000101001011 |
| | | 0010001010000111010010111110111011010010011101110111011000111110 |
| | Phase | 0011110011000011110000110011110000111100110000111100001100111100 |
| | | 1100001100111100001111001100001111000011001111000011110011000011 |
| | | 1100001100111100001111001100001111000011001111000011110011000011 |
| | | 0011110011000011110000110011110000111100110000111100001100111100 |
| | | 0011110011000011110000110011110000111100110000111100001100111100 |
| | | 1100001100111100001111001100001111000011001111000011110011000011 |
| | | 1100001100111100001111001100001111000011001111000011110011000011 |
| | | 0011110011000011110000110011110000111100110000111100001100111100 |
| e3 | Sign | 0111010000001001011011110010001110010111001001000100001000011101 |
| | | 1110001010000100101101110010111001000111001000010001001010001011 |
| | | 1101111001000111011101000000100100111101111100010110100011011011 1 |
| | | 0100100011010001000111010111101100010010100010110100011100100001 |
| | | 0100011111011110111011011000101111100010011110110100100000101110 |
| | | 1101000101001000100001001110001010001011000100101101111010111000 |
| | | 0001001001110100101110000001000010100100000101110111000100111101 1 |
| | | 1000010011100010110100010100100000100001010001110111010011101101 |
| | Phase | 0101010101010101010101010101010110101010101010101010101010101010 |
| | | 0101010101010101010101010101010110101010101010101010101010101010 |
| | | 0101010101010101010101010101010110101010101010101010101010101010 |
| | | 0101010101010101010101010101010110101010101010101010101010101010 |
| | | 1010101010101010101010101010101001010101010101010101010101010101 |
| | | 1010101010101010101010101010101001010101010101010101010101010101 |
| | | 1010101010101010101010101010101001010101010101010101010101010101 |
| | | 1010101010101010101010101010101001010101010101010101010101010101. |

12. A channel spreading device in a CDMA communication system, comprising:

a Walsh orthogonal code generator for generating a Walsh orthogonal code corresponding to a Walsh orthogonal code index for an assigned channel;

a sign code generator for storing sign codes shown in a table below, and generating a sign code corresponding to a mask index ei (where i=1,2,3) for the assigned channel;

a phase code generator for storing phase codes shown in the table below, and generating a phase code corresponding to the mask index ei (where i=1,2,3) for the assigned channel;

spreaders for spreading input signals with a spreading code generated by mixing the Walsh orthogonal code and the sign code; and a rotator for controlling phases of signals output from the spreaders according to the phase code to generate channel spread signals:

f(X) = 1 + X + $X^2$ + $X^3$ + $X^5$ + $X^6$ + $X^7$
g(X) = 3 + 3X + $X^2$ + $X^3$ + $2X^4$ + $3X^5$ + $X^6$ + $X^7$

| | | |
|---|---|---|
| e1 | Sign | 01111110111010000001011101111111000010111011111101000000100010111 |
| | | 0001011101111111010000001000101111000000100010111111010001000000 1 |
| | Phase | 0110100110010110100101100110100110010110011010010110100110010110 |
| | | 1001011001101001011010011001011001101001100101101001011001101001 |
| e2 | Sign | 0111010001001000000101110111011011011100000111101111100010110111 10 |
| | | 1110001011011110010001111000010011010001000100100111010001001000 |
| | Phase | 0101010110101010101010100101010101010101101010101010101001010101 |
| | | 1010101001010101010101011010101010101010010101010101010110101010 |
| e3 | Sign | 0100101111011101101110110010110110111011110100100100101100100010 |
| | | 1000100011100001011110000000100011000011100010001011101111110000 1 |
| | Phase | 0011110000111100001111000011110011000011110000111100001111000011 |
| | | 0011110000111100001111000011110011000011110000111100001111000011 |

wherein f(X) is a primitive polynomial and g(X) is a characteristic polynomial.

13. A channel spreading device in a CDMA communication system, comprising:

a Walsh orthogonal code generator for generating a Walsh orthogonal code corresponding to a Walsh orthogonal code index for an assigned channel;

a sign code generator for storing sign codes shown in a table below, and generating a sign code corresponding to a mask index ei (where i=1,2,3) for the assigned channel;

a phase code generator for storing phase codes shown in the table below, and generating a phase code corresponding to the mask index ei (where i=1,2,3) for the assigned channel;

spreaders for spreading input signals with a spreading code generated by mixing the Walsh orthogonal code and the sign code; and a rotator for controlling phases of signals output from the spreaders according to the phase code to generate channel spread signals:

wherein f(X) is a primitive polynomial and g(X) is a characteristic polynomial.

14. A channel spreading device in a CDMA communication system, comprising:

a Walsh orthogonal code generator for generating a Walsh orthogonal code corresponding to a Walsh orthogonal code index for an assigned channel;

a sign code generator for storing sign codes shown in a table below, and generating a sign code corresponding to a mask index ei (where i=1,2,3) for the assigned channel;

a phase code generator for storing phase codes shown in the table below, and generating a phase code corresponding to the mask index ei (where i=1,2,3) for the assigned channel;

spreaders for spreading input signals with a spreading code generated by mixing the Walsh orthogonal code and the sign code; and a rotator for controlling phases of signals output from the spreaders according to the phase code to generate channel spread signals:

f(X) = 1 + X + $X^3$ + $X^5$ + $X^8$
g(X) = 1 + 3X + $2X^2$ + $X^3$ + $3X^5$ + $X^8$

| | | |
|---|---|---|
| e1 | Sign | 0111001000101000110101110111001001001110111010111110101110110001 |
| | | 1110101101001110101100011110101111010111100011011000110100101000 |
| | | 0010011110000010100000101101100000011011010000011011111000011011 |
| | | 0100000100011011000110111011111001111101110110000010011101111101 |
| | Phase | 0011001100110011001100110011001100110011001100110011001100110011 |
| | | 0011001100110011001100110011001100110011001100110011001100110011 |
| | | 1100110011001100110011001100110011001100110011001100110011001100 |
| | | 1100110011001100110011001100110011001100110011001100110011001100 |
| e2 | Sign | 0001000101001011000111100100010001000100111000010100101111101110 |
| | | 1110111001001011111000010100010010111011111000011011010011101110 |
| | | 1101110110000111001011010111011110001000001011010111100011011101 |
| | | 0010001010000111110100100111011101110111001011011000011111011101 |
| | Phase | 0101101010100101010110101010010110100101010110101010010101011010 |
| | | 0101101010100101010110101010010110100101010110101010010101011010 |
| | | 1010010101011010101001010101101001011010101001010101101010100101 |
| | | 1010010101011010101001010101101001011010101001010101101010100101 |
| e3 | Sign | 0001011100100100101111010111000110110010100000001000110001101010 0 |
| | | 1000111010111101110110110001011100101011000110000111111010110010 |
| | | 1110011111010100101100100111111010111101100011101110100000100100 |
| | | 1000000110110010001010111110011111011011111010000111000110111101 |
| | Phase | 0110100110010110011010011001011010010110011010011001011001101001 |
| | | 0110100110010110011010011001011010010110011010011001011001101001 |
| | | 0110100110010110011010011001011010010110011010011001011001101001 |
| | | 0110100110010110011010011001011010010110011010011001011001101001 |

$f(X) = 1 + X^4 + X^9$
$g(X) = 3 + 2X^2 + 3X^4 + X^8$

| | | |
|---|---|---|
| e1 | Sign | 0100110111011011110110111011001000100100010011010100110111011011 |
| | | 0010010001001101010011011101101110110010001001000010010001001101 |
| | | 0010010001001101010011011101101110110010001001000010010001001101 |
| | | 1011001000100100001001000100110111011011101100101011001000100100 |
| | | 0100110111011011110110111011001000100100010011010100110111011011 |
| | | 0010010001001101010011011101101110110010001001000010010001001101 |
| | | 0010010001001101010011011101101110110010001001000010010001001101 |
| | | 1011001000100100001001000100110111011011101100101011001000100100 |
| | Phase | 0110100110010110100101100110100110010110011010010110100110010110 |
| | | 1001011001101001011010011001011001101001100101101001011001101001 |
| | | 1001011001101001011010011001011001101001100101101001011001101001 |
| | | 0110100110010110100101100110100110010110011010010110100110010110 |
| | | 1001011001101001011010011001011001101001100101101001011001101001 |
| | | 0110100110010110100101100110100110010110011010010110100110010110 |
| | | 0110100110010110100101100110100110010110011010010110100110010110 |
| | | 1001011001101001011010011001011001101001100101101001011001101001 |
| e2 | Sign | 0001000101001011011111000001000100001111001000100011101110010110 1 |
| | | 0100010011100001001011011000100010110100000100011101110101111000 |
| | | 0111100000100010111011101011010010001000110100100001111001000100 |
| | | 1101001001110111010001001110000111011101011110000100101111101110 |
| | | 0001111001000100100010001101001011101110101101000111100000100010 |
| | | 1011010000010001001000101000011110111011000111100010110110001000 |
| | | 0111011100101101000111100100010001111000001000100001000101001011 |
| | | 0010001010000111010010111110111011010010011101111011101100011110 |
| | Phase | 0011110011000011110000110011110000111100110000111100001100111100 |
| | | 1100001100111100001111001100001111000011001111000011110011000011 |
| | | 1100001100111100001111001100001111000011001111000011110011000011 |
| | | 0011110011000011110000110011110000111100110000111100001100111100 |
| | | 0011110011000011110000110011110000111100110000111100001100111100 |
| | | 1100001100111100001111001100001111000011001111000011110011000011 |
| | | 1100001100111100001111001100001111000011001111000011110011000011 |
| | | 0011110011000011110000110011110000111100110000111100001100111100 |
| e3 | Sign | 01110100000010010110111100100011100101110010010001000010000011101 |
| | | 1110001010000100101101110010111001000111001000010001001010001011 |
| | | 1101111001000111011101000000100100111101111100010110100011 0110111 |
| | | 0100100011010001000111010111101100010010100010110100011100100001 |
| | | 0100011111011110111011011000101111100010011110110100100000101110 |
| | | 1101000101001000100001001110001010001011000100101101111010111000 |
| | | 0001001001110100101110000001000010100100000010111011100010011110 11 |
| | | 1000010011100010110100010100100000100001010001110111010011101101 |
| | Phase | 0101010101010101010101010101010101101010101010101010101010101010 |
| | | 0101010101010101010101010101010101101010101010101010101010101010 |
| | | 0101010101010101010101010101010101101010101010101010101010101010 |
| | | 0101010101010101010101010101010101101010101010101010101010101010 |
| | | 1010101010101010101010101010101010010101010101010101010101010101 |
| | | 1010101010101010101010101010101010010101010101010101010101010101 |
| | | 1010101010101010101010101010101010010101010101010101010101010101 |
| | | 1010101010101010101010101010101010010101010101010101010101010101 |

where in f(X) is a primitive polynomial and g(X) is a characteristic polynomial.

15. A channel spreading device in a CDMA communication system, comprising:

a first Walsh orthogonal code generator for generating a first Walsh orthogonal code corresponding to a Walsh orthogonal code index for an assigned channel;

a sign code generator for generating a sign code corresponding to a mask index for the assigned channel;

a phase code generator for generating a second Walsh orthogonal code corresponding to a mask index for the assigned channel, the second Walsh orthogonal code controlling a phase of a channel spread signal;

a spreader for spreading input signals with a spreading code generated by mixing the first Walsh orthogonal code and the sign code; and a rotator for controlling phases of the spread signals according to the second Walsh orthogonal code.

16. The channel spreading device as claimed in claim 15, wherein for a spreading code length of 128, the sign code generator includes a sign code table as shown below, and the second Walsh orthogonal code generator uses a $127^{th}$ Walsh orthogonal code for a phase value for an e1 sign code, an $89^{th}$ Walsh orthogonal code for a phase value for an e2 sign code, and a $38^{th}$ Walsh orthogonal code for a phase value for an e3 sign code:

| | |
|---|---|
| e1 Sign | 0111111011101000000101110111111000010111011111101000000100010111 |
| | 0001011101111110100000010001011111000000100010111111010001000001 |
| e2 Sign | 0111010001001000000101110111011011011100001111011111000101101110 |
| | 1110001011011110010001111000010011010001000100100111010001001000 |
| e3 Sign | 0100101111011101101110110010110110111011110100100100101100100010 |
| | 1000100011100001011110000000100011000011100010001011101111100001. |

17. The channel spreading device as claimed in claim 15, wherein for a spreading code length of 256, the sign code generator includes a sign code table as shown below, and the second Walsh orthogonal code generator uses a 130$^{th}$ Walsh orthogonal code for a phase values for an e1 sign code, a 173$^{th}$ Walsh orthogonal code for a phase value for an e2 sign code, and a 47$^{th}$ Walsh orthogonal code for a phase values for an e3 sign code:

| | | |
|---|---|---|
| e1 | Sign | 0111001000101000110101110111001001001110111010111110101110110001 |
| | | 1110101101001110101100011110101111010111100011011000110100101000 |
| | | 0010011110000010100000101101100000011011010000011011111000011011 |
| | | 0100000010001101100011011101111110011111011101100000100111101111101 |
| e2 | Sign | 0001000101001011000111100100010001000100111000010100101111101110 |
| | | 1110111001001011111000010100010010111011111000011011010011101110 |
| | | 1101110110000111001011010111011110001000001011010111100011011101 |
| | | 0010001010000111110100100111011101110111001011011000011111011101 |
| e3 | Sign | 0001011100100100101111010111000110110010100000001000110001101010 0 |
| | | 1000111010111101110110110001011100101011000110000111111010110010 |
| | | 1110011111010100101100100111111010111101100011101110100000100100 |
| | | 1000000110110010001010111110011111011011111010000111000110111101. |

18. The channel spreading device as claimed in claim 15, wherein for a spreading code length of 512, the sign generator includes a sign code table as shown below, and the second Walsh orthogonal code generator uses a 551$^{th}$ Walsh orthogonal code for a phase value for an e1 sign code, a 222$^{th}$Walsh orthogonal code for a phase value for an e2 sign code, and a 289$^{th}$ Walsh orthogonal code for a phase value for an e3 sign code:

| | | |
|---|---|---|
| e1 | Sign | 0100110111011011110110111011001000100100010011010100110111011011 |
| | | 0010010001001101010011011101101110110010001001000010010001001101 |
| | | 0010010001001101010011011101101110110010001001000010010001001101 |
| | | 1011001000100100001001000100110111011011101100101011001000100100 |
| | | 0100110111011011110110111011001000100100010011010100110111011011 |
| | | 0010010001001101010011011101101110110010001001000010010001001101 |
| | | 0010010001001101010011011101101110110010001001000010010001001101 |
| | | 1011001000100100001001000100110111011011101100101011001000100100 |
| e2 | Sign | 0001000101001011011110000001000100001111001000100011101110010110 1 |
| | | 0100010011100001001011011000100010110100000100011101110101111000 |
| | | 0111100000010001011101110101101001000100011010010000111100100010 0 |
| | | 1101001001110111010001001110000111011101011110000100101111101110 |
| | | 0001111001000100100010001101001011101110101101000111100000100010 |
| | | 1011010000001000100100010100001111011101100011110001011011000100 0 |
| | | 0111011100101101000111100100010001111000000100010000100010100101 1 |
| | | 0010001010000111010010111111011101101001001110111101110110001111 0 |
| e3 | Sign | 0111010000001001011011110010001110010111001001000100001000001110 1 |
| | | 1110001010000100101101110010111001000111001000010001001010001011 |
| | | 1101111001000111011101000000100100111101111110001011010001101101 11 |
| | | 0100100011010001000111010111101100010010100010110100011100100001 |
| | | 0100011111011110111011011000101111100010011110110100100000101110 |
| | | 1101000101001000100001001110001010001011000100101101111010111000 |
| | | 0001001001110100101110000001000010100100000101110111000100111101 1 |
| | | 1000010011100010110100010100100000100001010001110111010011101101. |

19. A channel spreading device in a CDMA communication system, comprising:

a first Walsh orthogonal code generator for generating a first Walsh orthogonal code corresponding to a Walsh orthogonal code index for an assigned channel;

a sign code generator for generating a sign code corresponding to a mask index for the assigned channel;

a phase code generator for generating a second Walsh orthogonal code corresponding to a mask index for the assigned channel, the second Walsh orthogonal code controlling a phase of a channel spread signal;

a rotator for controlling phases of input signals according to the second Walsh orthogonal code; and a spreader for spreading the phase controlled input signals with a spreading code generated by mixing the first Walsh orthogonal code and the sign code.

* * * * *